United States Patent [19]

Woodward

[11] 4,028,536

[45] June 7, 1977

[54] SNAIAS DIGITAL DATA TEST SET

[75] Inventor: John William Woodward, Virginia Beach, Va.

[73] Assignee: The United States of America as represented by the Secretary of the Navy, Washington, D.C.

[22] Filed: Feb. 27, 1976

[21] Appl. No.: 661,901

[52] U.S. Cl. .............................. 235/153 A; 73/1 E; 235/150.27; 235/153 AK; 235/153 AK; 340/146.1 AB; 340/146.1 AV
[51] Int. Cl.² .................. H04B 3/46; H04B 17/00; G08C 25/00
[58] Field of Search ................. 73/1 E; 235/150.27, 235/153 A, 153 AC, 153 AK; 340/146.1 A, 146.1 AB, 146.1 AV, 146.1 AX, 146.1 E, 146.1 R

[56] References Cited
UNITED STATES PATENTS

| | | | |
|---|---|---|---|
| 3,872,284 | 3/1975 | Seligman et al. | 235/150.27 |
| 3,916,379 | 10/1975 | Dulaney et al. | 340/146.1 A X |
| 3,939,472 | 2/1976 | Groginsky | 340/146.1 R |

Primary Examiner—R. Stephen Dildine, Jr.

[57] ABSTRACT

The Ships Navigation Aircraft Inertial Alignment System (SNAIAS) Digital Test Set checks-out the data link navigation messages between the shipboard navigation system and the aircraft inertial alignment system. The test set monitors alignment and waypoint data, and provides a go/no-go indication of the adequacy of the data. The set receives transmitted UHF data by means of a receiver, or hardwired data from the Alignment Outlet Boxes (AOB) via a cable connector. SNAIAS can also monitor data at other hardwired points along the data distribution path. The test set monitors either the AOB data, the RF data, or sequentially monitors each. The set can generate its own data, inject it into the data path, and monitor the system outputs.

20 Claims, 42 Drawing Figures

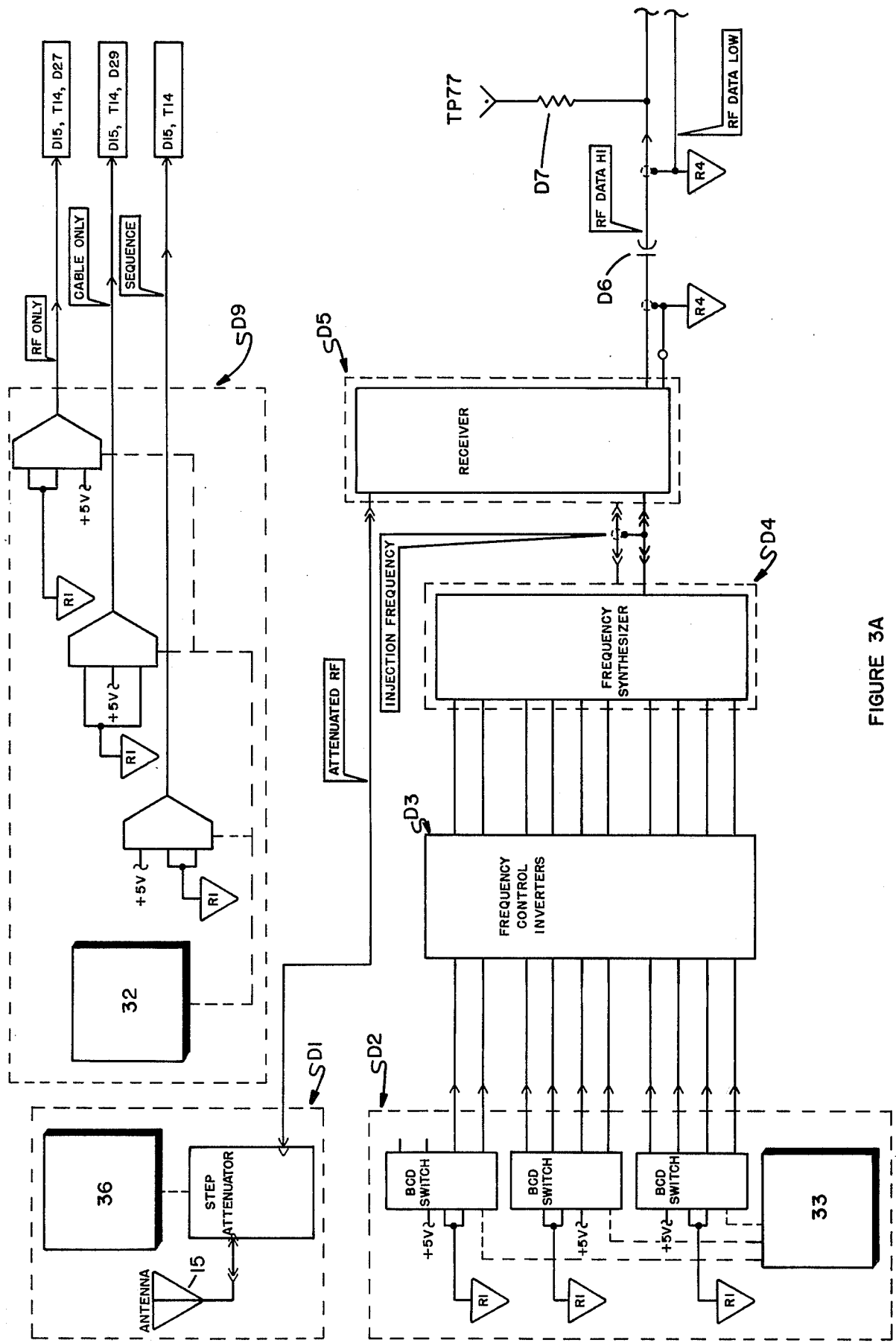

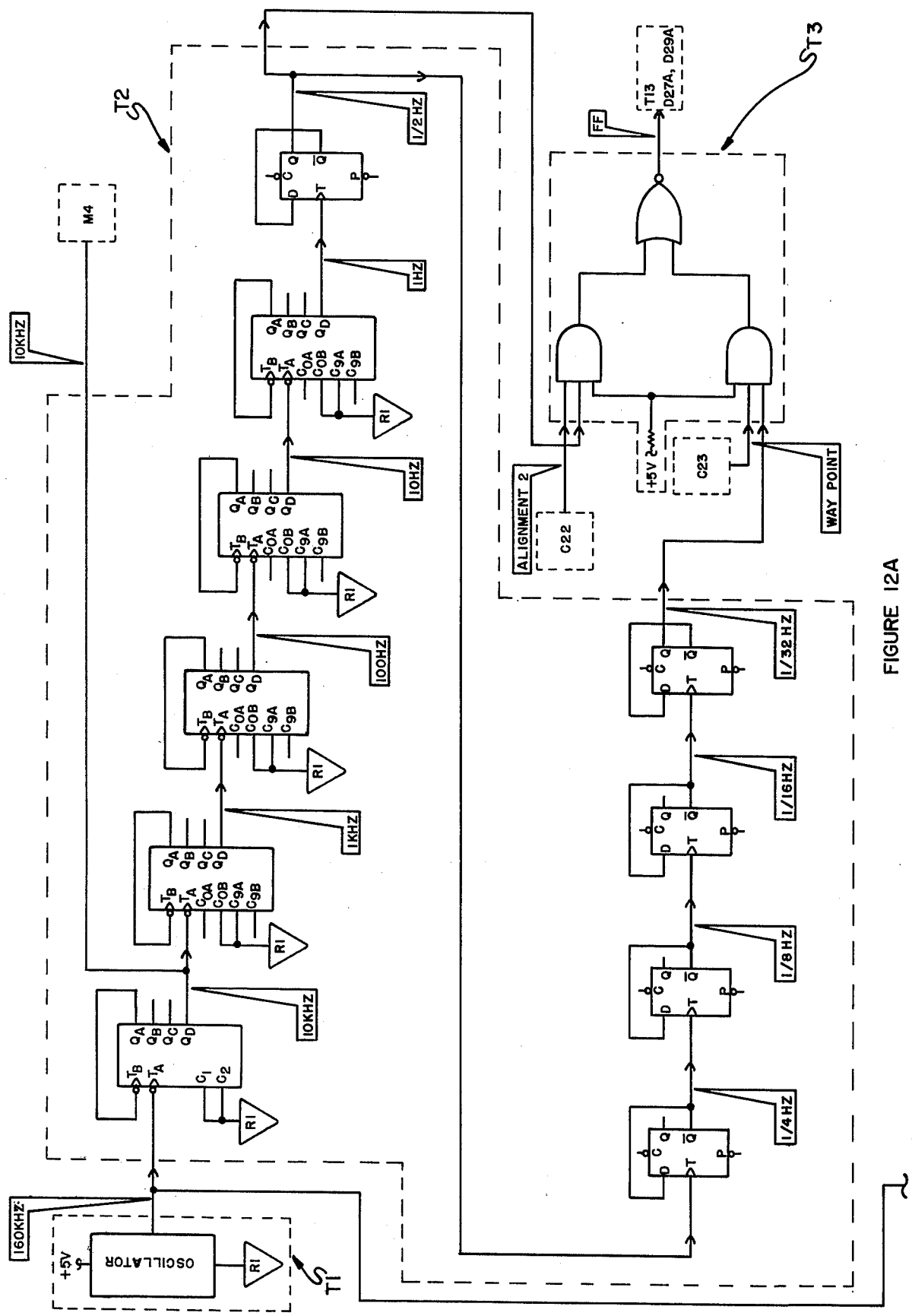

SNAIAS DIGITAL DATA TEST SET

BACKGROUND OF THE INVENTION

Ships Navigation Aircraft Inertial Alignment System (SNAIAS) is used on CV/CVA class aircraft carriers to furnish navigation data, as required, to establish the initial operating conditions of the Aircraft Inertial Navigation Systems (AINS) located on board an aircraft preparing for a mission.

The SNAIAS consists of two major subsystems, the Naviation Subsystem (NS) and the Aircraft Inertial Alignment Subsystem (AIAS). The NS generates required navigational data. The AIAS transmits analog data to the AINS aircraft via umbilical cables and alignment outlet boxes (AOB) in the hanger and flight decks. SNAIAS digital data is transmitted via a digital data radio link or AOB's via umbilical cables to the Aircraft Inertial Navigation System (AINS) in the aircraft and to Special Support Equipment via a connection box.

Older systems transmitted the required data by synchro signals. When newer systems added the capability on distributing this data via a digital link (both hardwired and RF), a hole developed in the Navy's capability to test the availability and adequacy of the data provided. A SNAIAS Digital Data Test Set was developed to fill this gap.

SUMMARY OF THE INVENTION

The SNAIAS Digital Test Set is a portable test set capable of evaluating the availability and adequacy of the ship's motion parameter data, aiding in the maintenance of the digital alignment/waypoint insertion system. The test set monitors alignment and waypoint data, and provides a go/no-go indication of the adequacy of the data. The set receives transmitted UHF data by means of a receiver, or hardwired data from the Alignment Outlet Boxes (AOB) via a cable connector. A set of test clips is also provided for monitoring data at the ACO switchboards, junction boxes, and other hardwired points along the data distribution path. A continuous check is made between the cable (AOB) and RF data, and a go/no-go pair of lamps indicate the sameness of the data. The test set monitors either the AOB data, the RF data, or sequentially monitors each.

The Digital Data Test Set can display a particular alignment message (identified by its sublabel), or a specific waypoint number and message sublabel. It also displays, with go/no-go indicators, the result of a check on the label, parity and validity portion of each message. Self-test features enable personnel to prove that the test set can recognize good and bad alignment and waypoint data. The test set also produces good/bad alignment/waypoint data (available at a test point), which is identical in level and drive to the output of the AN/SSW-1. Thus the set can generate its own data, inject it into the data path, and monitor the system outputs.

When not used for preventive or corrective maintenance, the test set may be semipermanently mounted, and provide continuous monitoring of the data. When used in this mode, the set may be connected to a remote alarm. The test set will energize the alarm if AOB and/or RF data are no-go, or if they do not compare.

STATEMENT OF THE OBJECTS OF THE INVENTION

An object of the invention is to receive digital data alignment information simultaneously from cable and RF link, to compare data from the two sources continuously bit for bit and to give an indication when a discrepancy occurs.

An object of the invention is to receive waypoint data simultaneously from cable and RF, to compare data continuously bit for bit giving an indication when a discrepancy occurs.

Another object of the invention is to check for correct label and parity for each align or waypoint message (RF and cable) and insure that all sublabels are received with the proper up-date rate.

Another object of the invention is to display on request any alignment or waypoint message (selectable sublabel) being transmitted over either RF or cable.

Other objects, advantages and novel features of the invention will become apparent from the following detailed description of the invention when considered in conjunction with accompanying drawings.

DETAILED DESCRIPTION OF THE PREFERRED EMBODIMENT

The SNAIAS Digital Data Test Set 10 provides the capability to monitor and check-out the characteristics of digital data from AOB or RF sources. The test set is capable of displaying digital data, monitoring data content, comparing RF to AOB data, setting alarms and self-testing. When verifying data flow to alignment outlet boxes (AOB), the test set will operate from power available at the AOB. When verifying data flow to other systems, there is an electrical input operating the test set from 115V, 60Hz power.

CONTROL PANEL

Figure 1:
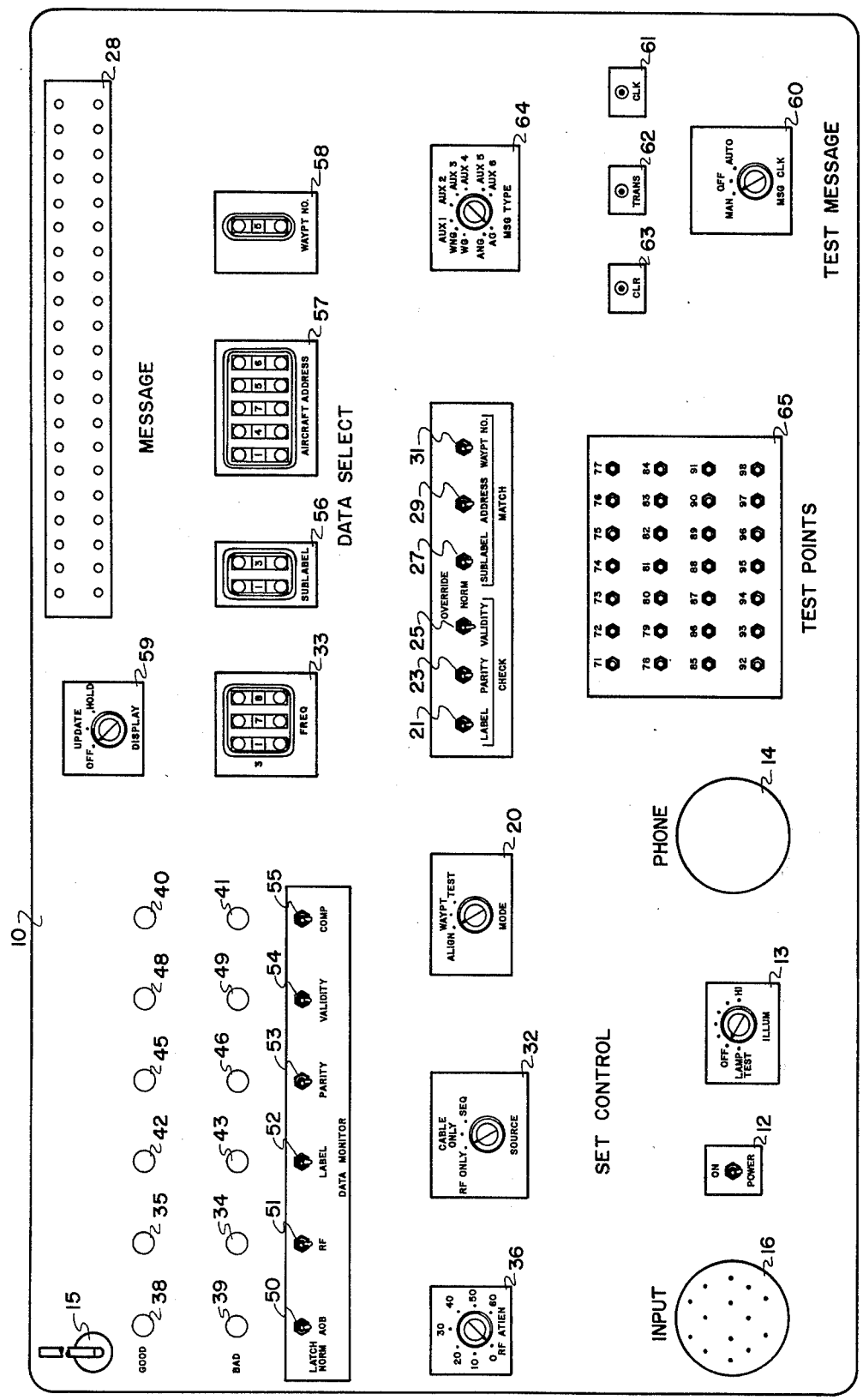
FIG. 1 is a view of the front panel control system of the test set.

Referring to FIG 1, the front control panel for the SNAIAS Digital Data Test Set 10 is shown. Power switch 12 applies power to the digital test set 10 when set to ON. ILLUM dial 13 supplies no panel illumination on OFF; at LAMP TEST, all lamps light, enabling the operator to inspect for faulty lamps; and at the various graduations, clockwise rotation increases the intensity of panel lighting. A red light (not shown) is mounted adjacent the panel 10 to illuminate the panel in a darkened environment.

PHONE plug 14 allows for an audio intercom hook-up to various stations on board ship such as to the SINS room.

INPUT jack 16 has various pin connectors to provide the test set with cable data, a power input, a relay control and an alarm output.

When the MODE dial 20 is set at ALIGN, the test set monitors alignment messages, that is, the data which the aircraft must receive, validate and accept to properly align its INS. The test set is capable of displaying any message with continuous update by selecting the required alignment sublabel. When the MODE dial 20 is set at WAYPT, the test set monitors waypoint messages, that is, the geographical location points (latitude and longitude) of the route the aircraft takes to its target. The test set is capable of displaying any transmitted waypoint message with continuous update by selecting the message sublabel, aircraft address and waypoint number parameters. When MODE dial 20 is set at TEST, the test set monitors an internally generated test signal.

LABEL CHECK switch 21, PARITY CHECK switch 23 and VALIDITY CHECK switch 25 maybe in either a NORM or OVERRIDE position. If at NORM, the respective switches enable label data monitor, parity data monitor or validity data monitor. If at OVERRIDE the respective switches inhibit label data monitor, parity data monitor or validity data monitor and cause a GOOD indication.

SUBLABEL MATCH switch 27, ADDRESS MATCH switch 29, and WAYPT NO. MATCH switch 31 may be in either the NORM position or OVERRIDE. When in NORM, the MESSAGE lamps 28 display (for the respective switches) selected sublabel data, aircraft address data or waypoint data. When in OVERRIDE, the MESSAGE lamps 28 display the message regardless of sublabel match, address match or waypoint number match. In order to perform data transmission checks, even if the ship's inertial navigation system or the computer/data terminal source is off-line, it is possible to override sublabel match in the alignment mode or to override sublabel match, address match and waypoint number match in the waypoint mode. This override makes it possible to display test messages generated in the Digital Link Terminal Set at either the AOB or through reception via the RF data link.

The alignment data from the digital data radio link, the AOB's or both, may be selected on the SOURCE dial 32. When dial 32 is set to RF ONLY, the test set samples and monitors only RF data received via the antenna 15. Antenna 15 is a quarter wave antenna at 300mHz. It receives transmitted RF digital data when erected in a vertical position in a line of sight with the transmitting antenna. RF frequency is selected via thumbwheel switches 33 on the control panel. The RF data monitor lamps 34, 35 display the status of the overall RF data and the MESSAGE lamps 28 display one particular message (sublabel) of the RF data. If one or more of the six aspects of the message is bad, lamp 34 is lit indicating RF bad data. Correspondingly, if the entire transmitted message was good, lamp 35 is lit indicating RF good data. An RF step attenuator 36 is provided in order to ascertain relative signal strength of the RF signal at different points around the flight deck.

When SOURCE dial 32 is set at CABLE ONLY, the test set samples and monitors data at the input jack 16. GOOD indicator 38 and BAD indicator 39, as for RF, display the status of the overall cable data and the MESSAGE lamps display one particular message (sublabel) of the cable data. When dial 32 is set at SEQ, the test set performs real-time comparison between data received via the RF link and the same data received via hardwire transmission. The test set sequentially samples both cable and RF data. The MODE switch 20 setting determines the sampling period: 1 second for alignment data and 16 seconds for waypoint data. When COMP GOOD indicator 40 is lit, it indicates that the received RF and AOB data were the same, bit-for-bit. When COMP BAD indicator 41 is lit, it indicates that the received RF and AOB data are not the same. Both cable data indicators 38, 39 and RF data indicators 34, 35, are also active.

If LABEL GOOD indicator 42 is lit, it indicates that the label of the received message was good, while if LABEL BAD lamp 43 is lit, it indicates that the label of the received message was bad. When PARITY GOOD indicator 45 is lit, it indicates that the received message had correct parity on the required bits while when BAD indicator 46 is lit, it indicates that one or more of the parity bits of the received message was bad. If VALIDITY GOOD indicator 48 is lit, it indicates that the validity bits of the received message was good, while if BAD indicator 49 is lit, it indicates that one or both of the validity bits of the received message was bad.

Pressing a BAD data indicator 34, 39, 41, 43, 46 or 49, clears bad and causes a GOOD indicator 35, 38, 40, 42, 45 or 48, correspondingly, to light.

All failure switches (AOB 50, RF 51, LABEL 52, PARITY 53, VALIDITY 54, and COMP 55) are equipped with alarm options NORMAL and LATCH. In the LATCH option, any data mismatch will set the BAD indicator until it is reset by depressing the indicator. In the NORMAL option, a data mismatch will cause the BAD match indicator to turn on and then go off as soon as a good match is detected.

In order to interpret the indicators, SINS must be operating in the navigate mode and supplying data to the AN/SSW-1D and the AN/SRC-40. When operating in the CABLE ONLY mode, the RF data monitor is of no interest, it may indicate good or bad. Similarly, when operating in the RF ONLY mode, the AOB data monitor indicator is of no interest. Also, if both cable and RF data are not being received by the test set, the COMP data monitor is of no interest. When the test set is on-line monitoring real SINS data, there will be a periodic blinking of the LABEL, PARITY and VALIDITY DATA MONITOR indicators (approximately once every 3.5 sec). This is a normal condition caused by groups of zero messages and certain test messages interspersed within the data messages, that do not fully conform with the required data word format. The blinking of those indicators should not cause concern, unless accompanied by a bad indication of the AOB and/or RF data monitor lights. All data monitor lights and MESSAGE lamps may be tested by setting the ILLUM dial 13 to LAMP TEST.

SUBLABEL switch 56 enables manual selection of a particular sublabel message for MESSAGE display. AIRCRAFT ADDRESS switch 57 enables manual selection of a particular aircraft address. Message lamps will display only messages directed to the selected aircraft address. WAYPT NO. switch 58 enables manual selection of particular waypoint numbered message for MESSAGE display.

When DISPLAY dial 59 is on OFF, power is removed from the MESSAGE display lamps 28; when on UPDATE, it enables MESSAGE lamps 28 to continuously display the selected sublabel message; and when on HOLD, it enables the MESSAGE lamps 28 to display and hold the last data received prior to setting the switch to HOLD. The MESSAGE lamp 28 display the selected message. In the preferred embodiment, a 42-bit message is used, so there are 42 message lamps employed representing bits 28 thru 69 of the message. When a lamp lights, it indicates that the corresponding bit of the message is a logical 1.

There are eight different alignment messages (latitude, longitude, velocity north-south, velocity east-west, velocity total, ship's attitude data of roll, pitch and heading), denoted by sublabels, which the aircraft must receive, validate and accept to properly allign its INS. Each quantity must be transmitted at certain minimum update rates established by NAVAIR or the INS will fail to align and a "missed message" indicator will be set. The SNAIAS Digital Data Test Set monitors to ensure that each alignment sublabel is updated at its required update rate with a good message.

The requirement for a message to be considered good, is, in the preferred embodiment, but not limited thereto, that it meet the following conditions for a 42 bit message that encompasses Bits 28–69:

1. Proper Label-label $31_{10}$ ($11111_2$) must be present in bit locations 28–32.
2. Proper Parity:
Odd Parity over bits 18–33
Even Parity over bits 34–50
Even Parity over bits 51–67
Directional bit (bit 27) = 0
3. Proper validity bit — both validity bits (68 and 69) = 1

Should it be desirable for reasons such as systems troubleshooting, any of the above conditions may be overriden by use of override switches.

A complete waypoint consists of the reception of two sublabels (the sublabel for longitude and the sublabel for latitude). Each waypoint is directed to a particular aircraft via an aircraft address (Bits 14–26) and is identified by a waypoint number (Bits 63–66). Repetition of any given waypoint should occur at least once each 16 seconds. The SNAIAS Test Set will monitor to ensure that each waypoint sublabel is repeated at least once each 16 seconds. Each sublabel must be good to count towards achieving the required update rate. In order to be considered good; it must meet the following conditions:

1. Proper label - same as align.
2. Proper parity - same as align.
3. Validity bits do not apply to waypoint messages and are therefore not checked for waypoint messages.

In addition, options also exist to require that for the sublabel to be good, it must be directed to a particular address and be designated by a particular waypoint number. These options make it possible to ensure that any particular piece of data directed toward any aircraft is being properly transmitted. As in the align mode, any of the conditions above may be overridden by the use of override switches. Data-source options are the same for waypoint monitoring as for align monitoring.

When the TEST MESSAGE MSC CLK dial 60 is on MANUAL, it enables the operator to manually clock in the selected test message, one bit at a time, with the CLK pushbutton switch 61. When dial 60 is on OFF, it inhibits internal test messages and when on AUTO, causes the test set to monitor a selected test message automatically, at the normal message rate, using an internal clock. TRANS switch 62 enables the operator to transfer the manually clocked test message into the display. CLEAR switch 63 enables the operator to clear the working register prior to clocking in a test message.

A wide variety of internally stored test messages are provided for the purpose of checking out the internal operation of the test set for ease of maintainability. These test messages are also made available at the test point panel with the proper voltage levels required to modulate an AN/SRC-40 or SM-511 transmitter or the like, in order to verify operation of all RF components including the transmitters.

In the preferred embodiment, when MSG TYPE dial 64 is set on:

AG, it causes a good alignment message (all sublabels are present at the required rate) to be internally generated;

ANG, it causes a bad alignment message (each message has bad label, parity and validity or with one sublabel missing) to be internally generated;

WG, it causes a good waypoint message (both sublabels are present at the required rate) to be internally generated;

WNG, it causes a bad waypoint message (all messages have bad label, parity, address and waypoint number) to be internally generated;

AUX 1, it enables an abbreviated test message including sync burst to be generated automatically or manually;

AUX 2, it enables an alternate pattern of two highs, two lows (used manually to check the MATCH circuits);

AUX 3, it enables a parity pattern message for manually testing CHECK circuits;

AUX 4, it enables a sublabel pattern message for testing update counters to be internally generated; and AUX 5, is used in conjunction with AUX 4.

AUX 6 is not used.

The first four messages listed above are usually generated automatically. The auxiliary messages are generated manually by using the CLR, CLK and TRANS pushbutton switches 63, 61 and 62.

Numerous TEST POINTS 65 enable the operator to monitor internal performance of the test set using test equipment. TEST POINTS 65 may also be used to provide data and external sync pulses to an oscilloscope for actually observing the pulse waveshapes in detail should this be desired.

CIRCUITRY

The Digital Data Test Set (DDTS) monitors the navigation message (alignment and waypoint), which is either hardwired or transmitted by a UHF transmitter, to aircraft preparing for a mission. The test set can monitor the cable data, the transmitted RF data and can indicate if the data is adequate for updating the aircraft. The test set can compare the two data signals and indicate if they are identical. When trouble is detected, the test set can display a particular sublabel message and, in a waypoint mode, display only one waypoint number message directed to a particular aircraft address. The test set can monitor and display the status of the label, parity and validity portion of each message. A built-in test message generator can produce messages for check out of the test set itself. The circuitry in the DDTS can be divided into five categories: power distribution, display, data check, timing and message simulator, in the drawings represented as P,D,C,T and M respectively.

POWER DISTRIBUTION

Figure 2:
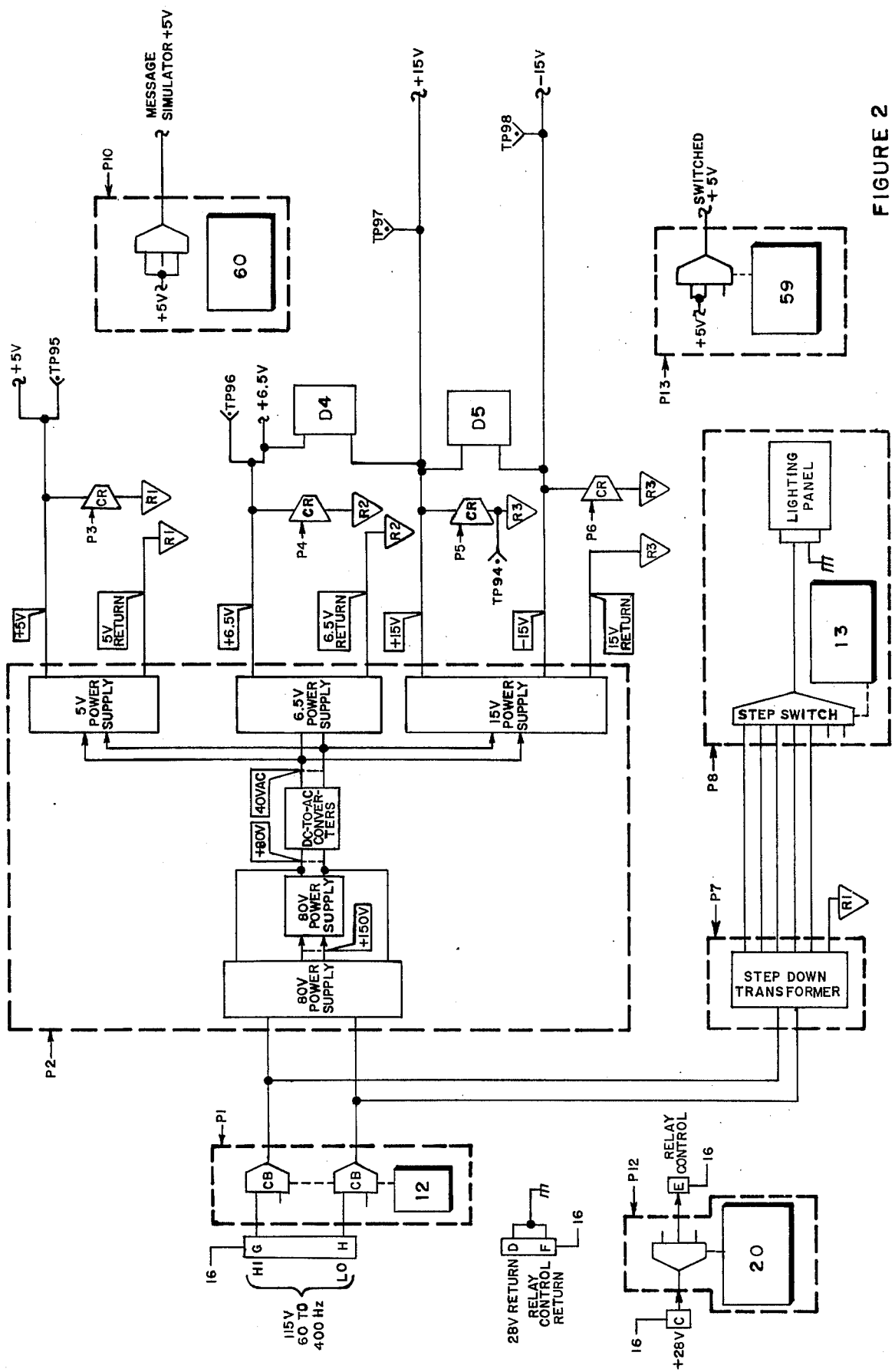
FIG.2 is a schematic of the power circuitry.

The schematic of the power distribution circuitry is shown in FIG. 2. 115VAC, 60 to 400Hz power enters the test set through the input jack 16 at pins 16G and 16H. When POWER switch 12 is set to ON, the power is supplied to the power supply P2 and stepdown transformer P7 through circuit breakers P1. If a short circuit develops in the test set, circuit breakers P1 will trip. The power supply P2 produces regulated, filtered +5V, +6.5V, and +15V power. Although eac-supply has its separate return lead, all power supply returns $R_1$, $R_2$, $R_3$ and $R_4$, are common to the case, since each module is grounded to the case. Crowbars P3, P4, P5 and P6 provide overvoltage protection for the test set circuits. The various test set voltages may be read at the respective TEST POINTS, referred to in the drawings as TP. Stepdown transformer P7 provides five AC voltages to the ILLUM switch 13. The switch applies one of the voltages to the lighting panel, according to its position between the LO and HI settings.

The message simulator power switch P10 is part of the MSG CLK switch 60. When set to the MAN or AUTO position, it applies +5V power to the integrated circuits associated with the automatic message simulator. When set to OFF, the switch removes power, thereby lowering power dissipation.

Switch P12 is part of MODE switch 20. When +28V is applied to input 16C of jack 16, switch P12 applies +28V to energize the waypoint relay in the AOB when set to WAPT. When set to either of the other two positions, the RELAY CONTROL signal is zero volts, and the relay in the AOB is de-energized.

Switch P13 is the part of the DISPLAY switch 59, which provides SWITCHED +5V to the message lamps 28 and to the lamp drivers when switch 59 is set to UPDATE or HOLD. When set to the OFF position, the DISPLAY switch 59 removes the power to the lamps and drivers.

DISPLAY

The display circuitry regulates the main flow of information through the test set, from input to final indicators. The RF and CABLE DATA are shaped, aligned and gated to produce the DATA signal, which is the final serial digital signal. The DATA is converted into a 57 bit parallel data signal, which is processed by the data check circuitry. Bits 28 thru 69 of the message are displayed on the MESSAGE lamps 28. The three primary indicators of the DATA MONITOR group (AOB, RF and COMP) give a GO/NO-GO indication of the overall quality of the data. In the event that one of the primary indicators shows a fault, an alarm relay is provided, which may energize a remote alarm.

Figure 3B:
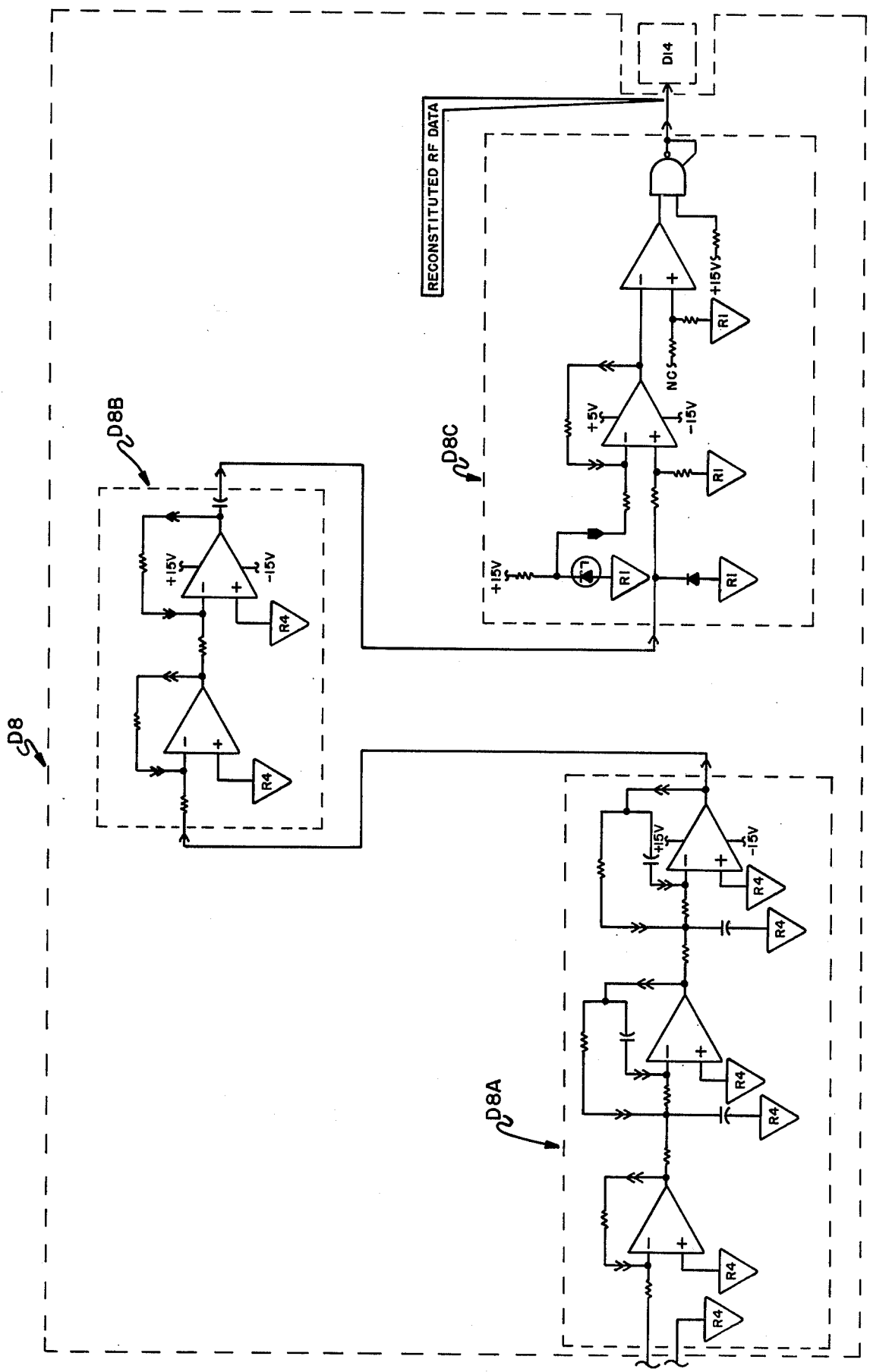
FIGS. 3A–7C are schematics of the display circuitry.

Referring to FIG. 3, RF input D1 provides a means to receive and, if necessary, attenuate the RF digital data signal. Antenna 15 is a quarter-wave antenna at 300mHz. It receives transmitted RF digital data when erected in a vertical position in a line of sight with the transmitting antenna. The step attenuator 36 provides a means to attenuate the received RF signal in 10dB increments. If the test set antenna is removed, the test set can be connected to the antenna jack of the AN/SRC-40, the AN/SRC-40 attenuators set to 80dB, and the RF ATTEN switch 36 set to 60, with the resultant signal level being approximately −100dBm. The frequency select switches D2 allow the operator to receive the frequency of the RF signal being transmitted. The switches (binary-coded-decimal stepper switches) produce a binary-coded-decimal, three place number which represents the setting of the FREQ switch 33. The +5V to the switch provides power to light the lamps which illuminate the switch face. The switch produces a ground (0), or an open-circuit (1).

Inverters D3 invert the outputs of the FREQ switches D2, to obtain the proper logic-level interface with the frequency synthesizer D4. The inverters have input and output resistors to provide pull-up. The frequency synthesizer D4 produces the local oscillator frequency for the receiver D5. The synthesizer D4 is a digitally-controlled oscillator that produces the INJECTION FREQUENCY, which is 70.0mHz below the frequency indicated by the FREQ switches D2. Output frequency is 230mHz plus the BCD value of the digital control signals in mHz.

Receiver D5 demonstrates the ATTENUATED RF signal into serial digital data - the RF DATA signal. The RF DATA output is a non-return-to zero −550mV p-p serial digital data signal. The receiver D5 uses phase lock techniques to demodulate the digital data. Coupling capacitor D6 AC couples the RF DATA signal to the RF data reconstitution circuit D8. Resistor D7 is a test point TP77 isolation resistor.

The data reconstitution circuit D8 converts the low level RF DATA signal into a +5V, OV signal. The three stage amplifier/filter D8A is an active low pass filter with a gain of 0.55, a cutoff frequency of 10kHz, and a roll-off of 80dB/decade. The amplifier/filter D8A passes the RF DATA signal, while sharply attenuating frequencies higher than the 5kHz sync burst. The two stage amplifier D8B is a linear amplifier with a voltage gain of 39. It amplifies the low-level output of amplifier/filter D8A sufficiently so that the positive portions of the signal will be greater than +5.5V. The logic level decoder D8C converts the non-return to zero processed RF DATA signal into a TTL-compatible signal. The combined decoder D8C consists of a reference voltage source, a limiter, a differential amplifier and a line decoder.

Source switch D9 provides a means to select the source of the digital data signal. When switch 32 is set to CABLE ONLY, a hi CABLE ONLY signal is provided, enabling the test set to monitor only the data from the cable input. The CABLE ONLY signal is lo for all other positions of the SOURCE switch 32. Similarly, when set to RF ONLY, only transmitted RF data is monitored, and when set to SEQ, the test set alternately samples cable and RF data.

Figure 4A:
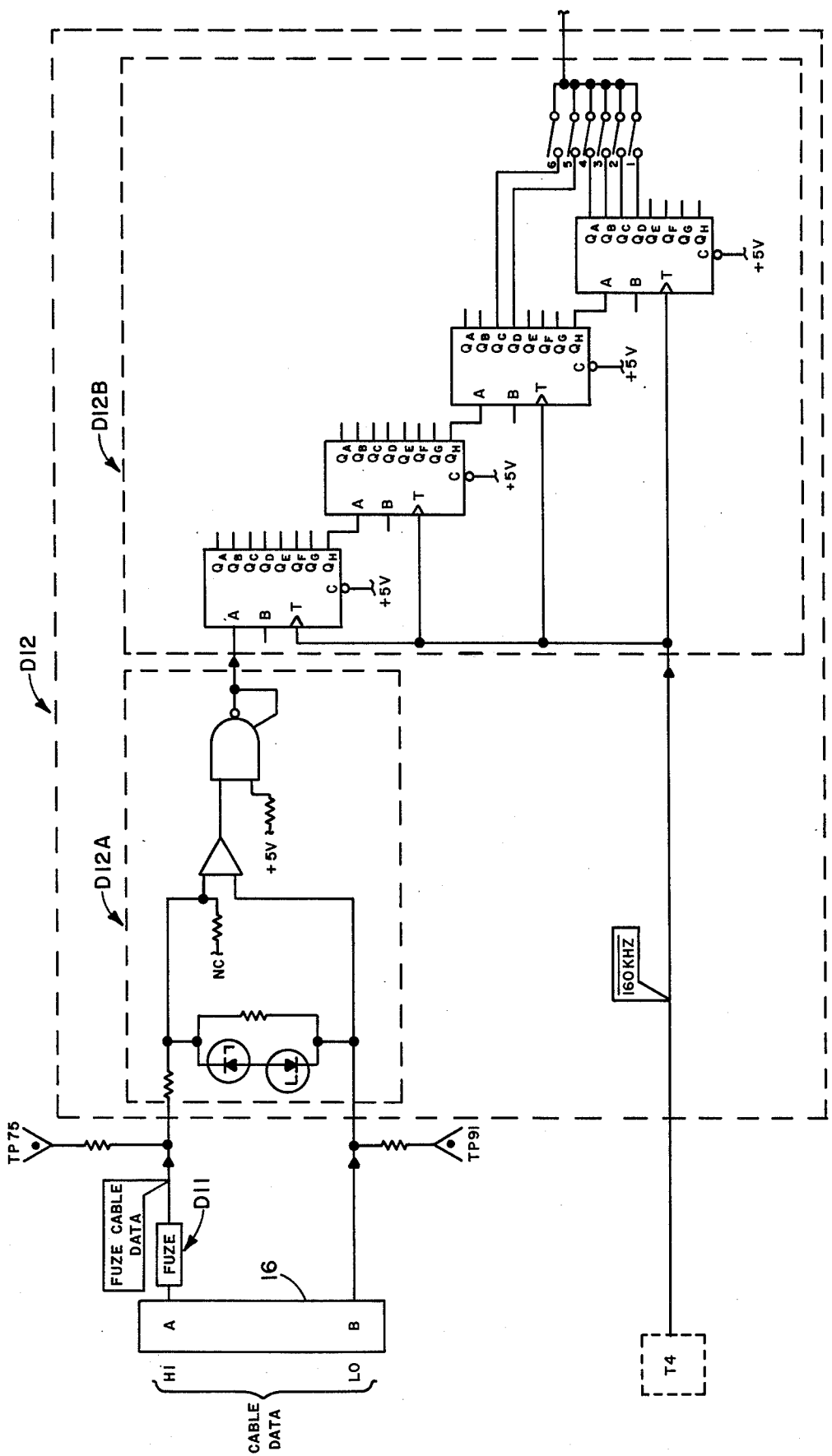
Figure 4B:
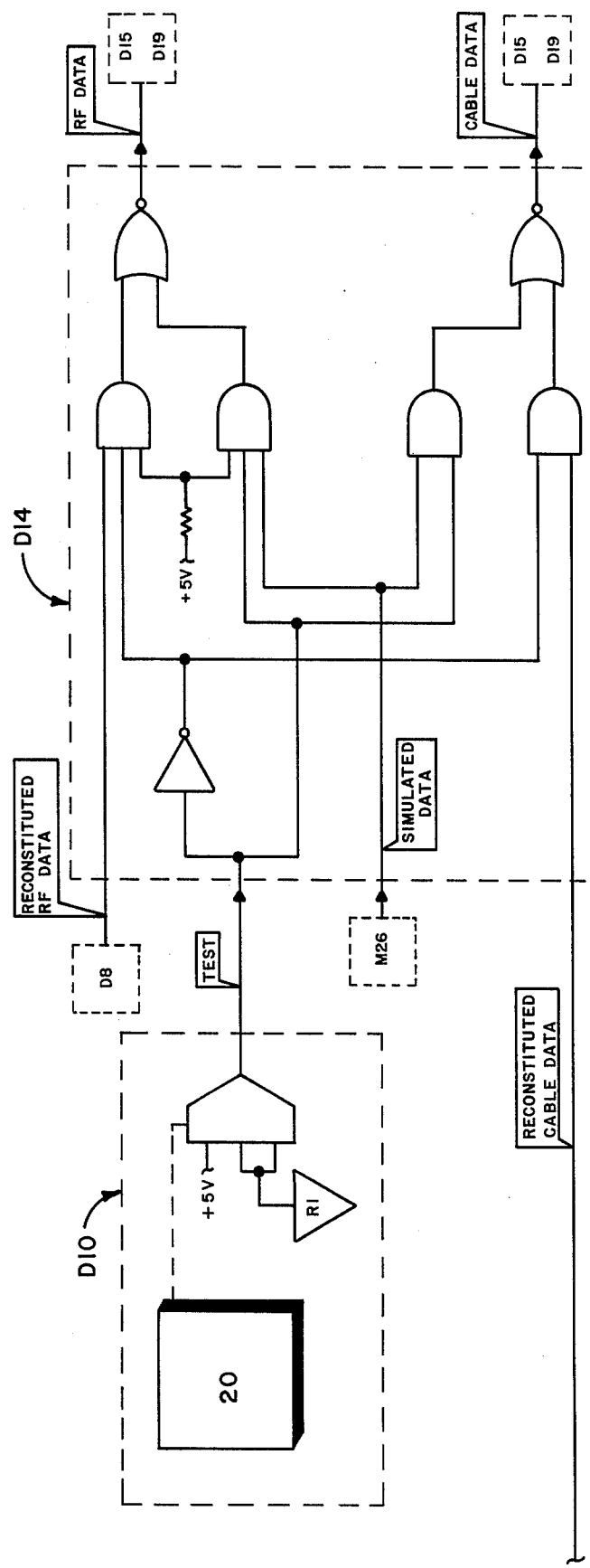

Switch D10 (FIG. 4) is part of MODE switch 20. When MODE switch 20 is set to TEST, the TEST signal is hi, which causes the test set to monitor the internally-generated test message. That is, the hi TEST signal causes the message gate D14 to substitute the SIMULATED DATA signal, simultaneously, for both the RECONSTITUTED RF and CABLE DATA signals. When switch 20 is set to either of the other two positions, the TEST signal is lo, and the test set monitors the cable or RF input data.

Fuse D11 protects the cable data reconstitution circuit D12 from accidental connection to 115VAC. Some AOB's have 115VAC on the pins currently assigned (pins A and B of INPUT jack 16) to carry the digital data signal.

The cable data reconstitution D12 converts the FUSED CABLE DATA to a +5V, OV logic signal, and delays it for alignment with the RECONSTITUTED RF DATA signal. The logic level decoder D12A converts the FUSED CABLE DATA non-return-to-zero signal into a TTL-compatible logic signal. The decoder D12A consists of a current limiting resistor an amplitude limiter and line receiver. The decoder D12A provides a logic-level interface, converting the ±5V signal to +5V, 0 V. The programmable time delay D12B provides selection of a delay in the cable signal that will cause the RECONSTITUTED RF and CABLE DATA signals to reach the data comparison gate D21A at the same time. The programmable time delay D12B uses a shift register to provide the time delay. Data is clocked through a 32 line shift register by the 160kHz clock signal. Outputs are available on 6 lines along the register, and a switch is provided to select the output with the time delay that will most nearly align the RECONSTITUTED CABLE DATA signal with the RECONSTITUTED RF DATA signal. Alignment is necessary to make sure that each bit of the RF signal reaches the data comparison circuit at the same time that the same bit of the cable signal arrives.

The message gate D14 provides a means to substitute a test message for the normal cable and RF signals. When in a test mode, the TEST signal is hi and the SIMULATED DATA signal is gated to both the RF DATA and CABLE DATA outputs. In other modes, the reconstituted data signals are gated through the message gate D14.

Figure 5A:
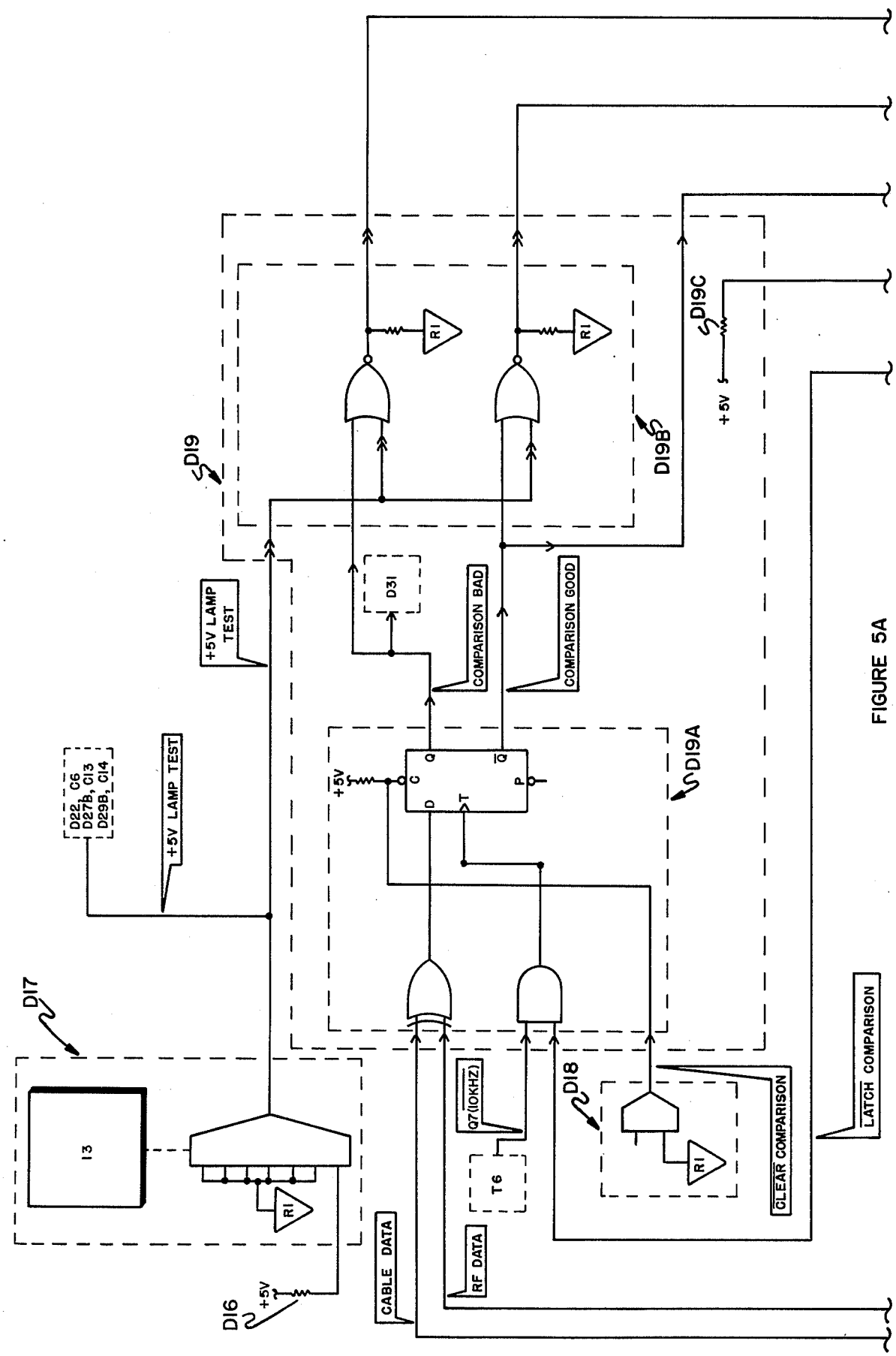
Figure 5B:
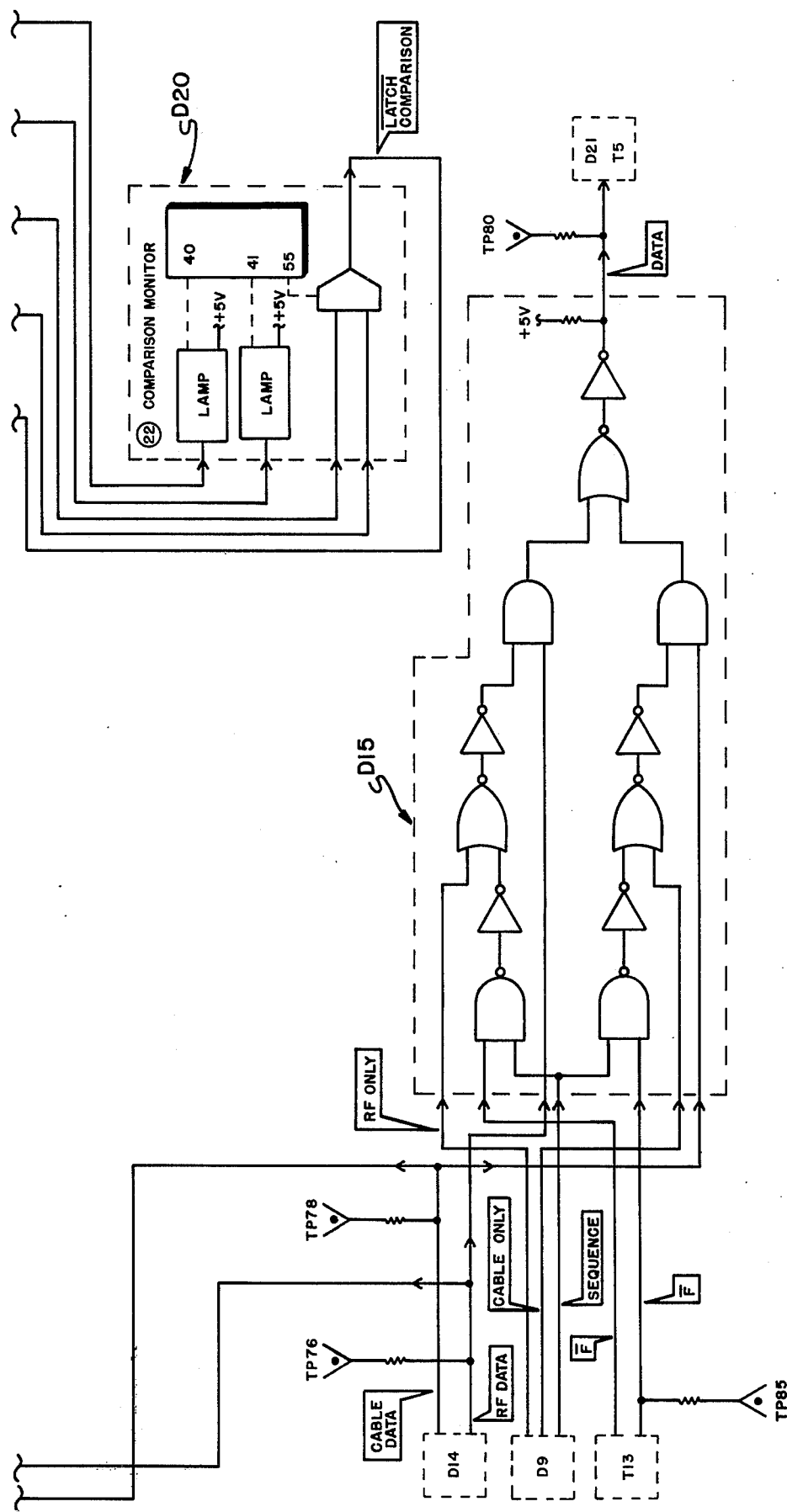

In FIG. 5, data select gates D15 select the DATA signal, for processing, from the RF DATA and/or CABLE DATA signals from message gate D14. When the SOURCE switch 32 is set to RF ONLY, the DATA signal is the RF DATA. When set to CABLE ONLY, DATA is the CABLE DATA signal. When set to SEQ, DATA is alternate samples of the two input data signals. F and F̄ are timing signals which are alternately hi for one sample period, 1 second in the alignment mode (1 second RF, 1 second CABLE DATA) and 16 seconds in the waypoint mode (16 seconds RF, 16 seconds CABLE DATA). In sequential operation, F enables sampling of the CABLE DATA and F̄ enables sampling of the RF DATA. The DATA output of the data select gates D15 is the serial digital data signal which is processed by the test set.

Resistor D16 is a pull-up resistor for the +5V LAMP TEST signal. Step switch D17 is part of the ILLUM switch 13. Switch D17 provides a hi logic level to MESSAGE and DATA MONITOR lamp drivers when switch 13 is set to LAMP TEST. The drivers then turn on all indicator lamps, enabling the operator to inspect for faulty lamps. When set to any other position, the +5V LAMP TEST signal is lo, enabling all lamp drivers to operate normally.

Pushbutton switch D18 is located in the BAD COMP DATA MONITOR lamp socket 41. Pressing the lamp lens cap closes the contacts and puts a lo on the CLEAR COMPARISON signal. The momentary lo resets the data comparison gate D19A. The clear feature is primarily used in conjunction with the latch mode of operation, to reset the COMP indicators to good if a bad comparison has been detected.

The comparison check D19 checks each bit of the RF DATA signal with each bit of the CABLE DATA signal, to determine if both sources are furnishing the same data. The data comparison gate D19A performs the bit-for-bit comparison of the RF and CABLE DATA signals. The alignment of the programmable time delay D12B ensures that the two data signals will reach the gate at the same time. Q7 is a 10kHz square-wave that clocks the comparison for each bit. The two outputs are COMPARISON GOOD, which is hi if the data are identical and COMPARISON BAD, which is hi if the data differ. In a latch mode, a lo on the COMPARISON GOOD signal is fed back to the input of the comparison gate D19A via the COMP switch D20. The lo will prevent any further checks until manually cleared by pressing the BAD lamp, or until the COMP switch is set to NORM. The two outputs of the gate are applied to the display drivers D19B, where they are inverted to light the COMP DATA MONITOR lamps. The +5V LAMP TEST signal enables simultaneous lighting of both lamps when the ILLUM switch 13 is set to LAMP TEST since both outputs of the display drivers D19B are lo. Pull-up resistor D19C supplies +5V to the NORM contact of the COMP DATA MONITOR switch D20.

The comparison monitor D20 provides a front panel display of the status of the data comparison. The COMP indicators are of the primary group in that if the BAD lamp limits, something is wrong with one, or both, data sources. Due to the bit-for-bit comparison check, the lamps will flicker if the comparison is bad. Of course, in order for the comparison to be valid, both data sources must be activated. A switch provides a means to latch the lamps in the BAD state if a single bad comparison is detected. If, when the switch is set to LATCH, the COMPARISON GOOD signal goes lo, the LATCH COMPARISON signal will inhibit any more comparisons, and the BAD lamp will be brightly lit. The clear feature may be employed to eliminate the latched bad comparison, by pressing the BAD lamp.

Figure 6A:
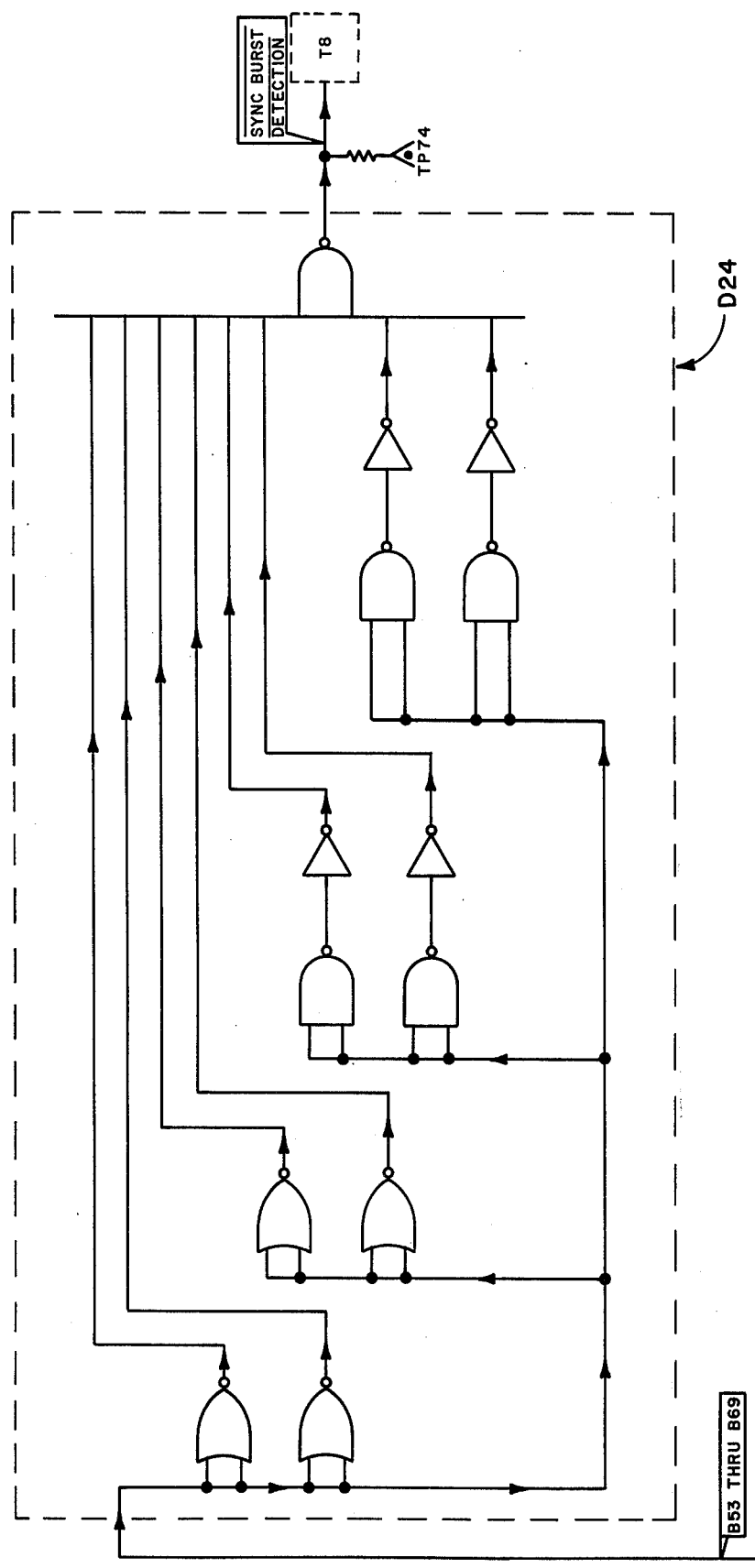
Figure 6B:
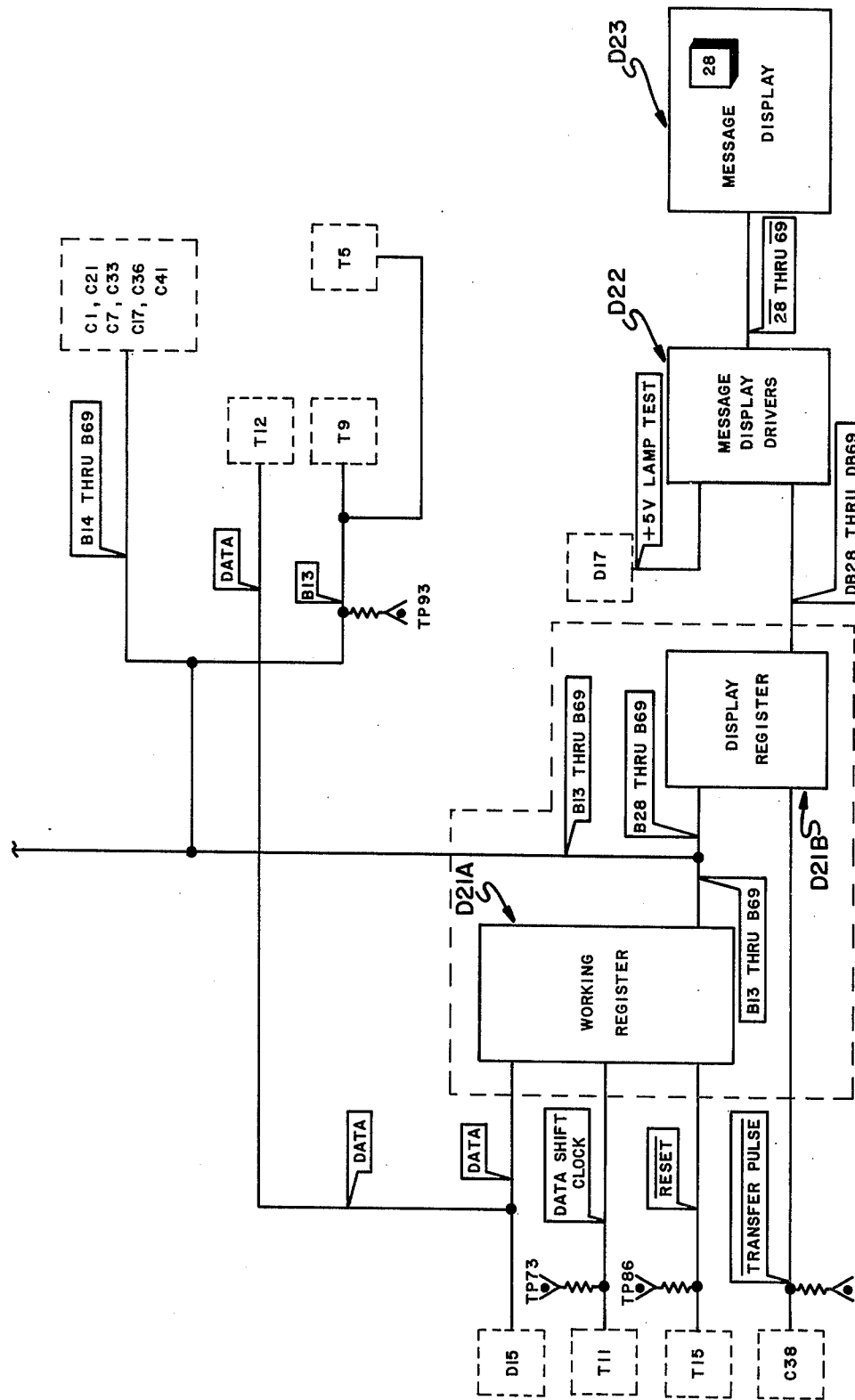

The message register D21 (FIG. 6) consists of a working register D21A and display register D21B. Data enters the working register D21A in serial form, and exits as 57 parallel lines, each containing one bit of the message. Each of the lines from bits 28 to 69 are connected to the data inputs of the display register D21B (each output is designated as BX where X represents the bit number of the transmitted message). When each data bit of various parts of the message matches those selected by the data select gates D15, a TRANSFER PULSE is produced. The TRANSFER PULSE causes the inputs to the display register D21B to be transferred to the outputs which produce the display on the MESSAGE lamps 28.

The working register D21A is a 57-bit serial-in/parallel-out shift register. It converts the DATA signal in 57 parallel digital lines -one for each active bit of the message- for data evaluation. The operation of the register D21A is cyclic with each message. Conversion of each message occurs in a cyclic manner, each cycle consisting of four periods, with the following salient features:

1. Time prior to sync burst. The DATA SHIFT CLOCK signal is a 10kHz square wave. No data is present and the register is waiting for the sync burst pattern.

2. Time during and shortly after sync burst. The sync burst pattern, a 5kHz burst of eight alternate highs and lows, is shifted down the register, starting at bit 69, until the first hi reaches the bit 54 slot. Clocking takes place at 10kHz. The sync burst detector D24 recognizes the sync burst, and produces the SYNC BURST DETECTION pulse. The RESET signal goes lo for 6.25 micro seconds, which clears the sync burst pattern out of the working register D21A. At the same time, the DATA SHIFT CLOCK frequency changes from 10kHz to 5kHz. The register is then ready to shift in the message.

3. Time during message shifting. The first logical 1 of the message to enter the register after sync burst is bit 13. It is always hi. The message is shifted through the register at a 2.5kHz rate, until bit 13 reaches the bit 13 (B13) slot.

4. When bit 13 reaches the bit 13 slot, all of the rest of message is in the correct position along the register. The hi bit 13 causes the timing to produce the END OF MESSAGE pulse. The timing also produces another lo $\overline{\text{RESET}}$ signal, which clears the message out of the register. The DATA SHIFT CLOCK frequency returns to 10kHz, and the cycle is completed. Data evaluation takes place only at a point in time coincident with the END OF MESSAGE pulse. The $\overline{\text{RESET}}$ signal clears the message shortly thereafter, but not until after the evaluation has taken place.

The display register D21B is a 42-bit storage register. When $\overline{\text{TRANSFER PULSE}}$ goes lo, the outputs for bits 28 thru 69 are transferred from the inputs to the outputs of the internal storage registers. $\overline{\text{TRANSFER PULSE}}$ is coincident with the end of the message that is selected by the data select switches D15. The display register D21B provides a means to store the message for display by the message lamps 28.

The message drivers D22 provide current-sinking drive to illuminate the 42 message lamps 28 according to the data held in the display register. One driver is used for each lamp; each lamp representing one bit of the message from B28 to B69. The drivers are 2-input NOR gates, one input to all gates is the +5V Lamp Test signal. The other input is one bit of the message. The output of each gate contains a resistor to ground which keeps the lamp filament warm, but not lit, to prevent premature failure due to thermal shock. When the ILLUM switch 13 is set to LAMP TEST, the lamp test signal is hi and all 42 outputs are lo, lighting all message lamps 28. In normal operation, the +5V LAMP TEST signal is lo, and the output state of each driver is determined by the state of one particular bit of the message. Power to the driver gates, and also to the lamps, is applied when the DISPLAY switch 59 is set to UPDATE or HOLD. When set to OFF, the DISPLAY switch 59 removes power from the drivers and lamps to reduce power dissipation.

The message display D23 displays bits 28 thru 69 of the selected sublabel message on its 42 message lamps 28. When DISPLAY switch 59 is set to UPDATE, the lamps display the selected sublabel message. When set to HOLD, they display the last data prior to setting the switch to HOLD. A lit lamp indicates that the corresponding bit of the message is a logical ONE.

The sync burst detector detects the sync burst pattern at the beginning of a message, and produces the $\overline{\text{SYNC BURST DETECTION}}$ pulse which marks the beginning of the message. The sync burst pattern is eight alternate hi and lo pulses with a width of 100 microseconds each. The detector uses four 2-input NOR gates to detect the lows and 2-input AND gates to detect the highs. Each NOR gate has a pair of the odd-numbered bits for inputs while each AND gate has a pair of even-numbered bits for inputs. The 8-input NAND gate will have a lo output when all inputs are hi, thus generating the $\overline{\text{SYNC BURST DETECTION}}$ pulse. All inputs will be hi when the odd-numbered bits from bit 53 to bit 67 are lo, and the even-numbered bits from bit 54 to bit 68 are hi. This condition is met only during the sync burst.

Figure 7A:
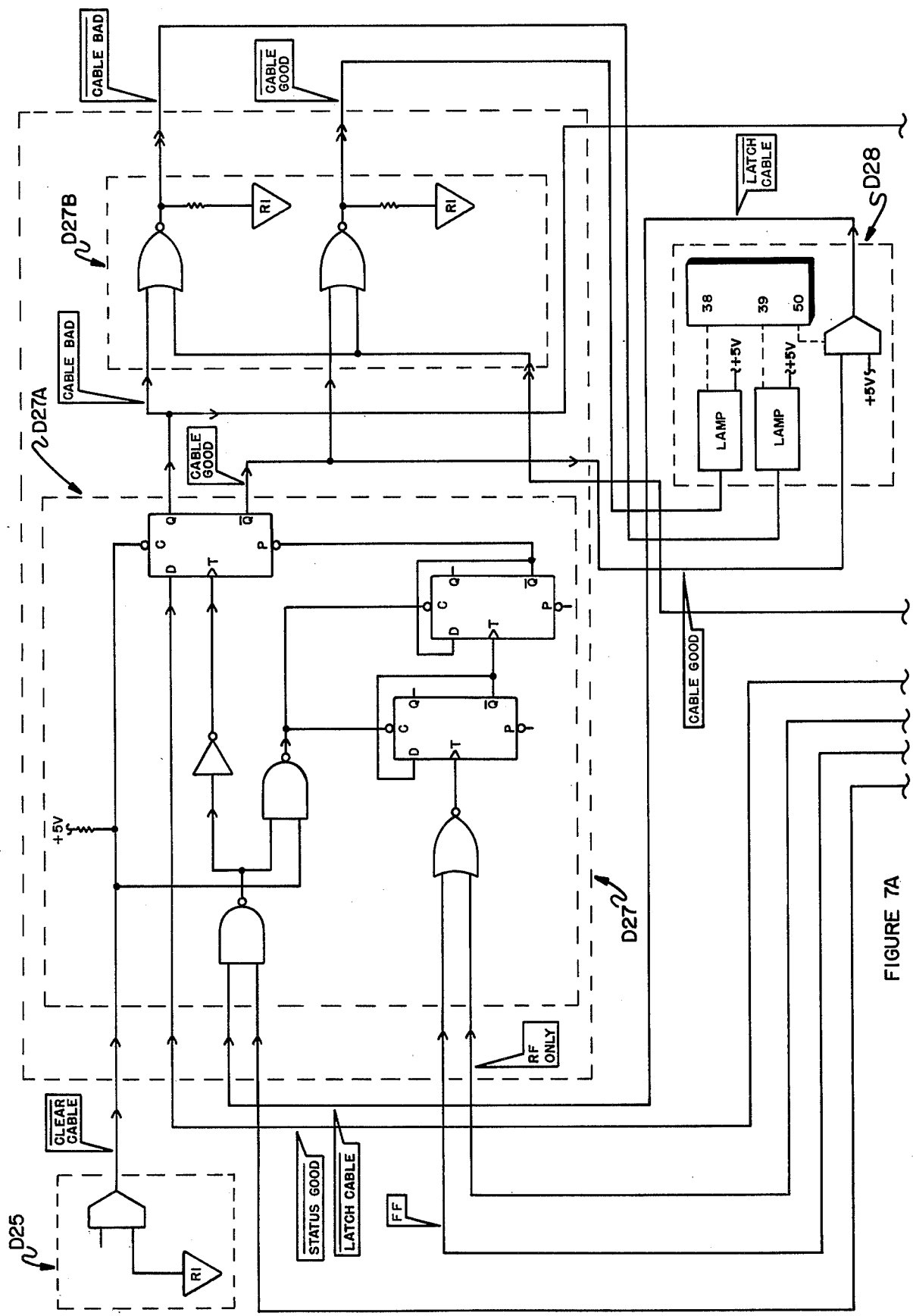
Figure 7B:
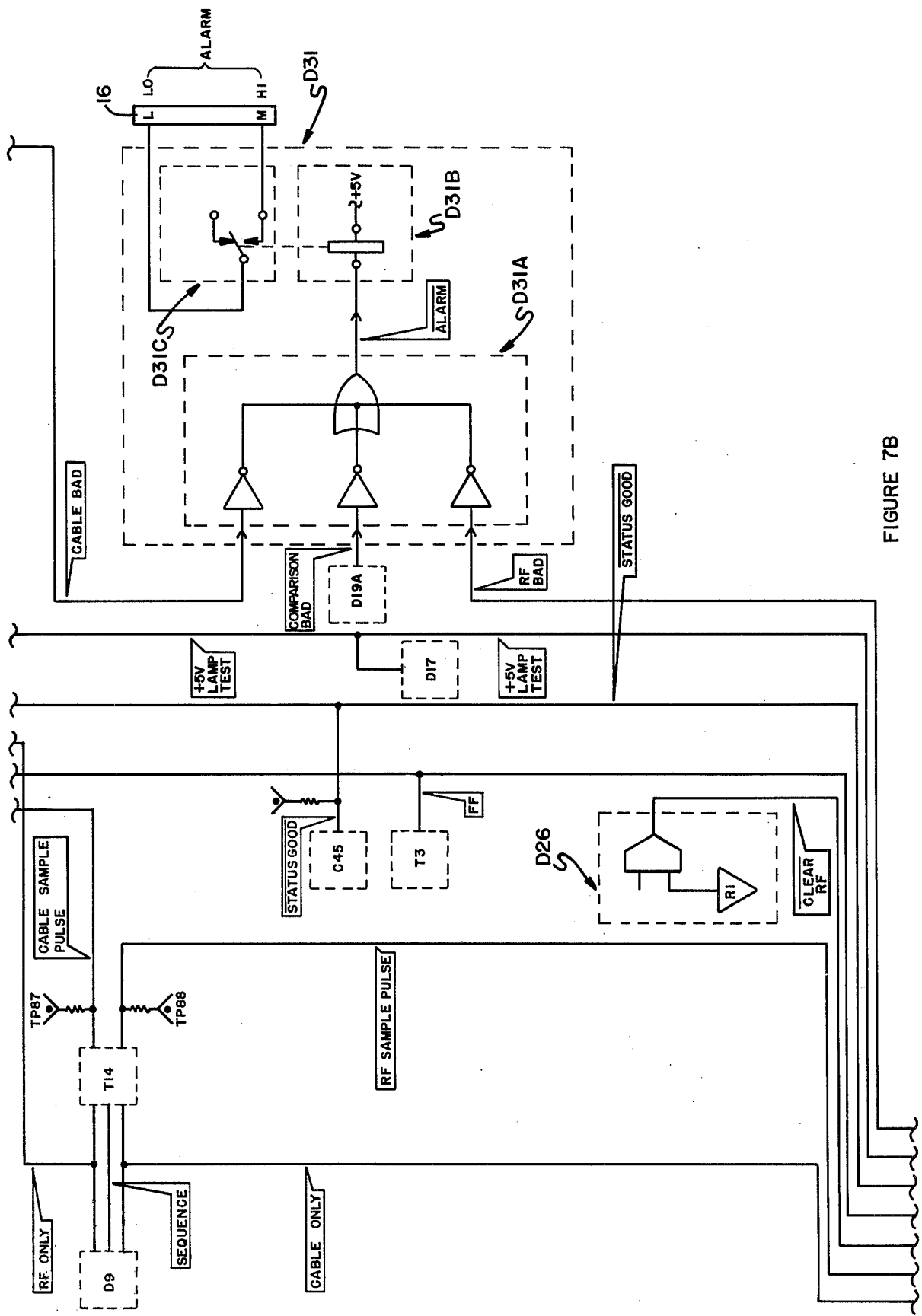
Figure 7C:
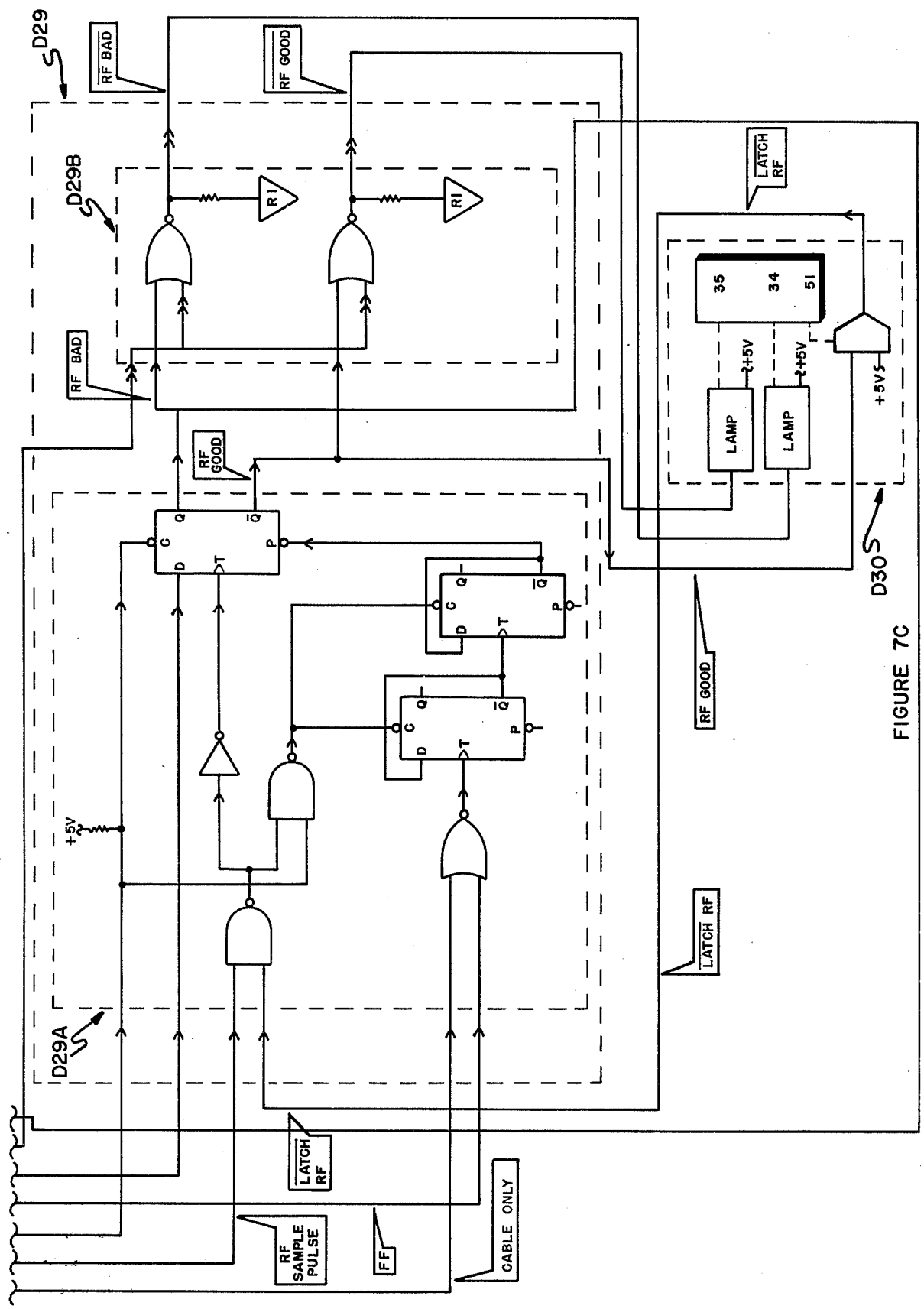
Figure 8A:
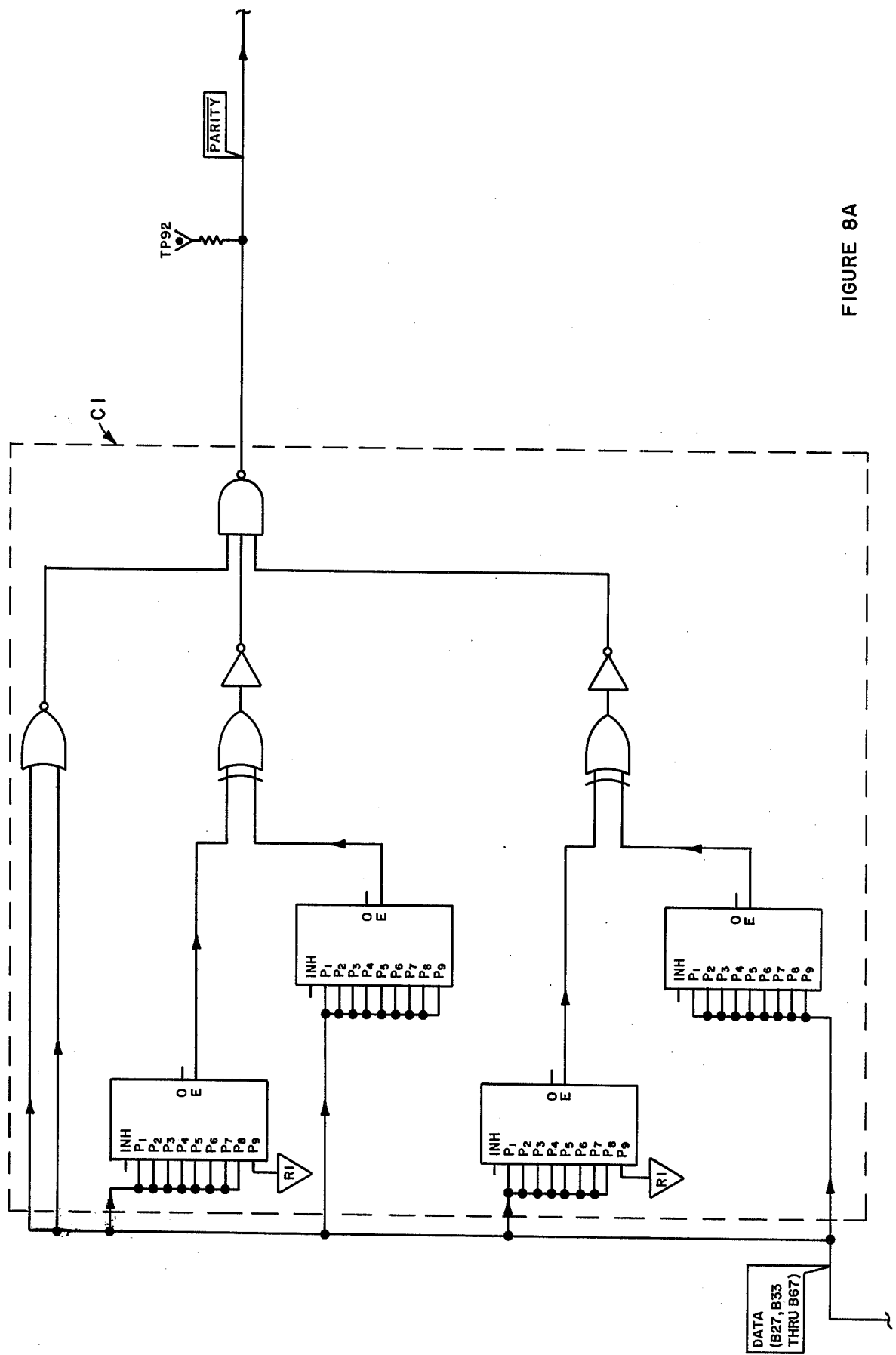
FIGS. 8A–11C are schematics of the data check circuitry.
Figure 8B:
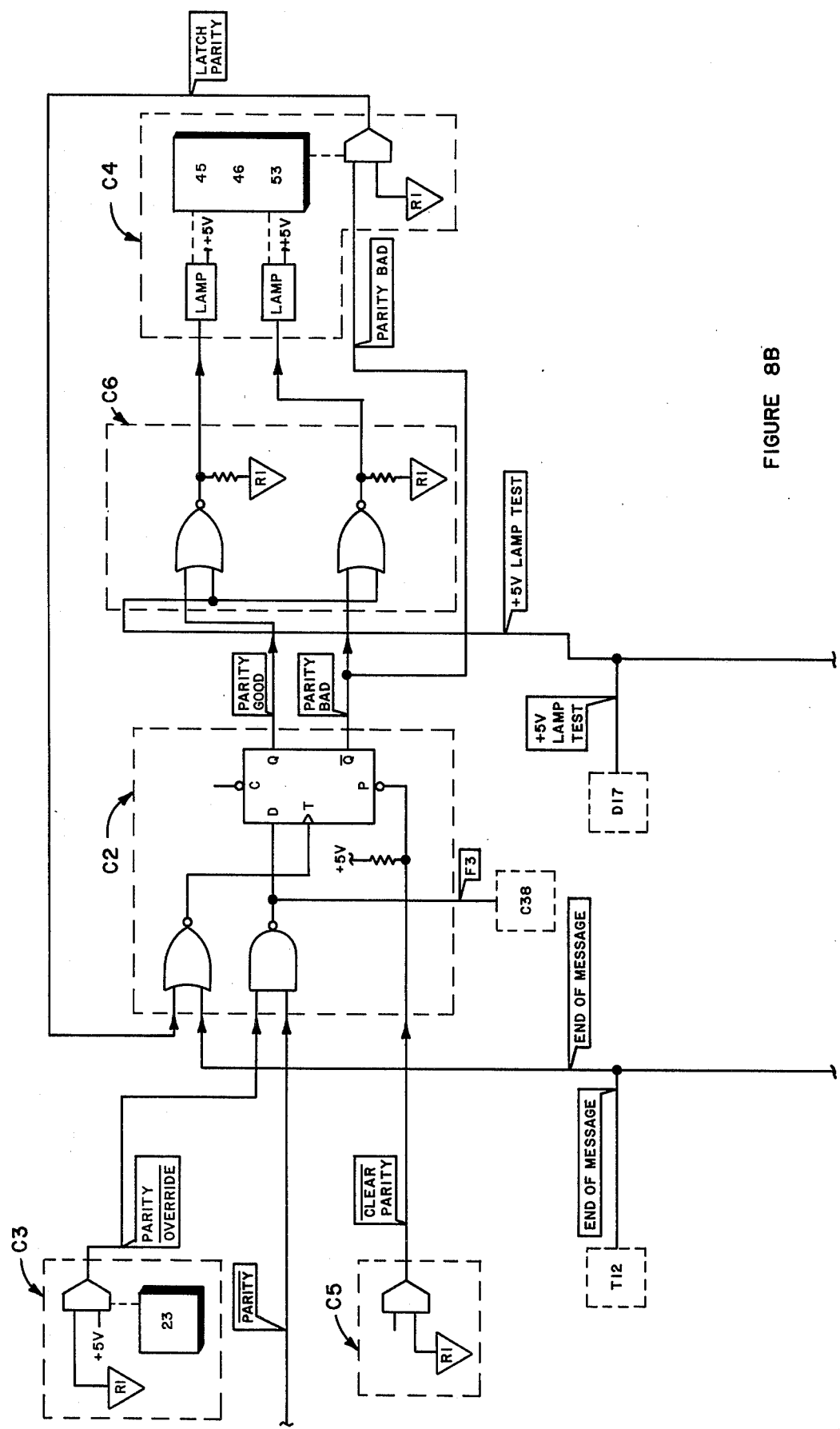
Figure 8C:
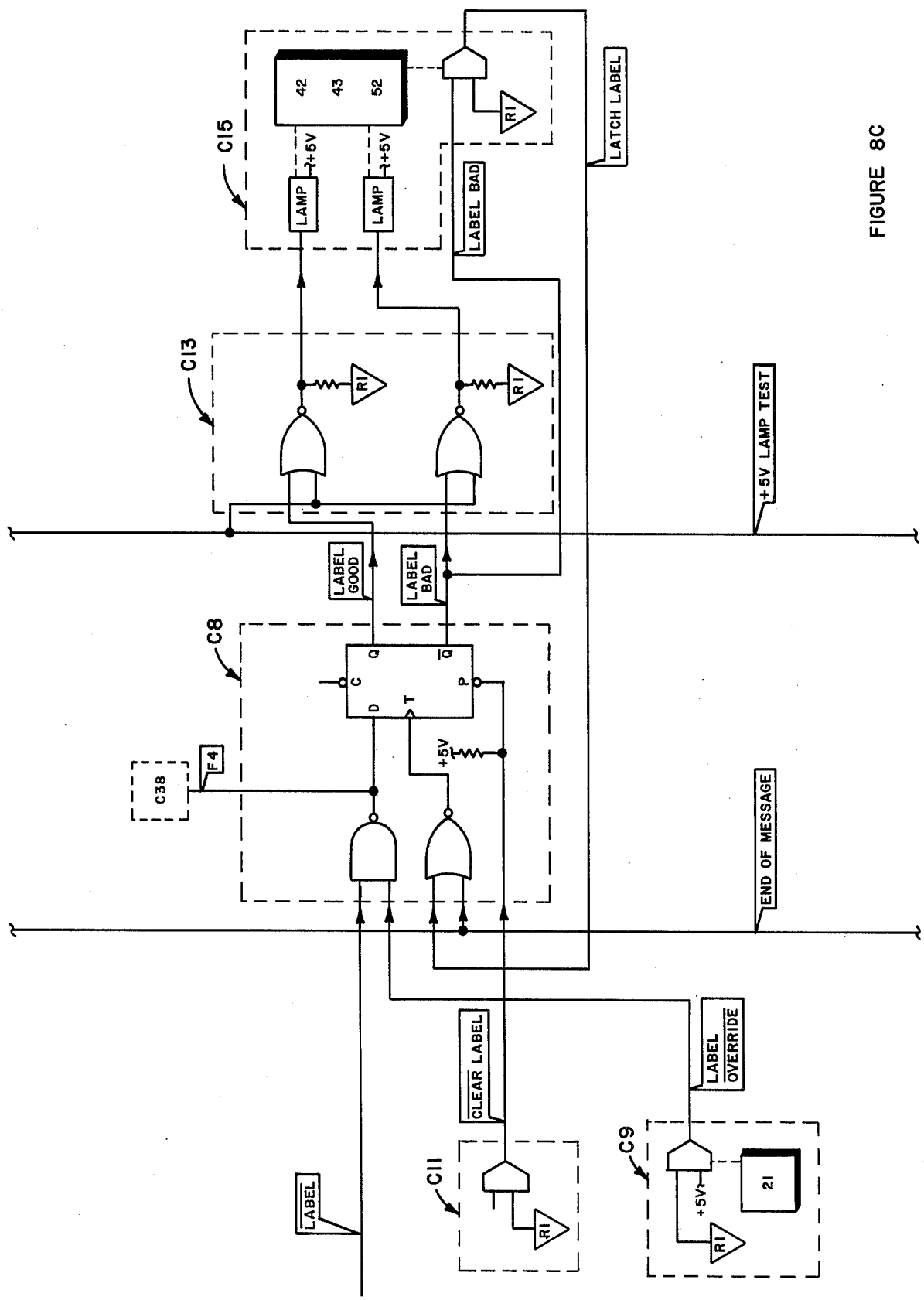
Figure 8D:
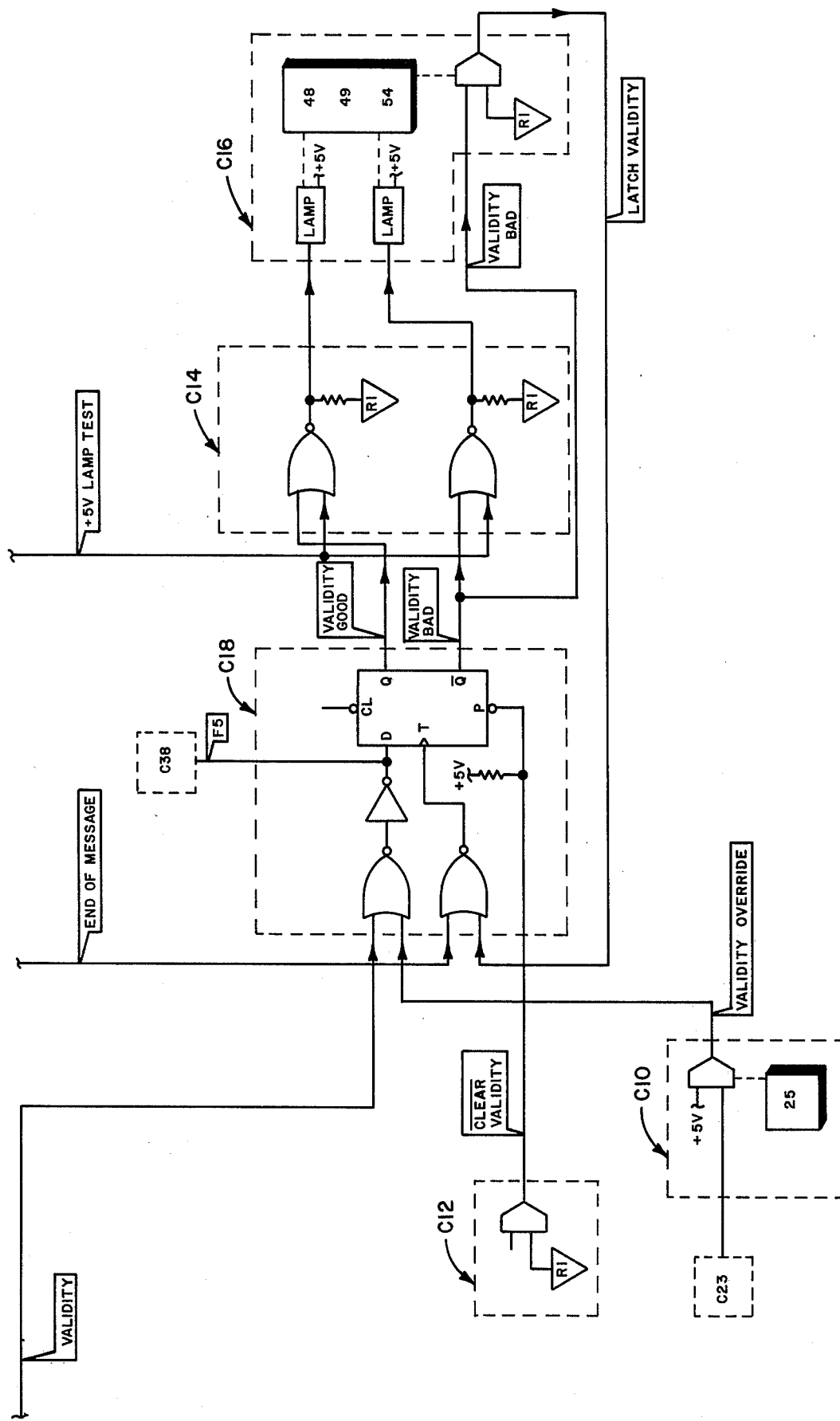
Figure 8E:
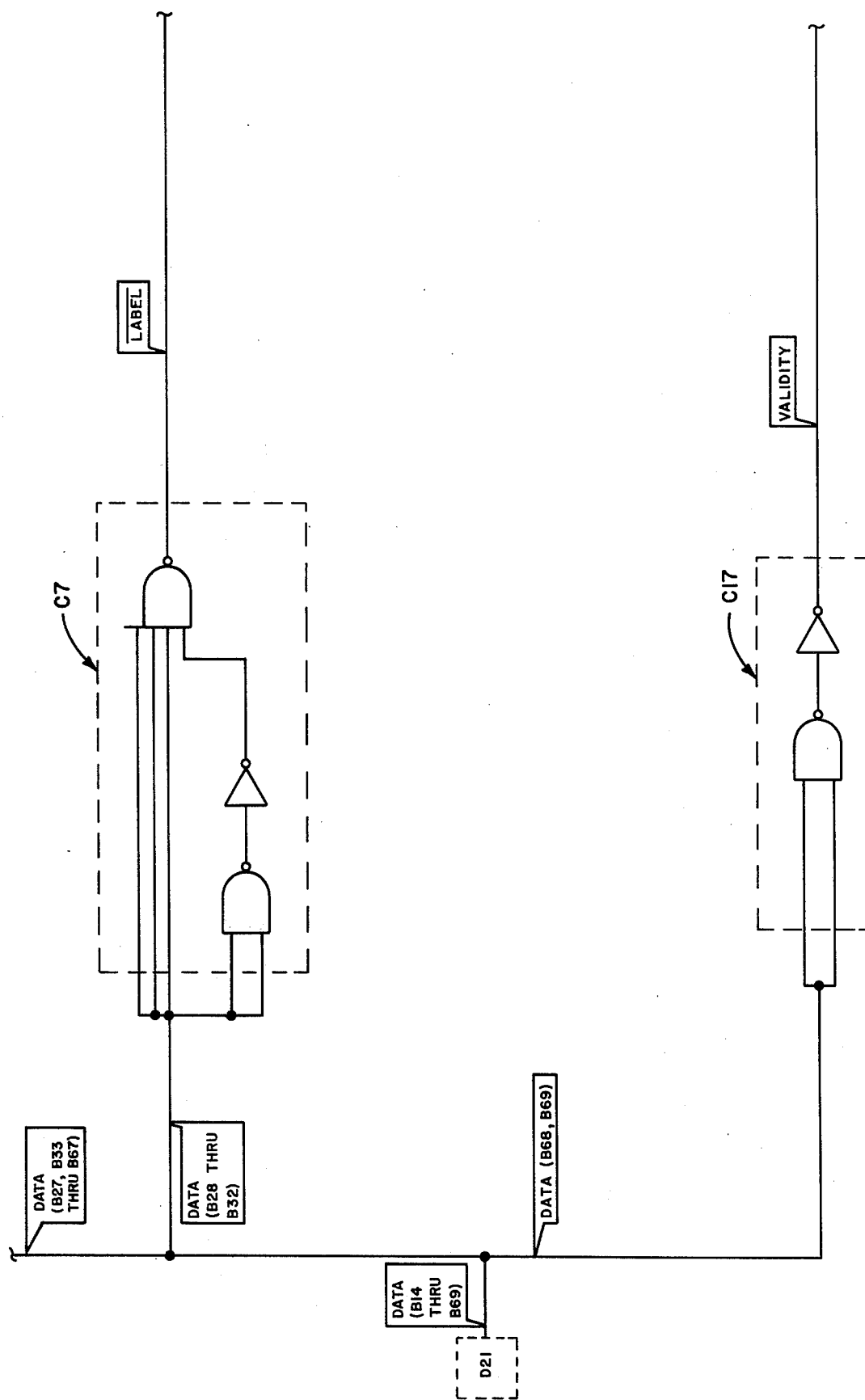

Pushbutton switch D25 (FIG. 7) is part of the AOB data check circuit while pushbutton switch D26 is part of the RF data check circuit. The switches are located in the lamp sockets of the AOB BAD DATA MONITOR and RF BAD DATA MONITOR respectively. Their operation is identical to that of pushbutton switch D18.

The cable check D27 consists of the cable data evaluation D27A and the cable status display driver D27B. The cable data evaluation produces two outputs that indicate the adequacy of the cable data for the previous sample period. CABLE GOOD is hi if the data was good, and CABLE BAD is hi if the data was bad. $\overline{\text{RF ONLY}}$, which is lo if the SOURCE switch 32 is set to CABLE ONLY or SEQ, enables the cable data evaluation D27A. At the end of the sample period (one second in alignment, sixteen seconds in waypoint), the CABLE SAMPLE PULSE interrogates the evaluation circuit. If the $\overline{\text{STATUS GOOD}}$ signal is lo, CABLE GOOD will be hi, but if $\overline{\text{STATUS GOOD}}$ is hi, CABLE BAD will be hi. The $\overline{\text{STATUS GOOD}}$ signal is lo at the end of the sample period only if the alignment data is sufficient to align the aircraft inertial system. Thus, the outputs of the cable data evaluation circuit D27A are an overall indication of the adequacy of the data at the AOB. Like the comparison check circuit D19, the cable data evaluation D27A may operate in the latch mode and be manually cleared by depressing switch D25. In the event that no data is present, the CABLE SAMPLE PULSE will not repeat. To avoid the possibility of a good indication when no data is present, the timing signal FF will clock the outputs to the bad state if two consecutive sample pulses are missed. The two outputs are applied to the cable status display driver D27B, which lights the AOB data monitor lamps D28. The +5V LAMP TEST signal will light both lamps when the ILLUM switch is set to LAMP TEST.

The cable monitor D28 provides a front panel indication of the status of the data at the AOB. The AOB indicators are of the primary group, in that if the BAD lamp is lit, the data at the AOB is insufficient for alignment or waypoint data insertion and corrective maintenance must be taken. The AOB lights, however, are of no consequence if the SOURCE switch 32 is set to RF ONLY. A switch provides a path to latch a bad indication if set to the LATCH position. In the latch mode, the lo CABLE GOOD signal is connected to the cable data evaluation input. If bad data is detected, the lo will prevent any further evaluation until the Bad lamp is pressed, or until the switch is set to NORM.

The operation of the RF check circuit D29 is identical to that of the cable check circuit D27. The RF data evaluation D29A is enabled by CABLE ONLY, which is lo when the SOURCE switch 32 is set to RF ONLY or SEQ. The RF status display driver D29B is identical in operation to the cable status display driver D27B. The operation of the RF monitor D30 is also identical to that of the cable monitor D28.

The alarm enabling circuit D31 energizes an external alarm, if connected, when any of the primary indicators show a fault. If any of the inputs to the alarm gate D31A is hi, the resultant lo output will energize the alarm relay solenoid D31B, and close the relay contacts D31C to provide a path to energize the alarm. Note that if the primary data monitor switches 50, 51 and 55 are set to LATCH, any bad data will energize the alarm and it will remain energized until the bad indication is manually cleared.

DATA CHECK

The data check circuitry evaluates the data by checking the contents of each message, and the content of the data as a whole. In order for data to be good, it must:

1. Have the correct label signature.
2. Have parity over the required range.
3. Have the correct validity signature.
4. Match the selected aircraft address (waypoint only).
5. Match the selected waypoint number (waypoint only).
6. Have the required number of all sublabels for a given sample period.

FIG. 8 shows the check circuits, which check the label, parity and validity of the message. The three check circuits are basically the same. Each has a recognition circuit which checks the message, and a display control circuit which allows various display modes. Each also has a display driver, which lights good or bad data monitor lamps. Each display control circuit has an output which is hi if the message passed the related check. The output may be forced hi by setting the associated CHECK switch to OVERRIDE.

The parity recognition circuit C1 produces a lo pulse coincident with the END OF MESSAGE pulse of the message has even parity over bits 34 thru 67 and has bits 27 and 33 lo. The 9-bit parity checkers are paired such that a hi is produced if the sum of all the bit inputs is an even number. Grounding one parity bit input forces one parity checker of each pair to check for even parity. The exclusive NOR gates have a hi output if there is even parity. The NOR gate used as a NAND gate requires that bits 27 and 33 be lo to produce a hi output. The NAND gate produces a lo output if all of the parity conditions are met. Many lo outputs will be produced, but only the one that occurs at the same time as the END OF MESSAGE pulse is evaluated.

The parity display control C2 stores the status of the parity check until the next end of message. The display control circuit has three modes of operation:

1. Normal operation when parity is checked and displayed after each message.
2. Latch operation when any single message with bad parity will produce a hi PARITY BAD output.
3. Override operation when F3 is hi, PARITY BAD is lo and the GOOD PARITY data monitor lamp is lit at all times.

Parity CHECK switch C3 provides a means to force the parity check circuits to indicate good parity, regardless of the parity of the data. When switch C3 is set to OVERRIDE, the OVERRIDE PARITY signal is lo, causing a constant hi to be applied to the D input of the flip flop in the parity display control C2. Each time the flip flop is clocked, the hi is transferred to the Q output. The F3 signal is always hi when the PARITY CHECK switch C3 is set to override.

The LATCH switch in the PARITY MONITOR C4 provides a means to continuously display a bad parity condition if one message checks bad. When the switch is set to LATCH, the PARITY BAD signal is connected, through the switch, to the LATCH PARITY signal line. If bad parity is detected, the PARITY BAD signal will go hi, locking out any future parity checks until the CLEAR feature of switch C5 is employed.

Pushbutton switch C5 is located in the BAD PARITY data monitor lamp socket. When BAD data has been latched, pressing the PARITY BAD data monitor lamp 46 will place a lo on the $\overline{\text{CLEAR PARITY}}$ signal. The lo presets the flip-flop of display control C2 to the PARITY GOOD state. Presetting the flip flop toggles the LATCH signal and enables the normal parity check to resume.

The parity display drivers C6 drive the parity data monitor lamps. A lo output will light the lamp. When the ILLUM switch 13 is set to LAMP TEST, the +5V LAMP TEST signal will cause both lamps to light.

Label recognition circuit C7 performs a check on the label portion of the message. A lo output is produced if bits 28 thru 32 are hi. A lo output indicates a good label check. The label display control C8 provides a means to latch, clear and override the normal label check. Its operation is identical to that of parity display control C2. LABEL CHECK switch C9 and VALIDITY CHECK switch C10 are identical in operation as PARITY CHECK switch C3. Similarly, pushbutton switches C11 and C12 are identical in operation to switch C5. Label display drivers C13 and validity display drivers C14 light the GOOD or BAD data monitor lamps for label and validity data respectively. The label monitor C15 displays the outcome of label check while the validity monitor displays the outcome of validity check.

Validity recognition C17 performs a check on the validity portion of the message. It produces a hi output if both inputs are hi. The hi output indicates a good validity check.

The validity display control C18 provides a means to latch, clear and override the normal validity check. Operation is the same as that of the parity display control C2, except that when VALIDITY CHECK switch C10 is set to OVERRIDE, the OVERRIDE VALIDITY signal is hi, and the D input of the flip flop has a constant hi input, which is decoded as good validity.

Figure 9A:
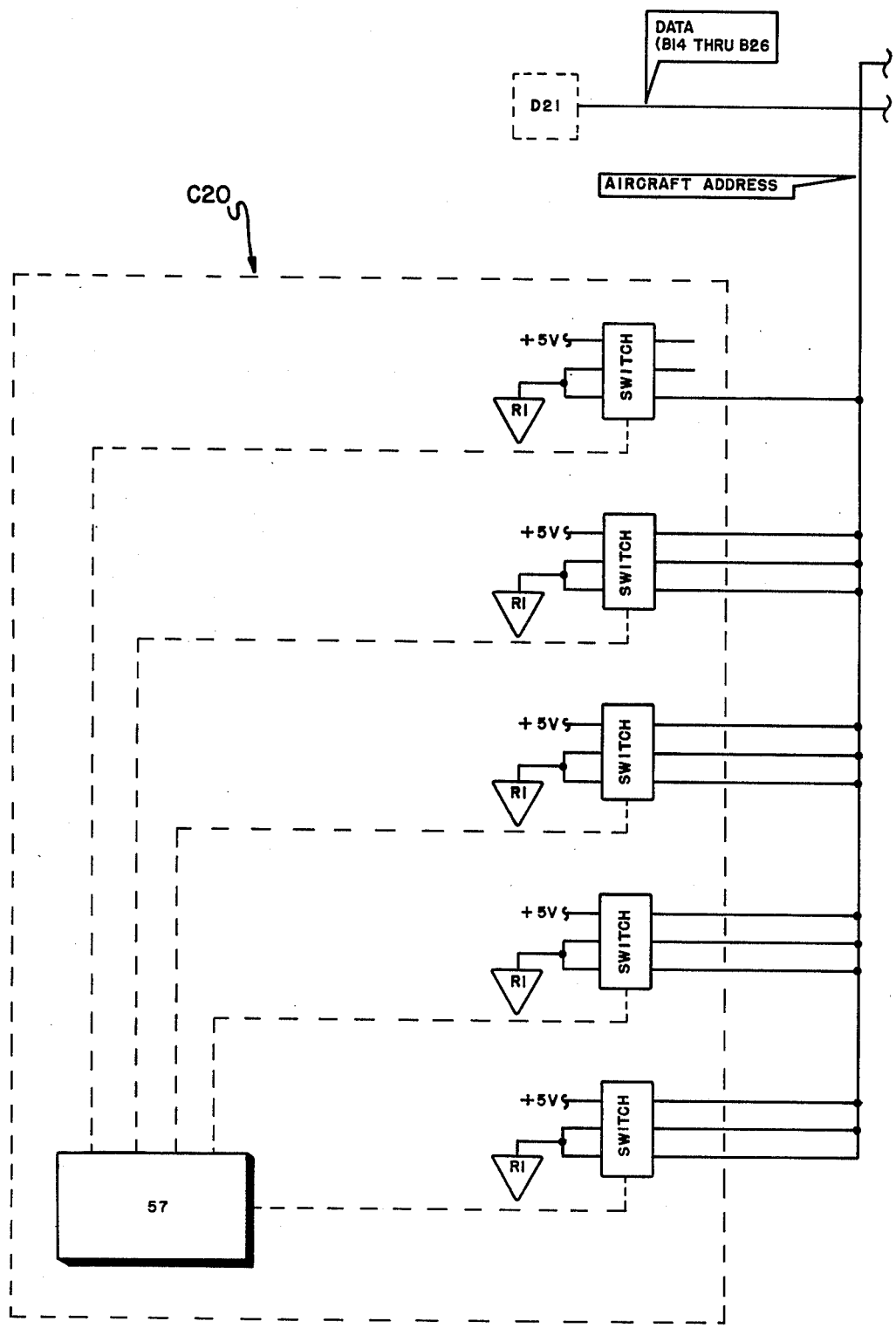
Figure 9B:
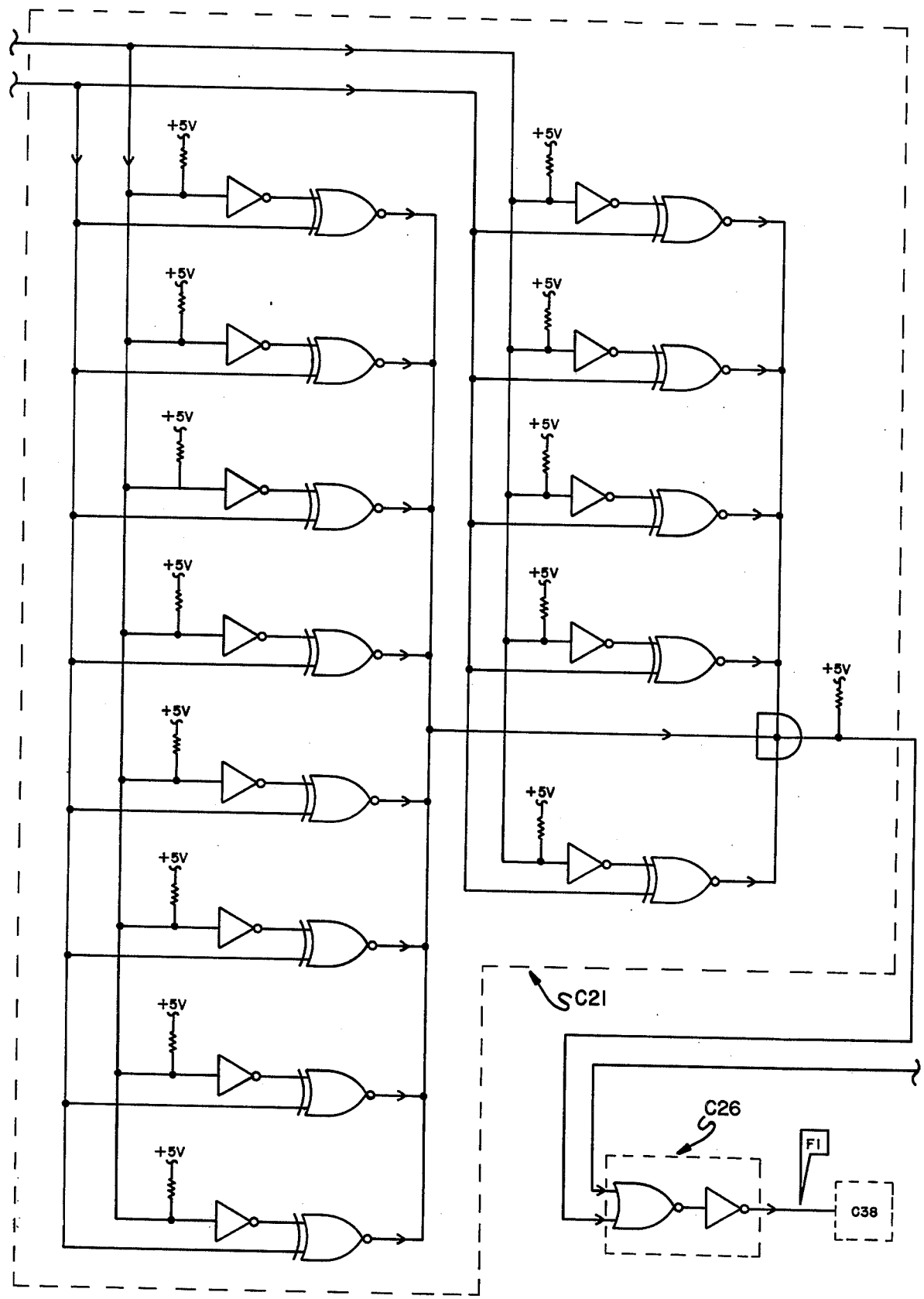
Figure 9C:
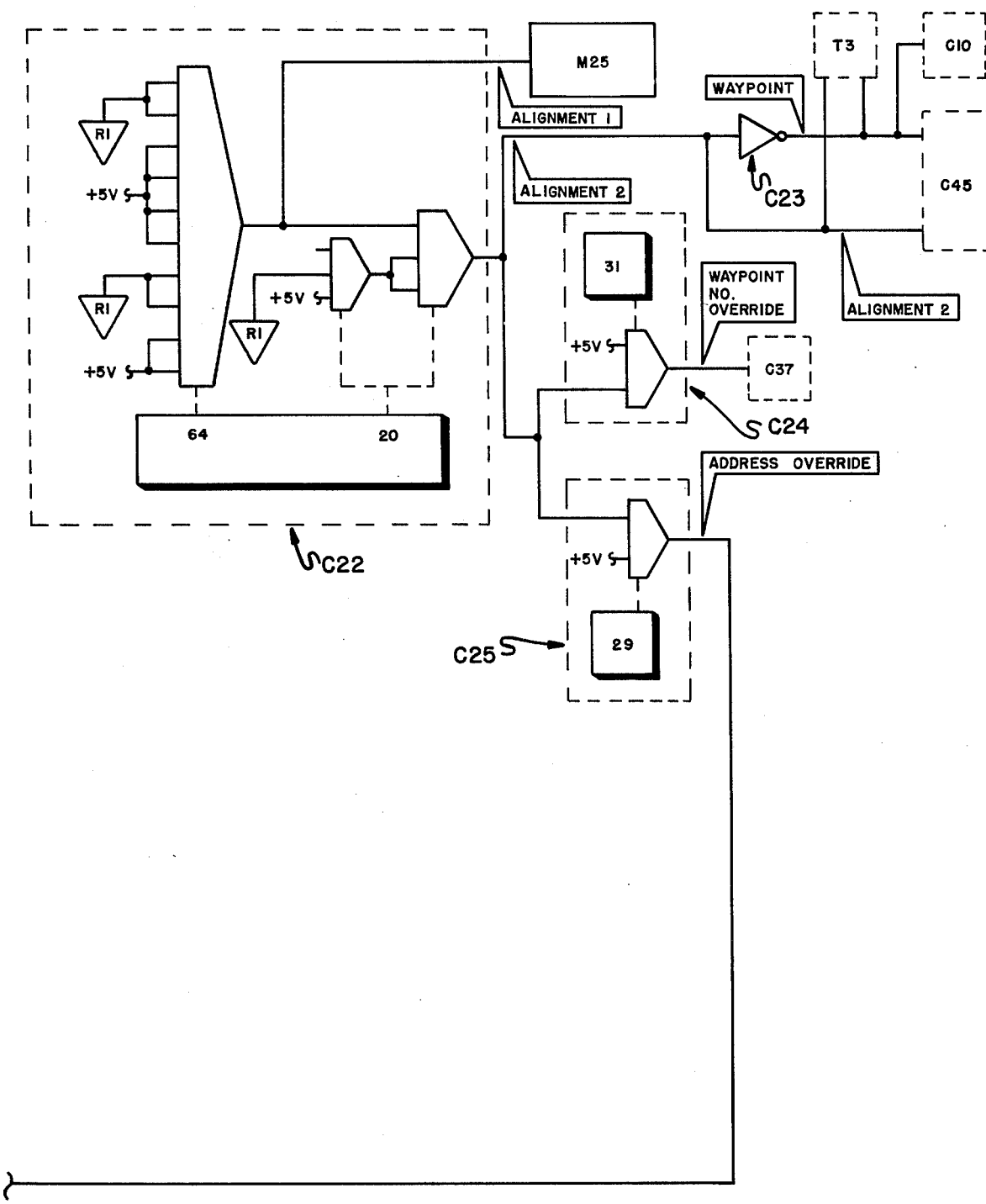
Figure 10A:
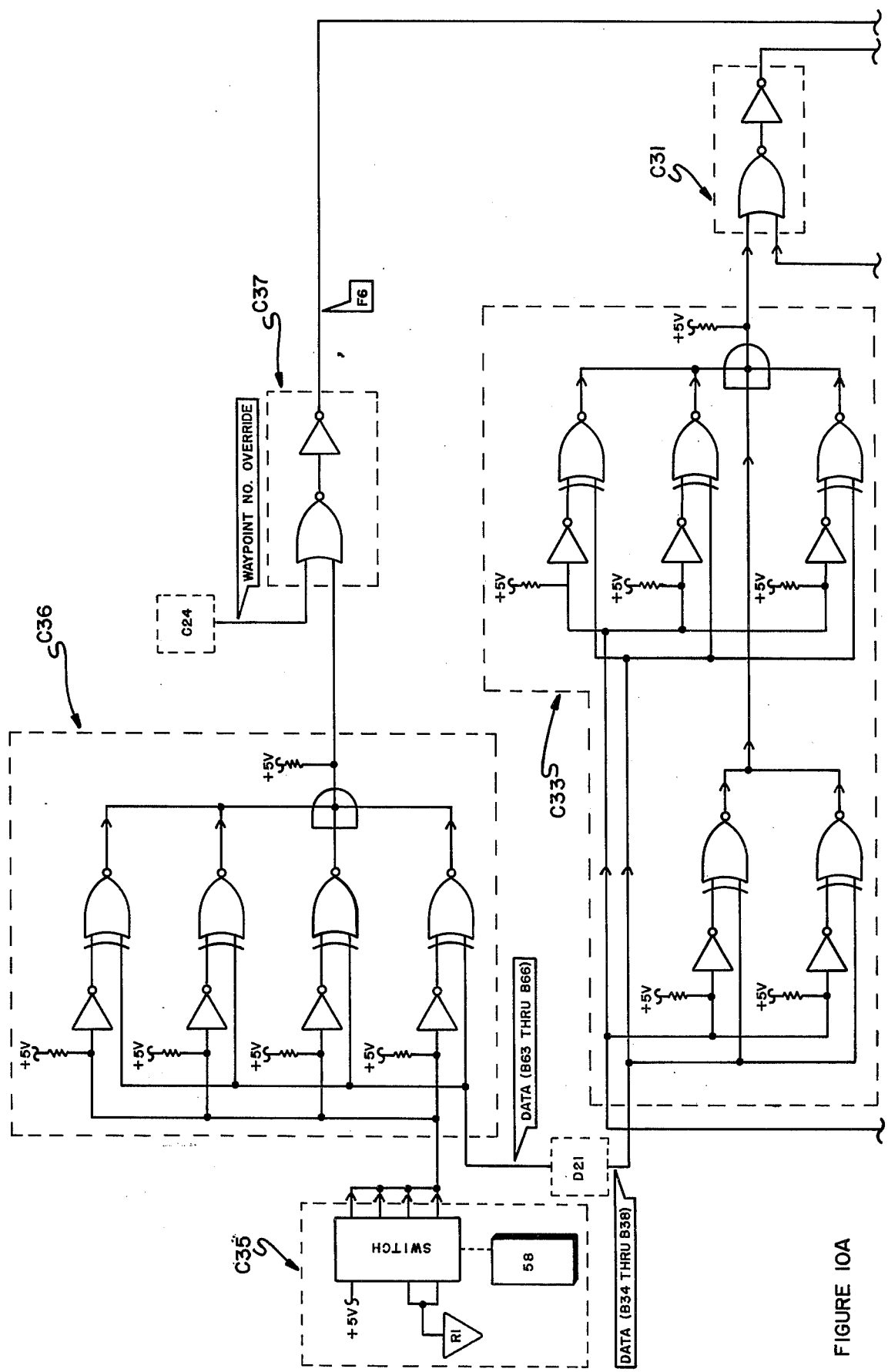
Figure 10B:
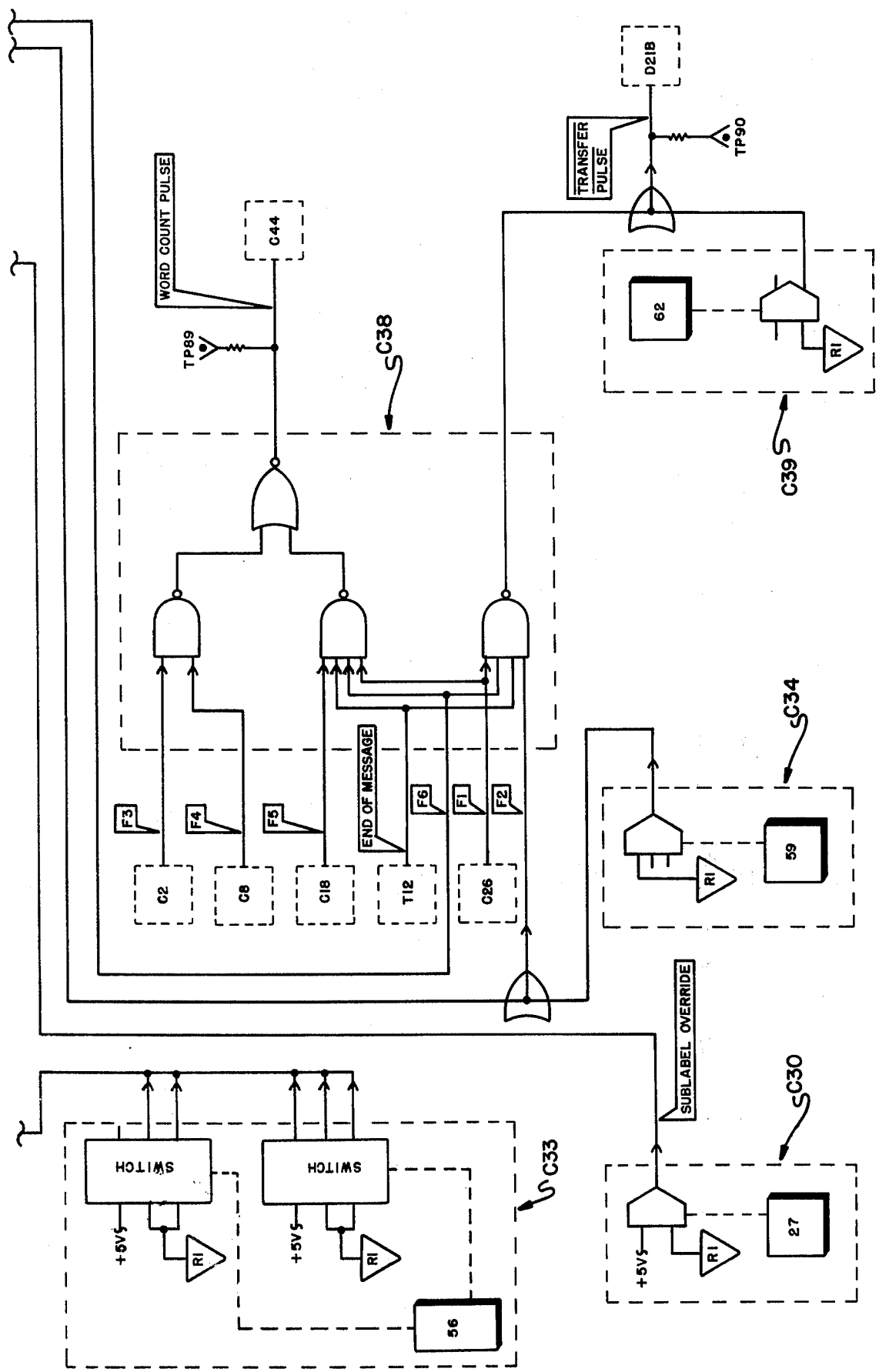

The aircraft address switches C20 in FIG. 9, allow the operator to select, in a waypoint mode, the address of the aircraft which receives the data he wishes to monitor. The five switches produce a five place, binary-coded-octal AIRCRAFT ADDRESS number. A lo output is a logical ONE.

The address match recognition C21 checks each bit from the aircraft address switches C20 with the corresponding bit of the message. Thirteen gates are used, with all outputs connected to form a wired AND gate. When all gates have a hi output, indicating that the message address matches the selected address, the combined output will be hi. Any lo output will drive the combined output lo.

Mode control C22 controls the operating mode of the test set. There are only two modes-alignment and waypoint. The MSG TYPE switch 64 controls the operating mode of the message simulator circuitry. If set to AG, ANG, AUX1, AUX2, AUX3 or AUX4, the mode is alignment and the ALIGNMENT 1 signal is hi. If the switch is set to WG, WNG or AUX5, the mode is waypoint. ALIGNMENT 1 is connected to the TEST position of the MODE switch 20. If the MODE switch 20 is set to TEST, the ALIGNMENT 2 signal will be controlled by the MSG TYPE switch 64. It is possible, however, to be in a non-test mode and have the MSG TYPE switch 64 control the message simulator and the MODE switch 20 to control the rest of the test set. The switching arrangement makes it possible to produce a test signal and receive it through the normal channels, rather than using the internal test message. ALIGNMENT 2 is hi if the MODE switch 20 is set to ALIGN, and lo if it is set to WAYPT.

Inverter C23 inverts the ALIGNMENT 2 signal. Since there are only two modes, the inverse of alignment is waypoint. The WAYPT signal is hi in a waypoint mode.

Switch C24 is the WAYPOINT NO. MATCH switch and provides a means to override the requirement, in a waypoint mode, that the data must match the waypoint number selected by the WAYPT NO. select switch 58. In an alignment mode, the hi ALIGNMENT 1 signal produces a hi WAYPOINT NO. OVERRIDE signal, which automatically overrides the waypoint number match requirement. In a waypoint mode, the switch C24 controls the override function. If set to NORM, the lo output enables the waypoint match gate C37. If the switch C24 is set to OVERRIDE, the hi output disables the gate and forces a good (hi) F6 output.

ADDRESS MATCH switch C25 in operation is identical to that of switch C24. Address match gate C26 provides a means to override the address match feature. In an alignment mode, or in a waypoint mode with the ADDRESS MATCH switch 29 set to OVERRIDE, the ADDRESS OVERRIDE signal is hi. The match gate C26 produces a hi F1 signal, indicating address match, if either input is hi.

SUBLABEL MATCH switch C30 provides a means to override the requirement that, for a message to be displayed, its sublabel number must match that selected by the SUBLABEL switches 56. When set to NORM, the switch C30 produces a lo SUBLABEL OVERRIDE output, which enables the sublabel match gate C31. When set to OVERRIDE, the signal is hi, which overrides operation of the gate and forces a good (hi) F2 output.

Sublabel switches C32 provide a means to select the sublabel of messages to be displayed. Switches C32 produce a two-place binary-coded-octal number which represents the selected sublabel. A lo output is a logical ONE.

Sublabel match recognition C33 checks each bit from the SUBLABEL switches C32 with the corresponding bits from the message. Operation is identical to that of the address match recognition C21.

Switch C34 is part of the DISPLAY switch 59. The F2 signal is connected to switch C34 and is grounded when the switch 59 is set to HOLD, thereby inhibiting transfer of any message into the display. A lo F2 signal prevents data from being transferred to the MESSAGE lamps 28.

WAYPT NO. switch C35 provides a means to select the waypoint number of messages to be monitored. Outputs are a binary coded hexadecimal number which represents the selected waypoint number. A lo output is a logical ONE.

Waypoint match recognition C36 checks each bit from the WAYPT NO. switch C35 with the corresponding bit from the message. Operation is identical to that of address match recognition C21. Waypoint match gate C37 provides a means to automatically override the waypoint match feature. WAYPOINT NO. OVERRIDE is hi if in an alignment mode, or in a waypoint moe with the WAYPT NO. MATCH switch 31 set to OVERRIDE. The gate C37 produces a hi F6 signal, indicating waypoint number match, if either input is hi.

Word count gate C38 performs two checks on the data at the end of each message. The first check is for a good message. If F1 and F3 thru F6 are hi, a positive-going 6.25 $\mu$ sec pulse WORD COUNT PULSE, coincident with the END OF MESSAGE pulse, is sent to the status decoder, enabling the sublabel update rate counter C44 to count one good sublabel message towards the required total. The significance of the WORD COUNT PULSE depends on the mode. In an alignment mode, F1 (address match) and F6 (waypoint number catch) are automatically overriden. Thus, WORD COUNT PULSE equals good label, parity and validity for alignment messages. In a waypoint mode, F5 (validity check) is automatically overriden. Thus, WORD COUNT PULSE equals good label, parity, address match, and waypoint number match for waypoint messages. Any of the CHECK or MATCH switches which are set to OVERRIDE further alter the significance of the WORD COUNT PULSE.

The second check of the word count gate C38 is for data match. If F1, F2 and F6 are hi, a negative-going 6.25 $\mu$ sec $\overline{\text{TRANSFER PULSE}}$ is generatsed at the end of the message. In an alignment mode, F1 (address match) and F6 (waypoint number match) are automatically overriden, so that $\overline{\text{TRANSFER PULSE}}$ equals sublabel match for alignment messages. In waypoint operation, address and waypoint number match are also required. Setting any of the MATCH switches to OVERRIDE alters the significance of the $\overline{\text{TRANSFER PULSE}}$.

TRANS switch C39 allows the operator to manually transfer a test message into the display. Pressing the switch puts a momentary ground on the $\overline{\text{TRANSFER PULSE}}$ signal, which accomplishes the same transfer of data to the MESSAGE lamps that the automatic $\overline{\text{TRANSFER PULSE}}$ does.

Figure 11A:
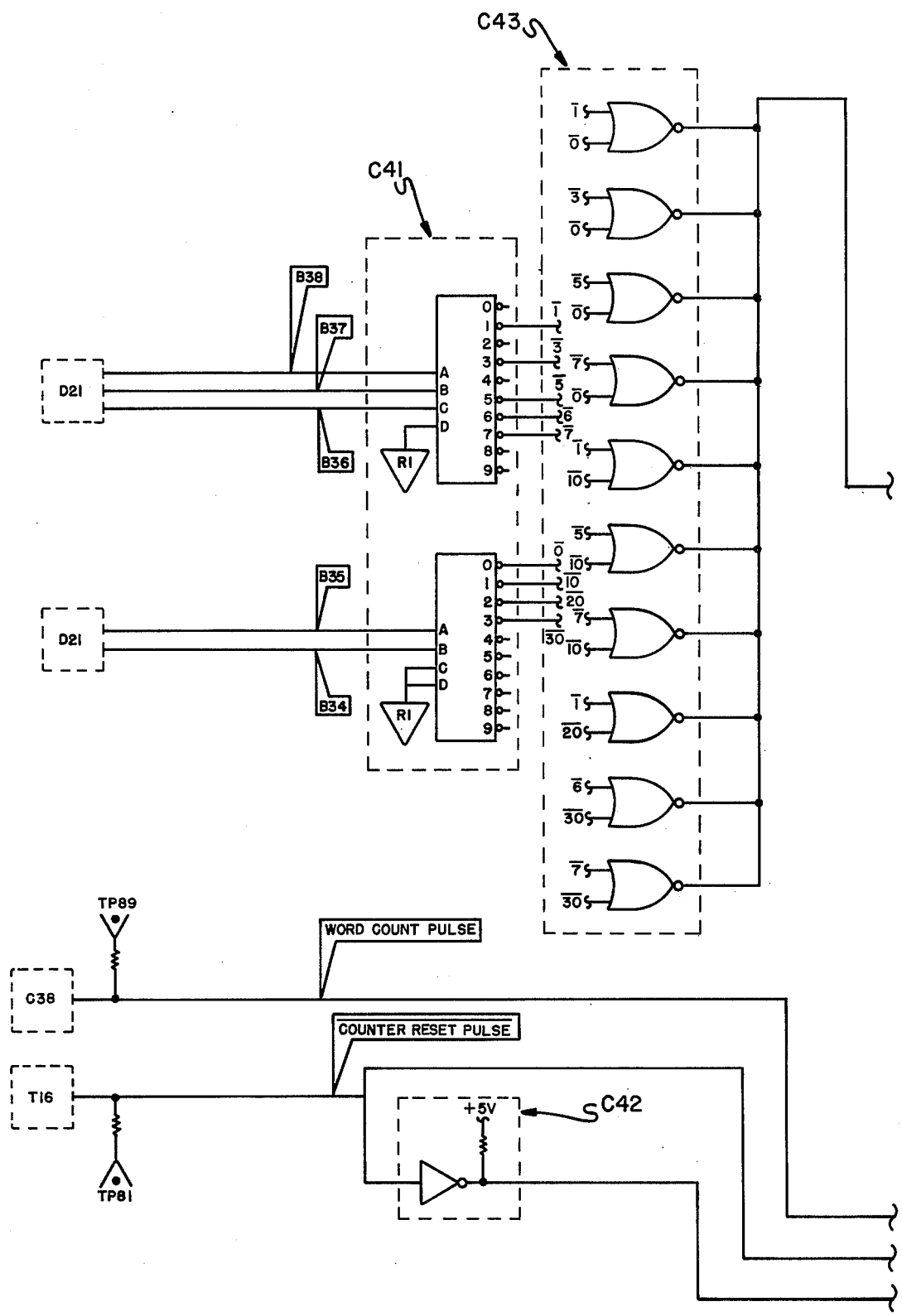
Figure 11B:
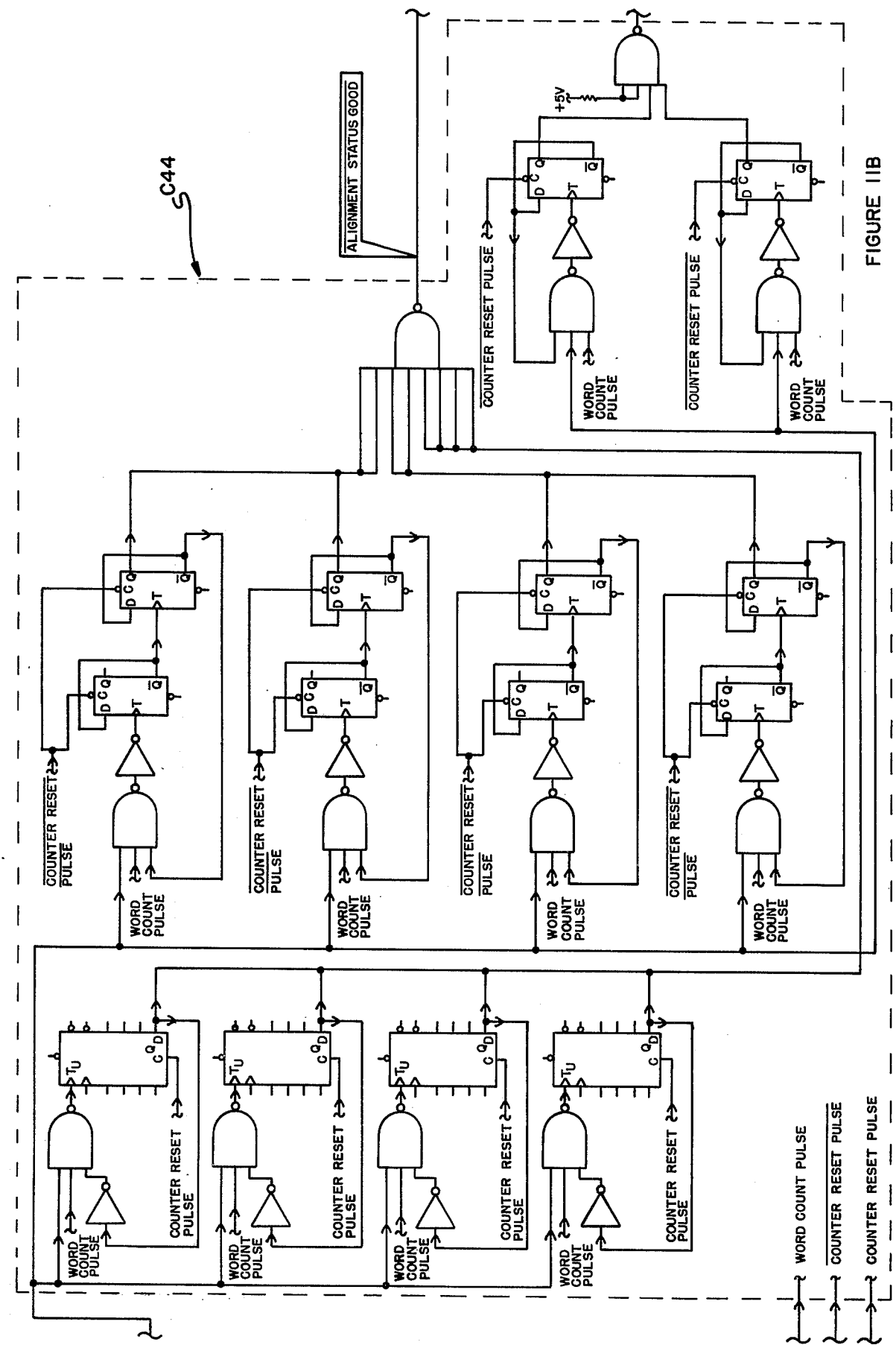
Figure 11C:
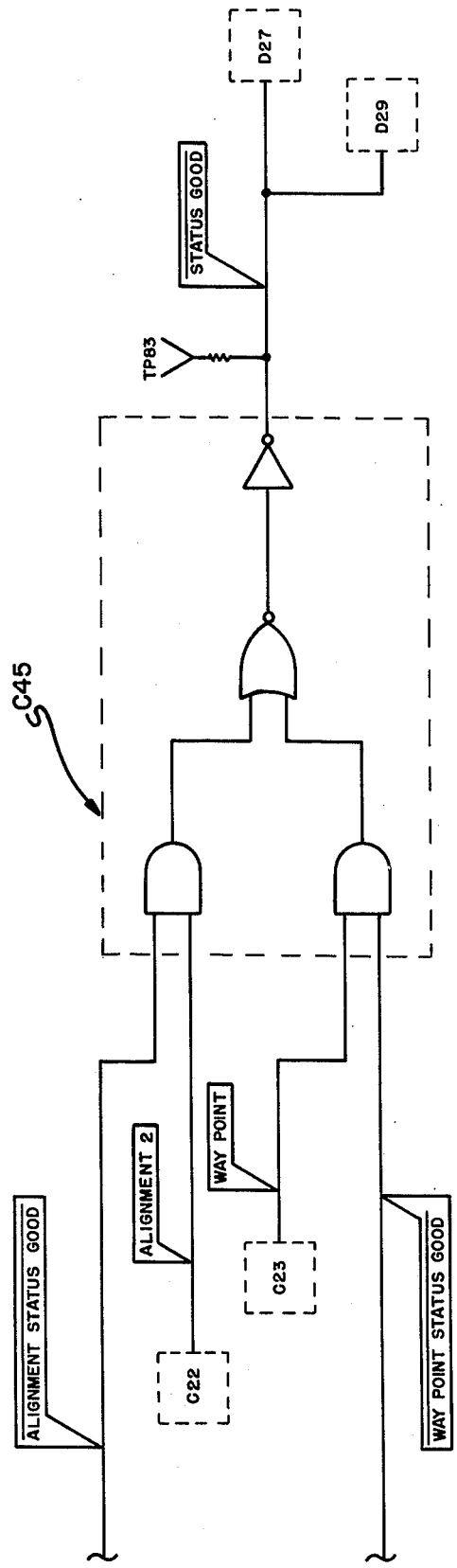
Figure 12B:
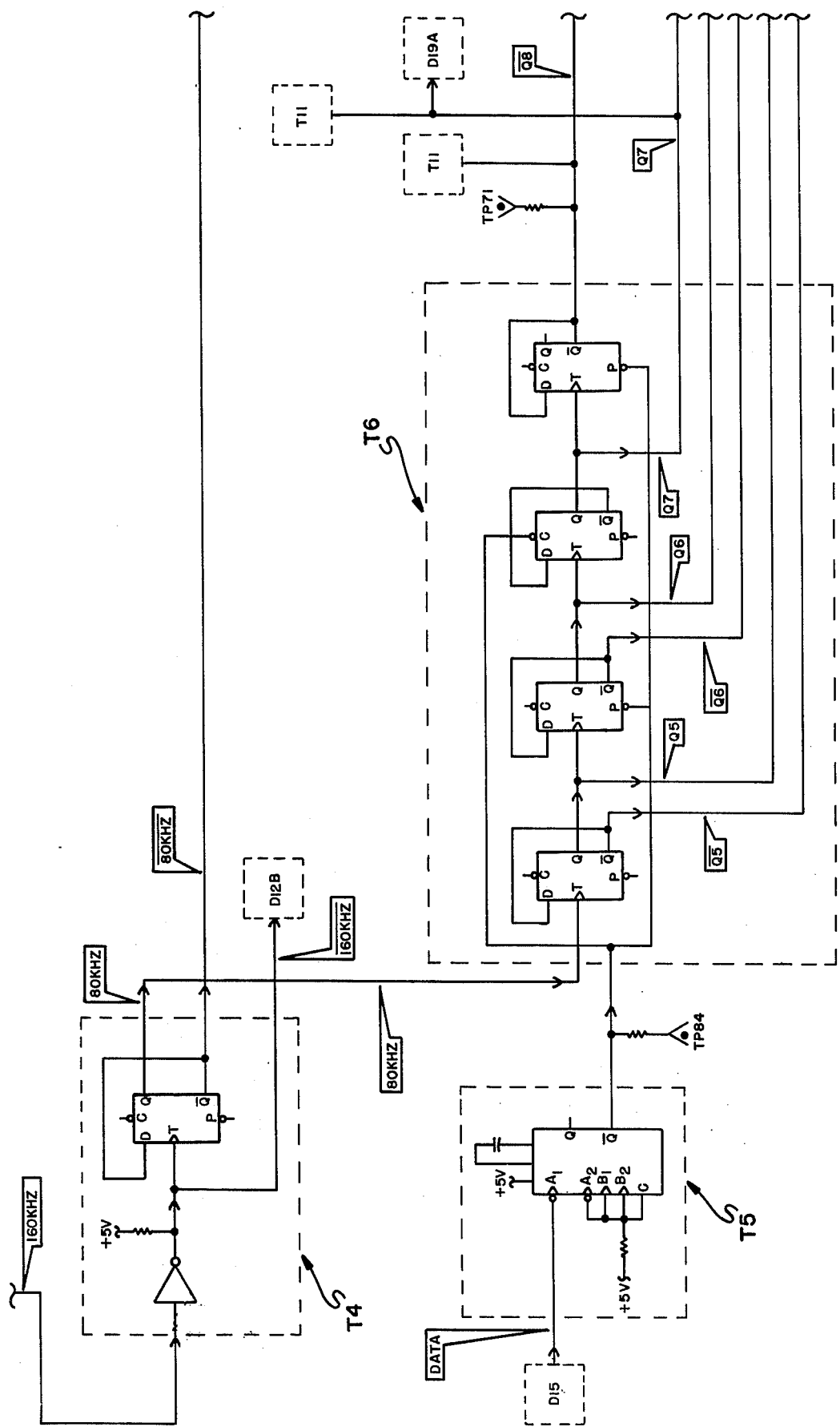
FIGS. 12A–13D are schematics of the timing circuitry.
Figure 12C:
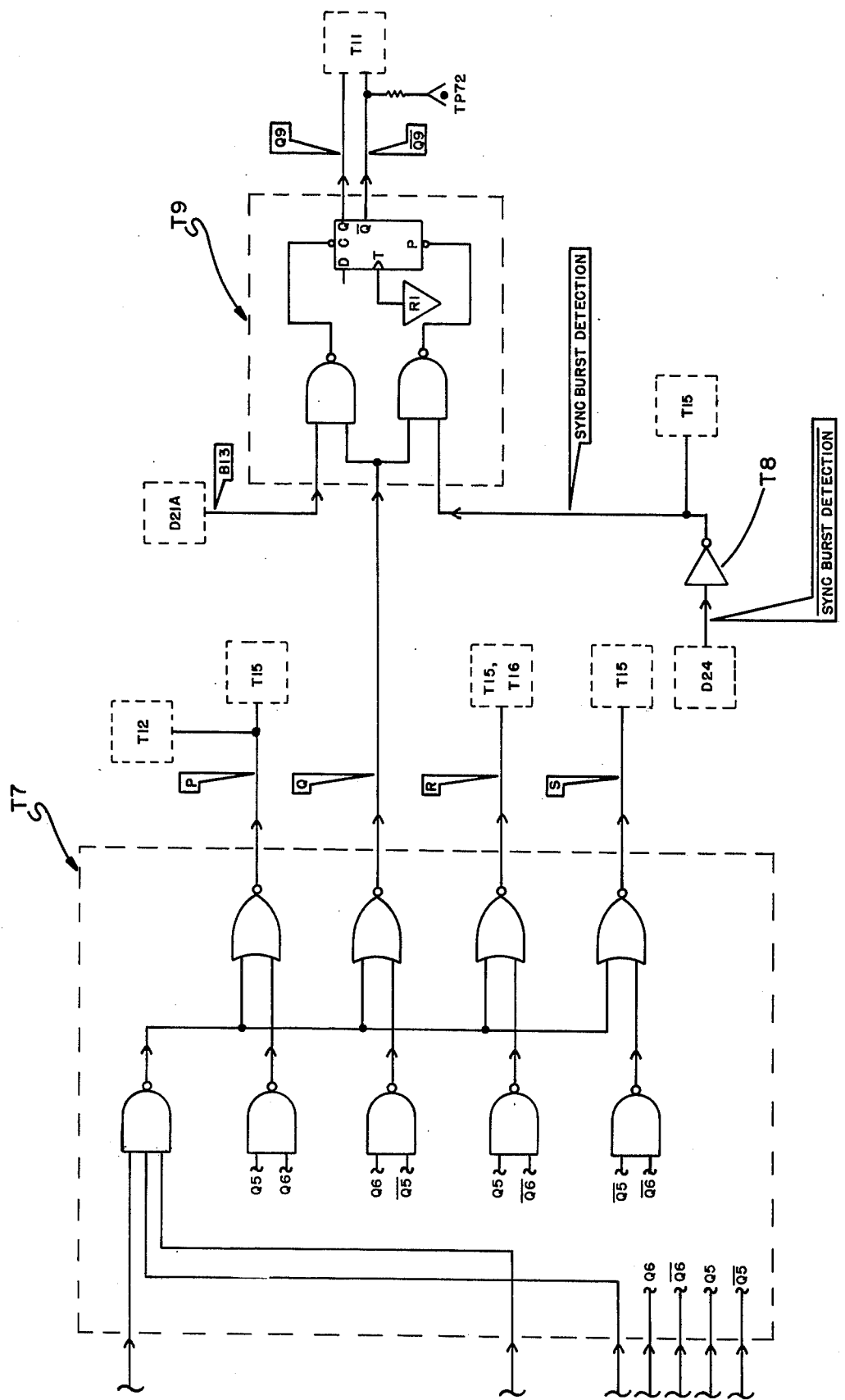
Figure 13A:
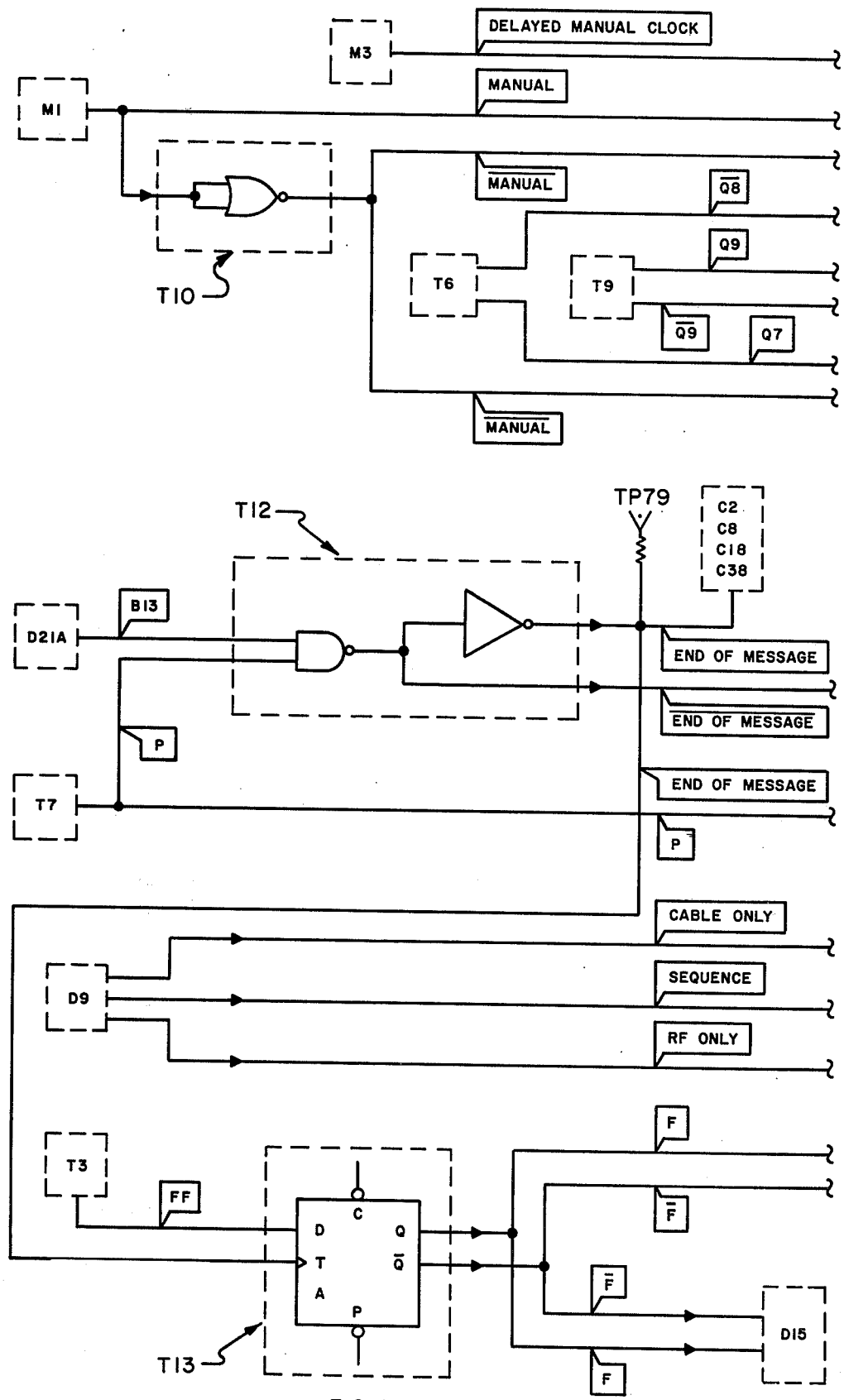
Figure 13B:
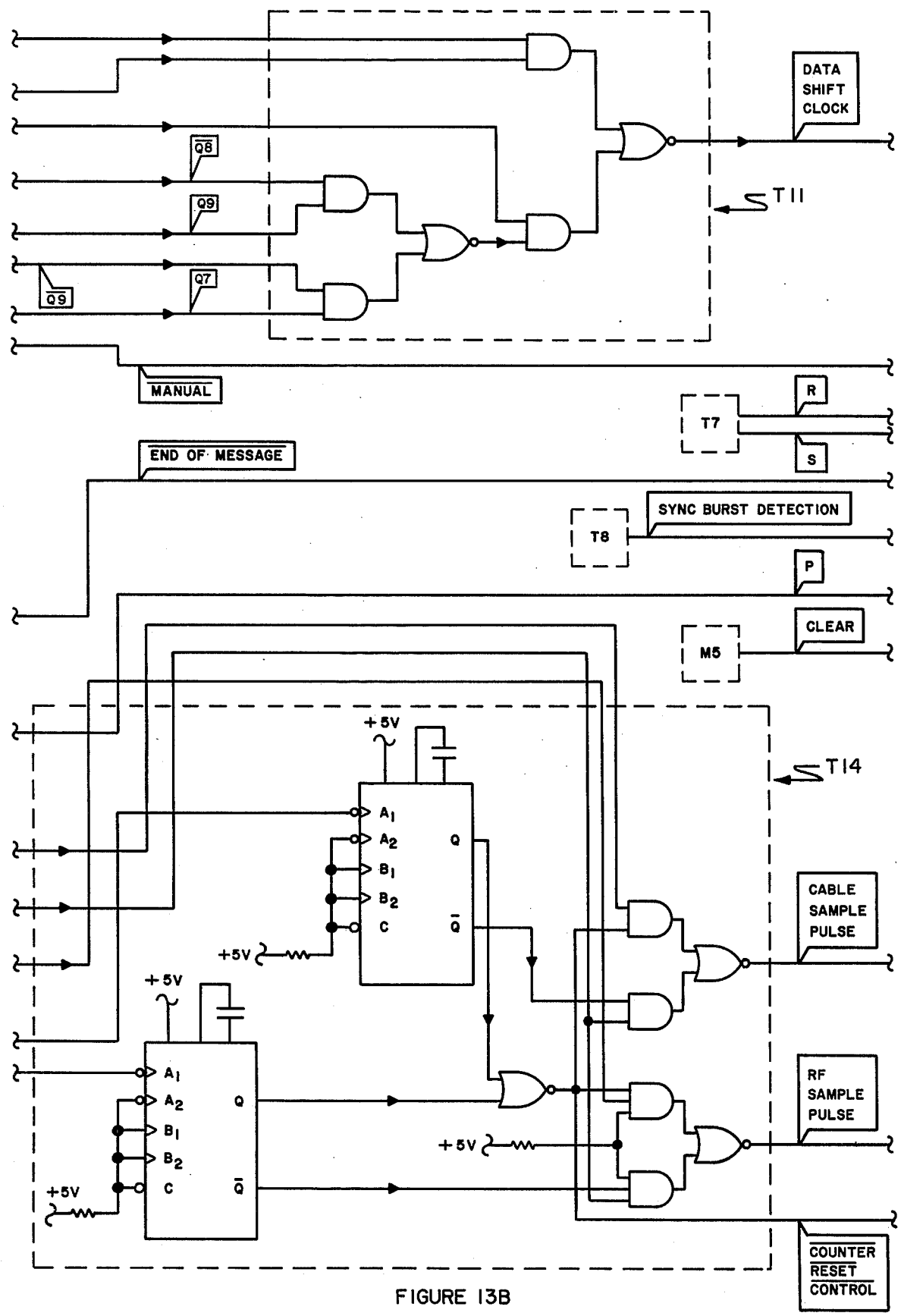
Figure 13C:
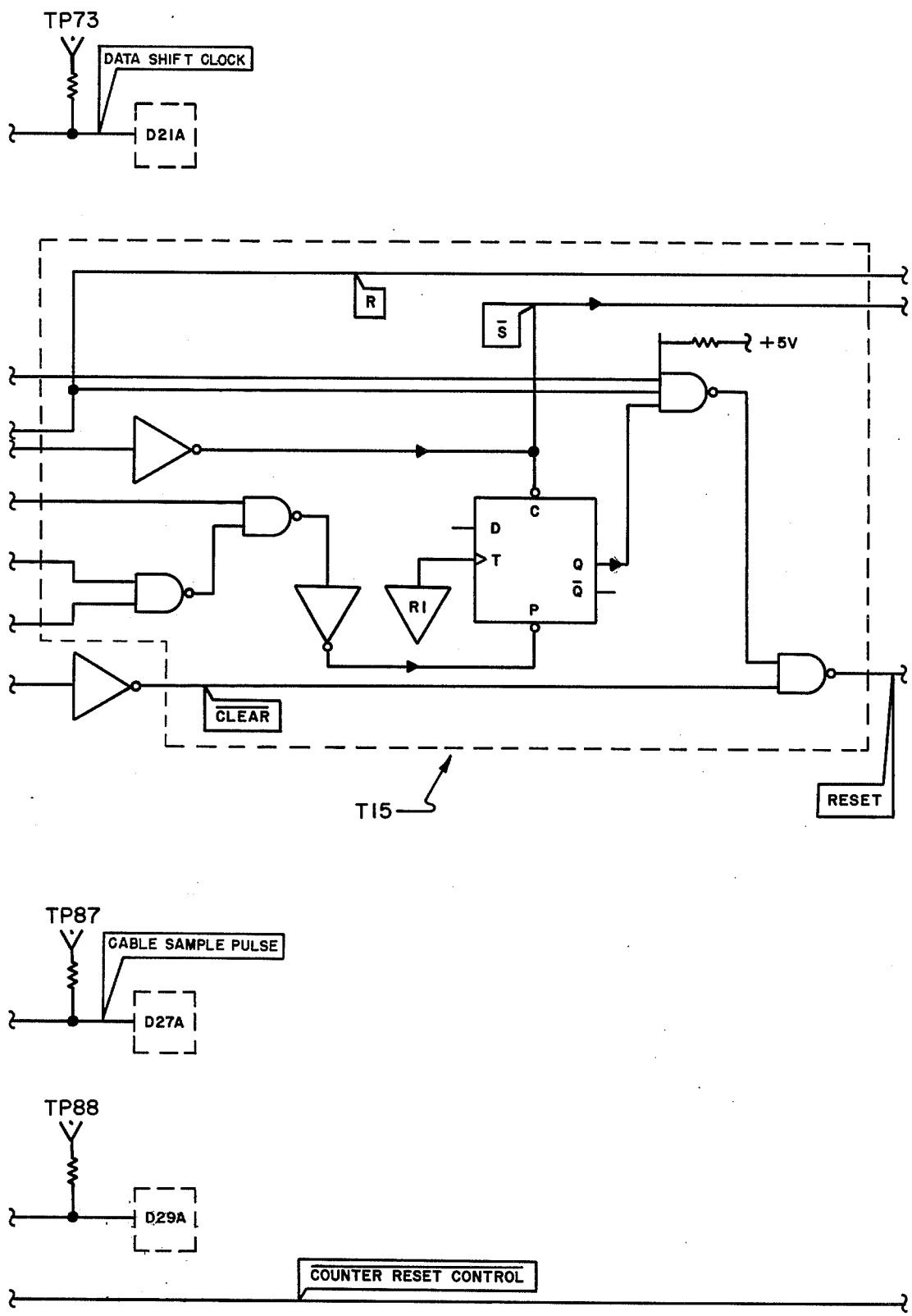
Figure 13D:
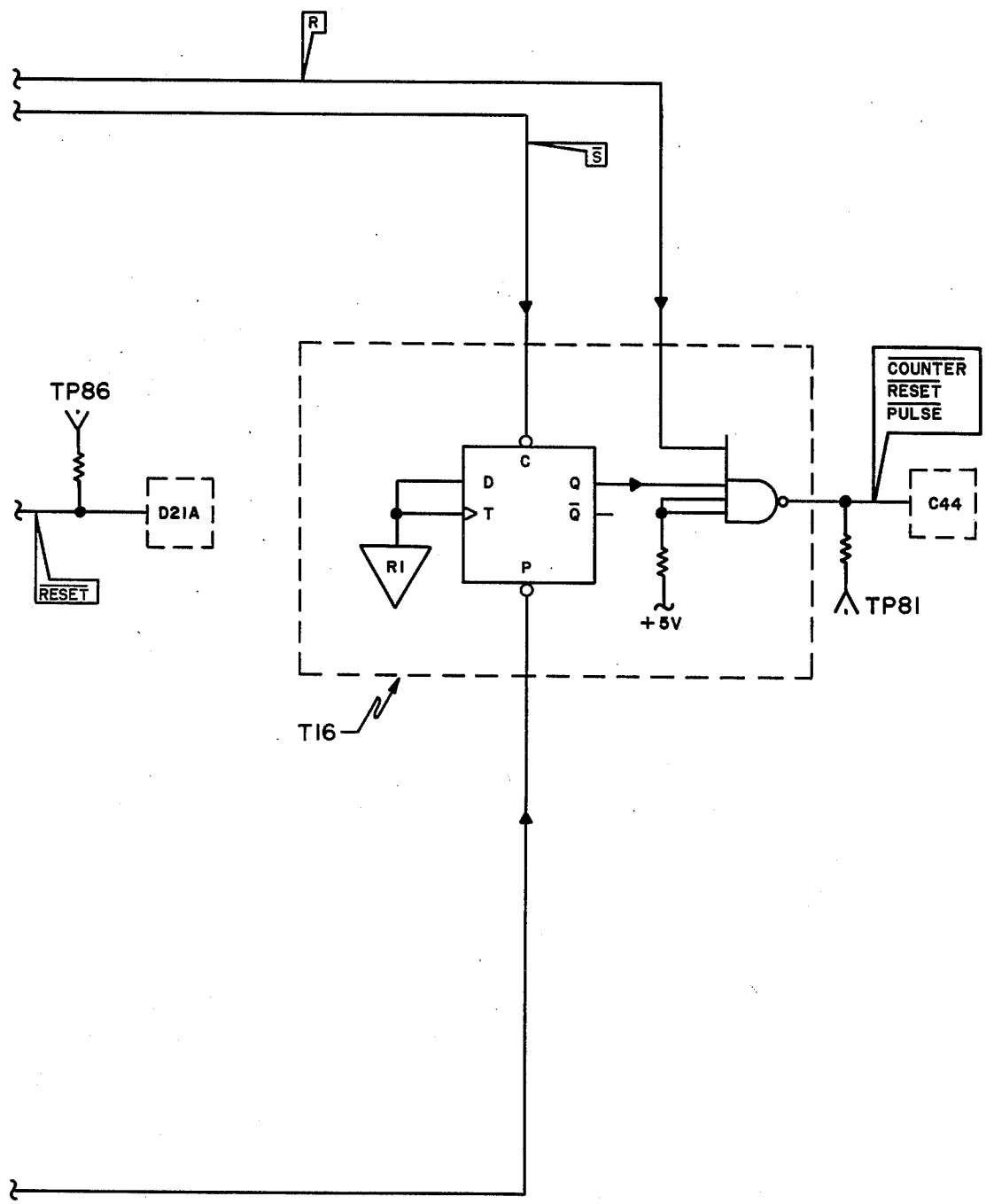
Figure 14A:
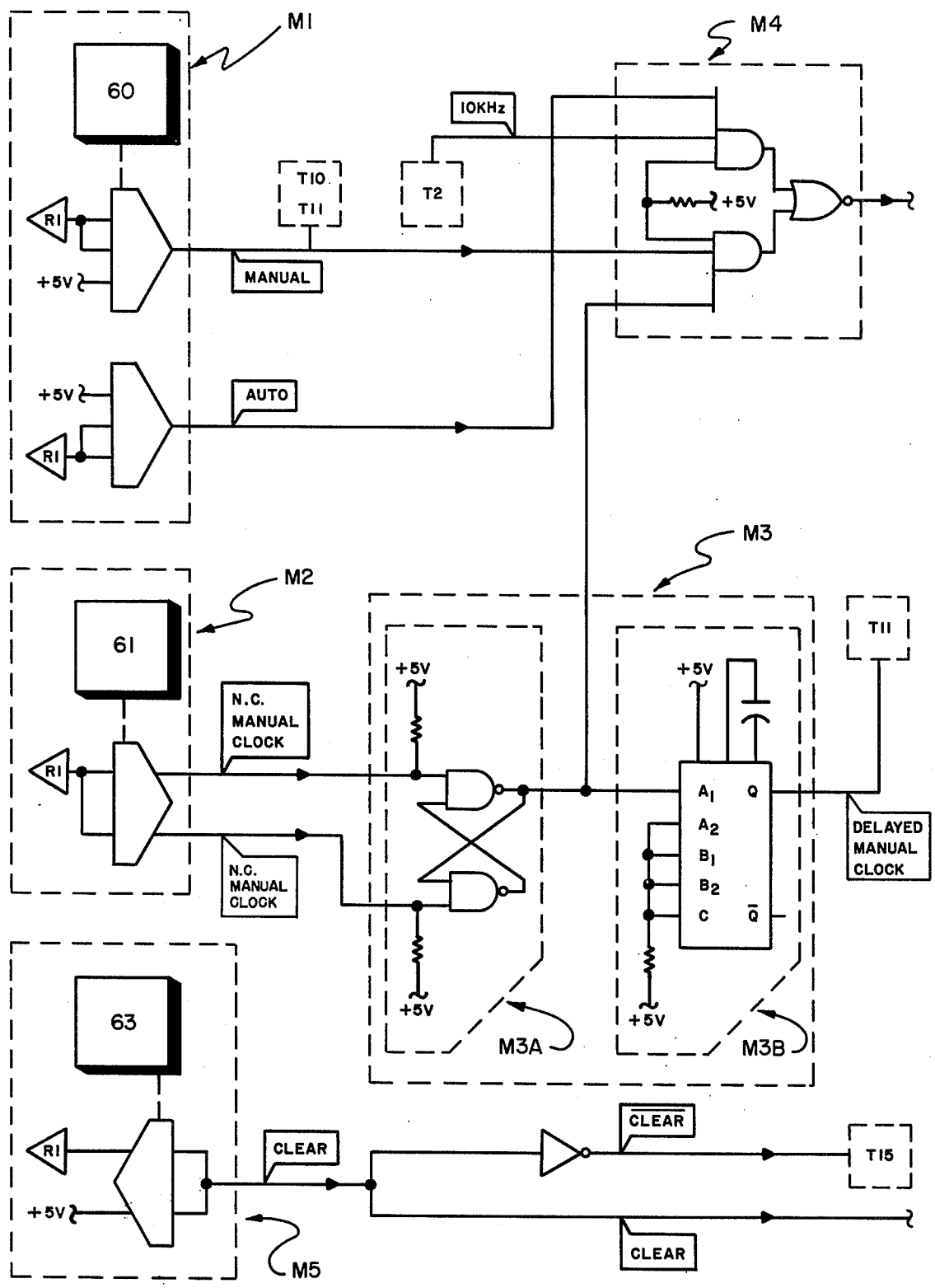
FIGS. 14A–16C are schematics of the message simulating circuitry.
Figure 14B:
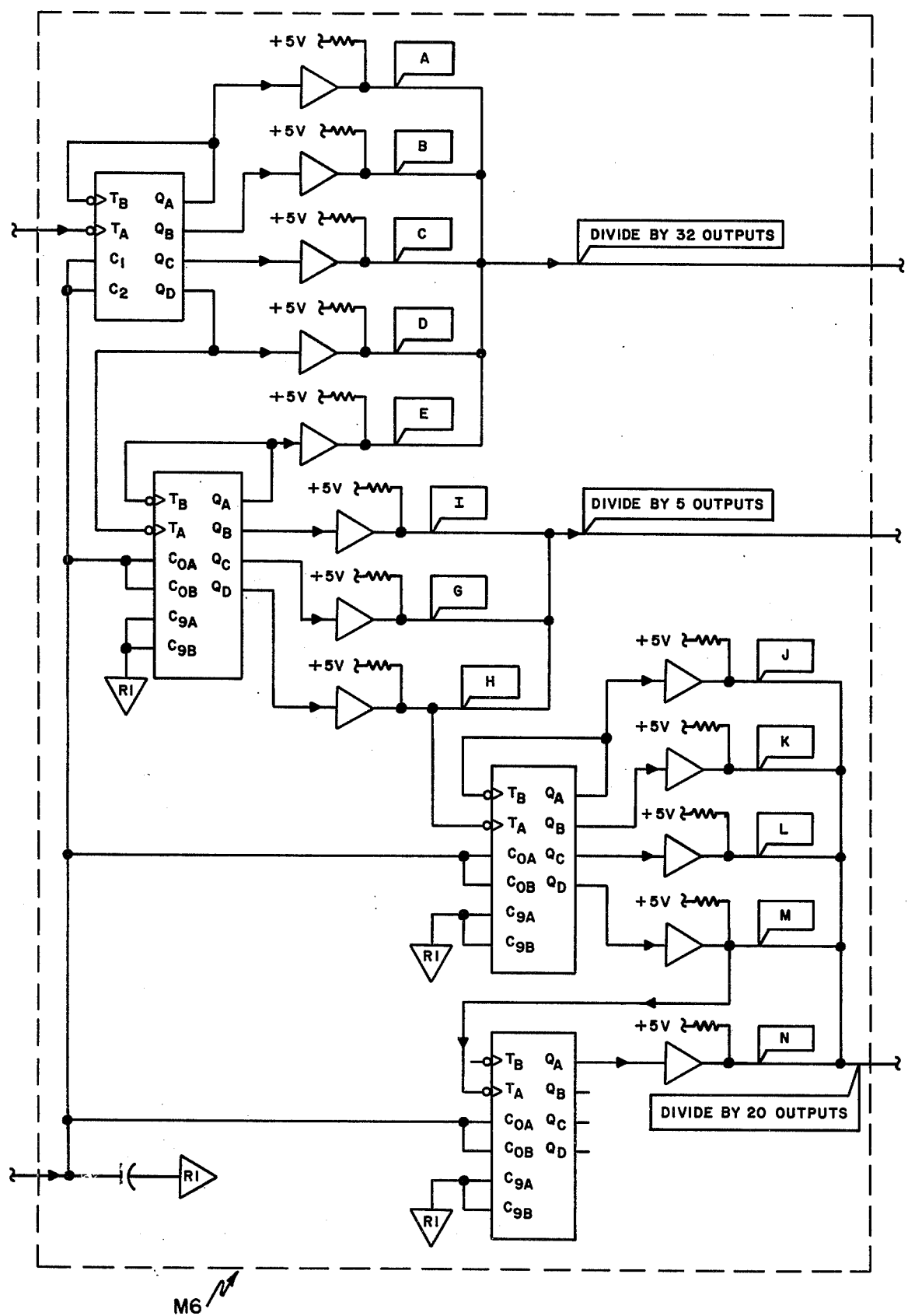
Figure 14C:
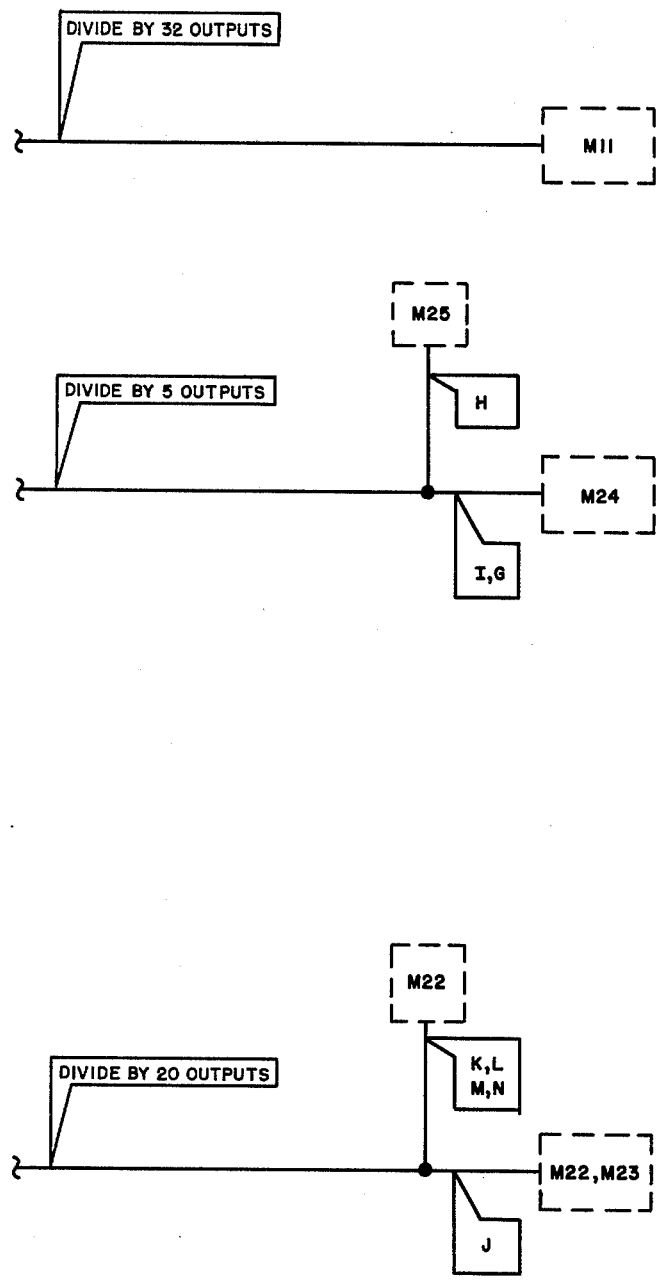
Figure 15A:
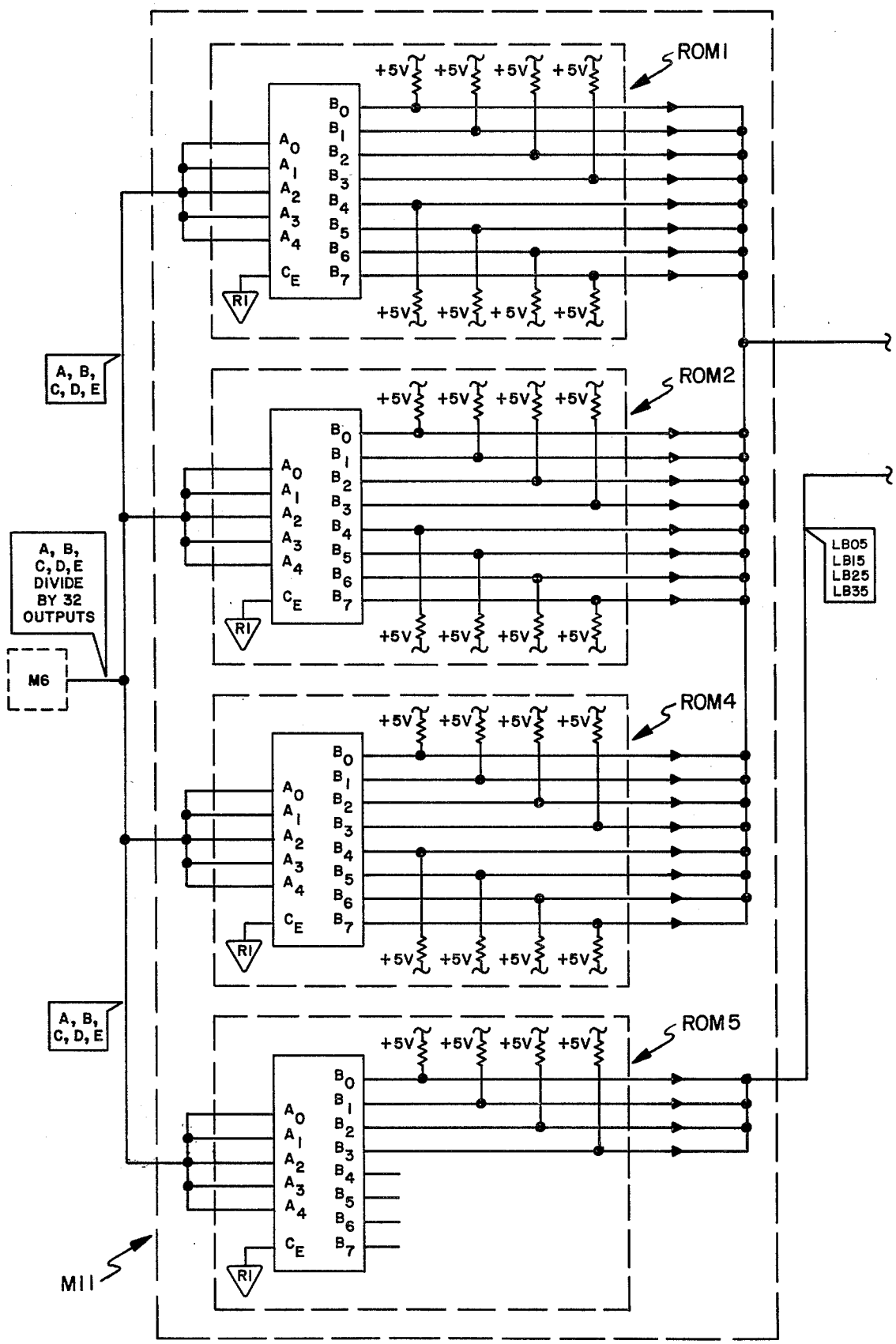
Figure 15B:
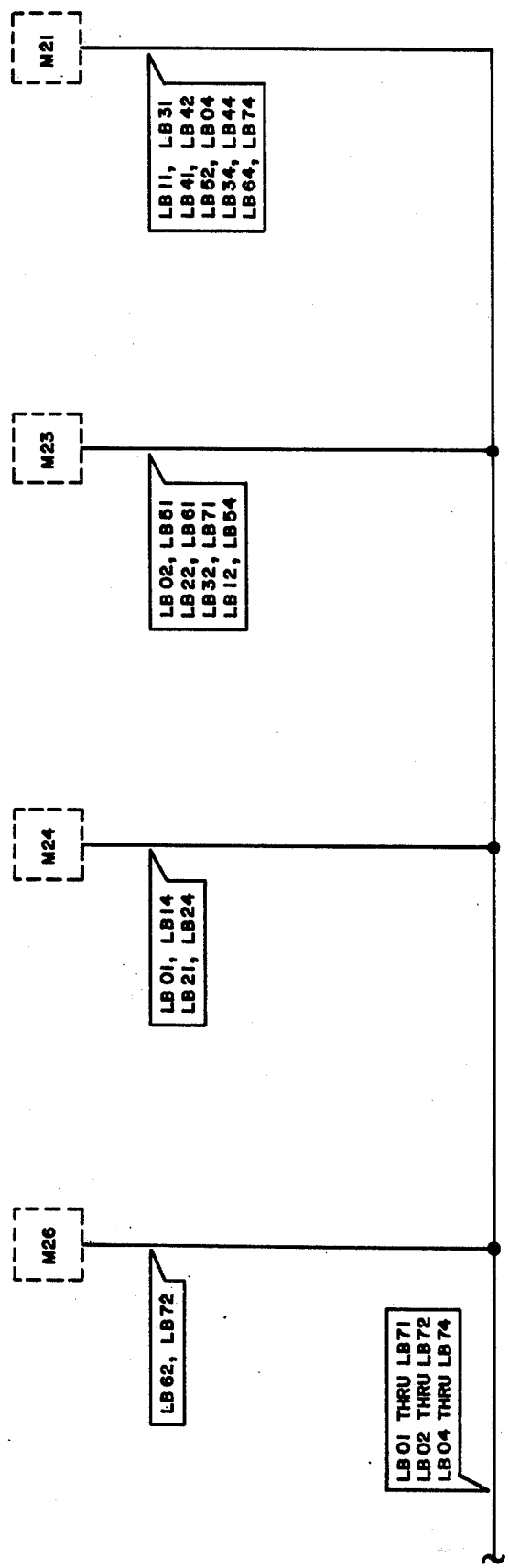
Figure 15C:
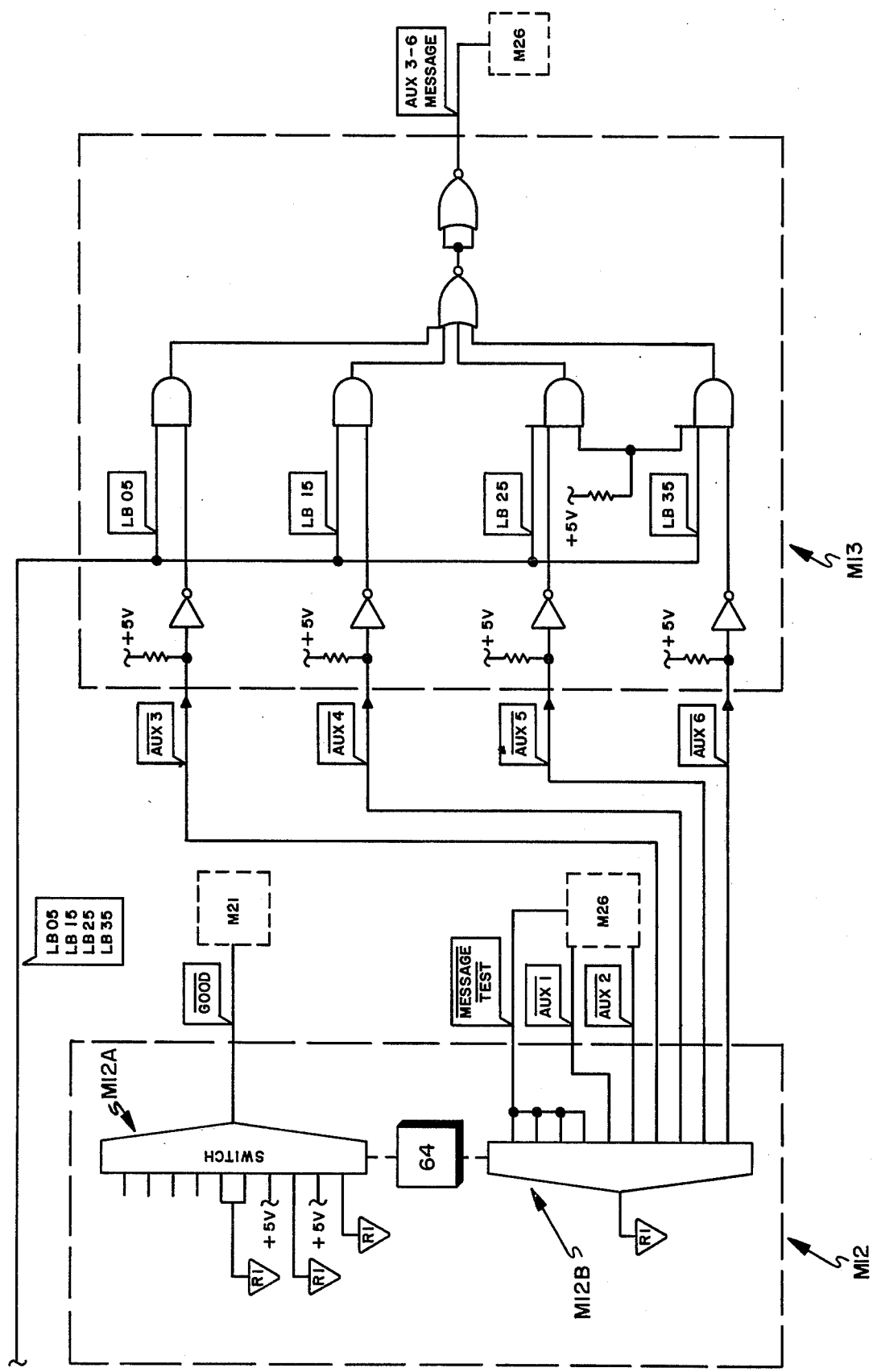
Figure 16A:
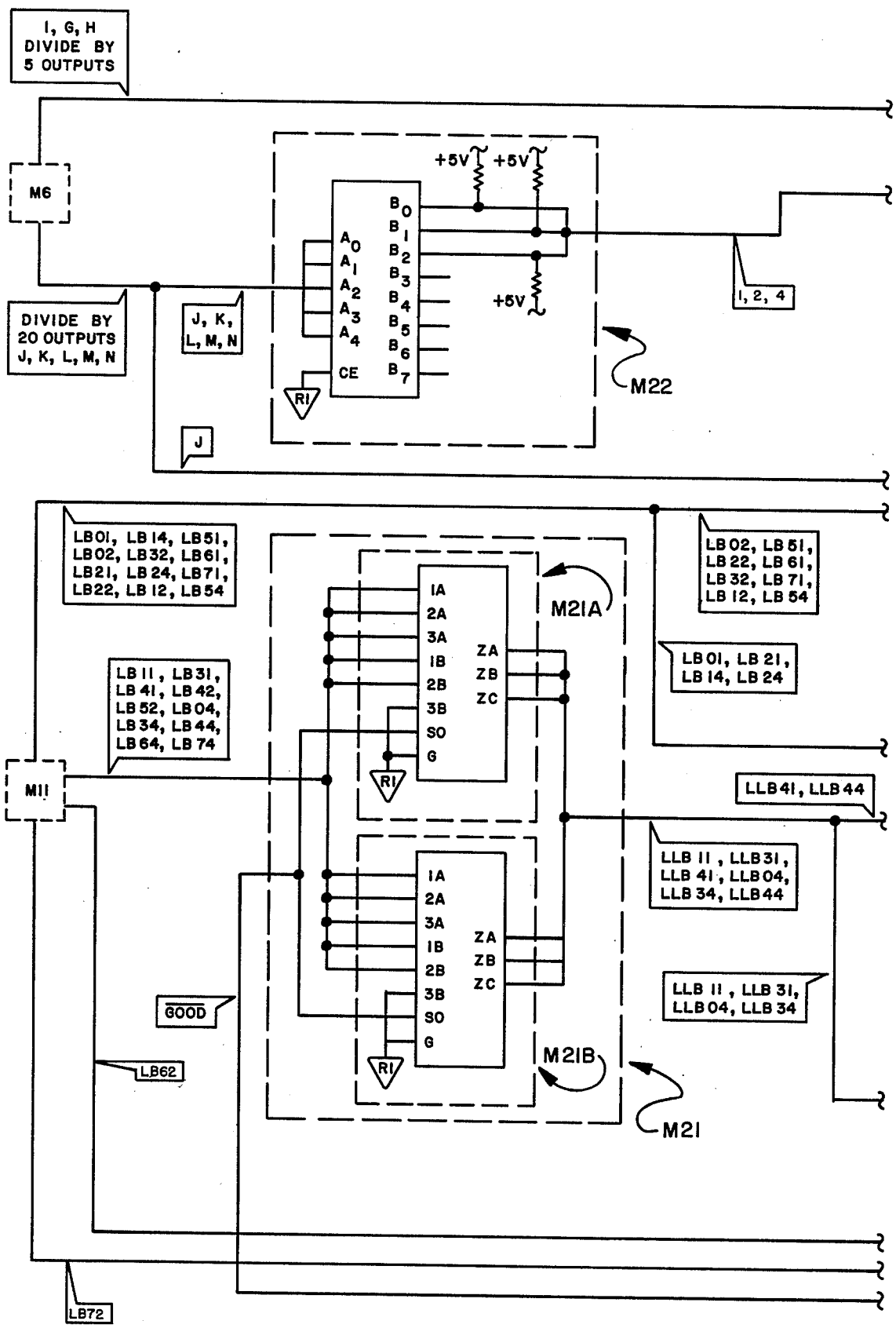
Figure 16B:
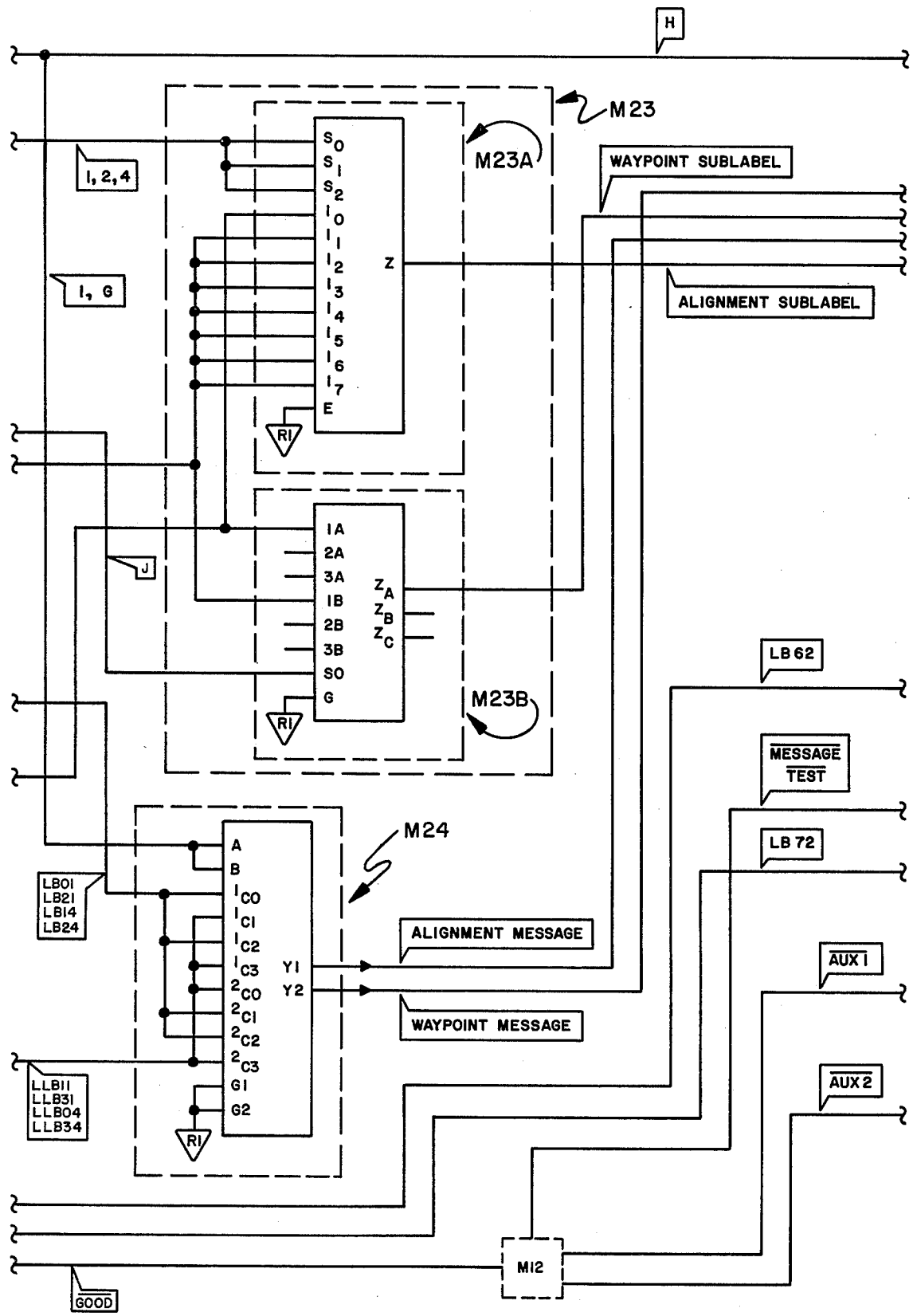
Figure 16C:
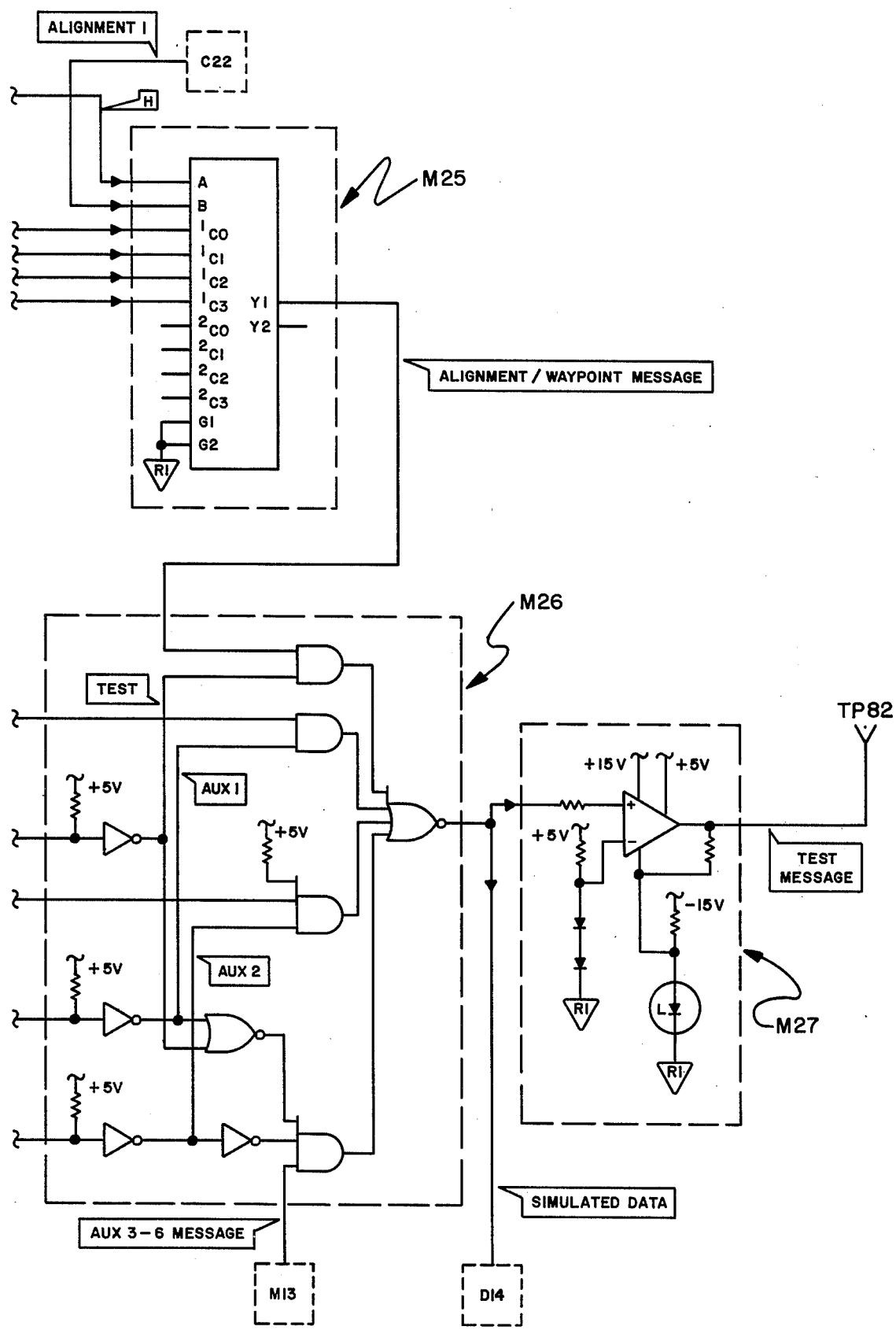

The status decoder, FIG. 11, produces a low $\overline{\text{STATUS GOOD}}$ pulse if the AOB or RF data is adequate to fulfill the mission. To align the aircraft inertial system, there must be a minimum of 40 good messages per second, with the following sublabel distribution.

1. Two messages/sec of sublabel 01 (longitude and octant), 03 (latitude), 05 (chance in North position, change in North position senescence) and 07 (change in East position, change in East position senescence).
2. Eight messages/sec of sublabel 11 (heading, vertical lever arm), 15 (North velocity, roll), 17 (East velocity, pitch) and 21 (sin and cos azimuth rate). In a waypoint mode, a minimum of two messages must be received during a 16 second interval, with the following sublabel distribution:

One message/sec from sublabel 36 (waypoint number and longitude) and 37 (way point number and latitude).

To check for the required update rate, the line decoders C41 decode bit 34 thru bit 38 into a two-place number that indicates the sublabel. Two 4-to-10 line BCD-to-decimal converters are used. Both decoders have the D input grounded, because the sublabel number is octal and therefore, neither digit can exceed seven. The decoded output is lo.

Inverter C41 inverts the $\overline{\text{COUNTER RESET PULSE}}$ signal.

Sublabel decoder C43 decodes the messsage sublabel. Ten gates are used, one for each possible sublabel. The one decoded sublabel output will be hi, all other outputs will be lo.

The sublabel update rate counter C44 counts the sublabels of good messages. The circuit consists of ten counters, one for each sublabel. All counters are reset by the COUNTER RESET PULSE, or its complement, and have to reach their full count before the next COUNTER RESET PULSE. Each counter counts up to then minimum number of sublabels required, the stops counting. The clock input to each counter is the summation of a sublabel number and the WORD COUNT PULSE. Since the WORD COUNT PULSE is present only if the message is good, the ultimate output of the sublabel update rate counter C44 is an indication that the required number of good messages is present. The outputs of the counters are applied to two gates: one for alignment sublabels and one for waypoint sublabels. The outputs of the gates are an indication that all sublabels for that mode are present at the required update rate.

Update gate C45 gates the $\overline{\text{ALIGNMENT STATUS GOOD}}$ or the $\overline{\text{WAYPOINT STATUS GOOD}}$ signal, depending on the setting of the MODE switch 20. If in an alignment mode, ALIGNMENT 2 is hi, and the $\overline{\text{STATUS GOOD}}$ signal is identical to $\overline{\text{ALIGNMENT STATUS GOOD}}$. Similarly, in a waypoint mode, the WAYPOINT signal is hi, and the $\overline{\text{STATUS GOOD}}$ signal is identical to $\overline{\text{WAYPOINT STATUS GOOD}}$. $\overline{\text{STATUS GOOD}}$ is decoded by the display circuitry, and lights the AOB and/or RF data monitor lamps. If $\overline{\text{STATUS GOOD}}$ is lo, the GOOD lamps will light, indicating that the data is adequate.

TIMING CIRCUITRY

The timing circuitry controls the flow of information through the test set. The timing signals may be divided into two groups: those which process each message, and those which process the data as a whole. The signals which process each message are closely related to the operation of the message register D21. The timing sequence has four major steps: prior to sync burst, sync burst, message loading and end of message. The signals which process the data as a whole are subject to mode control.

The 160kHz oscillator T1 produces the basic frequency from which all test set timing signals are derived. Frequency divider T2 divides the 160kHz down to ½ Hz and 1/32 Hz. Each frequency is a squarewave and the sample period is one-half the period of the frequency, i.e., 1 second for alignment and 16 seconds for waypoint. Update rate select gate T3 produces FF, the sample period timing signal. FF is a ½ Hz squarewave in the alignment mode, or a 1/32 Hz squarewave in the waypoint mode.

Frequency divider T4 divides the 160 kHz output of oscillator T1 by two. The two outputs, 80 kHz and its complement, are used to develop the main test set timing signals.

Clock phasing monostable multivibrator T5 produces a negative-going two microsecond pulse on each negative-going edge of the DATA signal. The phasing pulse registers the timing frequency with the DATA signal thereby preventing any frequency drift between test set timing and message oscillators from interfering with data processing. Frequency divider T6 divides the 80 kHz signal by 16. The divider T6 uses four cascaded divide-by-two flip flops. Each produces a squarewave output. The counters are phase-synchronized to the DATA signal by the clock phasing pulse. Two outputs, Q7 and $\overline{\text{Q8}}$, are the 10 kHz and 5 kHz portions of the DATA SHIFT CLOCK signal. Pulse sequencer T7 produces four sequential timing signals P,Q,R and S each with a width of 6.25 $\mu$ sec. The four pulses occur every 200 $\mu$ sec, within a 50 $\mu$ sec window. The period of $\overline{\text{Q8}}$, 200 $\mu$ sec determines the repetition rate of the pulses, while that of Q7 provides the 50 $\mu$ sec window.

Inverter T8 inverts the $\overline{\text{SYNC BURST DETECTION}}$ signal, to produce a positive-going pulse each sunc burst. The clock shift gate T9 produces two signals which control 10 kHz and 5 kHz clock selection. The gate T9 enables the 10 kHz portion after completion of a message (B13), and enables the 5 kHz portion after the sync burst has been detected.

Inverter T10 inverts the MANUAL signal, to produce a lo output when the MSG CLK switch 60 is set to MAN. The clock select gate T11 produces the DATA SHIFT CLOCK signal, which clocks data through the working register D21A. If the MSG CLK switch 60 is set to MAN, the DATA SHIFT CLOCK is manually-generated by the CLK pushbutton switch 61. In manual operation, the hi MANUAL signal gates the DELAYED MANUAL CLOCK to the DATA SHIFT CLOCK output. In automatic operation, Q7 and $\overline{\text{Q8}}$ are alternately enabled by $\overline{\text{Q9}}$ and Q9, to produce the 10 kHz and 5 kHz portions of the clock signal, respectively.

End of message gate T12 gates B13 with sequential timing pulse, P, to produce END OF MESSAGE and its complement. END OF MESSAGE is a 6.25 $\mu$ sec positive-going pulse that occurs after the leading edge of B13. The $\overline{\text{END OF MESSAGE}}$ pulse is produced when the data is correctly positioned in the working register D21A. B13 goes hi when the first bit of the message has shifted into the B13 slot of the parallel register. At that time every other bit of the message is also in its correct slot. END OF MESSAGE enables all data check circuitry, since only at that time is the data properly positioned in the register.

A D-type flip flop T13 synchronizes the sample period control signal FF with the END OF MESSAGE pulse. F and $\overline{\text{F}}$ are ½ Hz squarewaves in the alignment mode and 1/32 Hz squarewaves in the waypoint mode. Both signals cannot change state until the message being processed has been completed, since only at that time will the END OF MESSAGE be generated. F enables a sample of the cable data to be taken in sequential operation, while $\overline{\text{F}}$ enables the RF sample. F and $\overline{\text{F}}$ also generate the two sample pulses. The sample pulse control T14 decodes the three outputs of the SOURCE switch 32, and gates F and $\overline{\text{F}}$ accordingly. The COUNTER RESET CONTROL pulse, like the sample pulses, is synchronized to the END OF MESSAGE. The mode is the only control on this signal, however, so it is a 2 $\mu$ sec pulse occurring once every second in the alignment mode, and every 16 seconds in the waypoint mode. The $\overline{\text{COUNTER RESET CONTROL}}$ ensures that the $\overline{\text{COUNTER RESET PULSE}}$ is generated at the end of the sample period, after the last message has been processed.

Reset control T15 produces the $\overline{\text{RESET}}$ signal, a 6.25 $\mu$ sec lo-going pulse which clears the working register D21A after sync burst has been detected and after the END OF MESSAGE. In manual operation the CLR pushbutton switch 63 produces the $\overline{\text{RESET}}$ signal since the lo $\overline{\text{MANUAL}}$ signal overrides automatic gating so that the $\overline{\text{CLEAR}}$ signal produces $\overline{\text{RESET}}$. The counter reset T16 generates the $\overline{\text{COUNTER RESET PULSE}}$, a 6.25 $\mu$ sec lo-going pulse that resets the sublabel update rate counter C44 at the end of the sample period. The $\overline{\text{COUNTER RESET CONTROL}}$ presets the D-type flip flop (Q=hi) of the counter reset T16 once every second in the alignment mode, or once every 16 seconds in the waypoint mode. $\overline{S}$ clears the flip flop (Q=lo) within 200 μ sec, producing a window of variable width to enable the NAND gate. Width of the window depends on several variables, since S is synchronized with negative transitions of the DATA signal. The window cannot begin until the last message of the sample period is over, due to the fact that the originating signal, $\overline{\text{COUNTER RESET CONTROL}}$, is synchronized with the END OF MESSAGE pulse. During the window, R goes hi for 6.25 μ sec, and the gate produces the $\overline{\text{COUNTER RESET PULSE}}$.

MESSAGE SIMULATOR

The message simulator circuitry produces test messages for check-out of the test set. Power to most of the integrated circuits is switched by the MSG CLK switch 60. When set to OFF, the power is interrupted, thus reducing the dissipation in the power supply. When set to MAN, the switch M1 applies power and the MANUAL signal is hi. The operator can then select the test message with the MSG TYPE switch 64, and enter it in the working register D21A by using the CLR, CLK and TRANS pushbutton switches 63, 61 and 62. When set to AUTO, the hi AUTO signal enables the message to be automatically generated and processed. As far as the operation of the message simulator circuits is concerned, there is no difference between manual and automatic clocking of the test message, except for the clock rate.

CLK switch M2 provides a means to manually clock a test message. Pressing the switch puts a lo on the N.O. output, and releasing the switch puts the lo on the N.C. output. The manual clock pulse generator M3 decodes the switch outputs and produces the manual clock pulses. The manual clock pulse generator M3 removes point contact bounce from the CLK switch M2. The flip flop M3A removes switching noise and the monostable multivibrator M3B produces the four microsecond DELAYED MANUAL CLOCK pulses, which becomes the DATA SHIFT CLOCK in a manual mode.

The clock gate M4 produces the message simulator clock signal. If the MSG CLK switch 60 is set to AUTO, the hi AUTO signal gates 10 kHz to the clock output. If the switch 60 is set to MAN, the hi MANUAL signal gates the manually-generated output of flip flop M3A to the clock output.

CLR switch M5 provides a means to manually clear the message simulator timing M6 and the working register D21A. Pressing switch M5 puts a hi on the CLEAR signal, which sets all the outputs of the message simulator timing M6 to a logical 0. CLEAR also goes to the timing circuitry, where, in manual operation, it becomes the $\overline{\text{RESET}}$ signal. $\overline{\text{RESET}}$ in turn, goes to the display circuitry, where it clears the working register D21A. Pressing the CLR switch accomplishes two things in manual operation: first, it resets the message timing, so that a new message may be begun; and, second, it clears the old message out of the working register D21A, so that the only thing in the register is that which is manually clocked in after the CLR switch is pressed.

The message simulator timing M6 counts input clock pulses, and divides them by 3200, to produce three sets of timing signals. The first group is the DIVIDE BY 32 OUTPUTS, which address the read only-memories in the line generator M11, causing it to produce 28 lines of serial digital data in a stream of 32 bits each. However, two bits of any line generator M11 output equal one bit of a message, so that the 28 lines may be considered to contain 16 bits each.

The next group is the DIVIDE BY 5 OUTPUTS which control formation of the test message. Since a message contains 80 bits, and each line generator M11 output contains 16 bits, five lines are required for one message. The DIVIDE BY 5 OUTPUTS control selection of the five lines. The first four lines are addressed at the message multiplexer M24 whose output is that part of a message which does not change. The most significant bit of the DIVIDE BY 5 OUTPUTS goes to the alignment/waypoint multiplexer M25 where it gates the 16-bit sublabel into the message. The sublabel of the message change, in accordance with the required sublabel update rate, so that a different sublabel may be gated into the alignment/waypoint multiplexer M25 each time the DIVIDE BY 5 OUTPUTS complete a cycle.

The third group is the DIVIDE BY 20 OUTPUTS which change the sublabel portion of the message to achieve the required sublabel update rate. The DIVIDE BY 20 OUTPUTS control the changing of sublabels by ddressing the sublabel strobe M22 and sublabel multiplexer M23. To produce the ALIGNMENT SUBLABEL, the DIVIDE BY 20 OUTPUTS address the sublabel strobe M22, which in turn addresses the sublabel multiplexer M23. The multiplexer gates the eight lines that make the eight different sublabels. For good alignment data, 40 messages are required: two each of the first four alignment sublabels, and eight each of the last four. The 40 messages are divided in half and repeated once. The DIVIDE BY 20 OUTPUTS are encoded by the sublabel strobe M22 into an address that will enable one each of the first four alignment sublabels, and four each of the last four. The address then enables the sublabel multiplexer M24 to gate out the pattern of sublabels to the alignment/waypoint multiplexer M25.

The generation of the WAYPOINT SUBLABEL is considerably simplified by the fact that only one each of the two waypoint sublabels is required. The least significant bit of the DIVIDE BY 20 OUTPUTS is applied to the sublabel multiplexer M23, where it gates out one sublabel when it is hi, and the other when it is lo.

Line generator M11 produces 28 lines of serial digital data, which are multiplexed into the various test messages. Each line consists of 32 memory slots, which are programmed with highs and lows at the time of manufacture, according to the portion of the message that each line is to be. With the exception of those lines which form the sync burst pattern of a message, two message slots produce one bit of the serial message. All lines read out the information contained in one memory slot for each increment of the DIVIDE BY 32 OUTPUTS. That is, if the value of the DIVIDE BY 32 OUTPUTS is five, all 28 lines will read out the information they have in memory slot five. As the DIVIDE BY 32 OUTPUTS count from zero to 32 at a 10 kHz (auto) rate, each line will produce a serial line of the information in memory slot zero thru 32. Each line is labeled with two numbers-one for the originating read-only-memory, and one for the particular line of the read-only-memory. For example, all outputs of read-only-memory number 1 (ROM1) are labeled LBX1. Line 0 of ROM1 is labeled LB01 and line 7 of ROM1 is labeled LB71. The relationship between the 28 lines and the final messages is given in the table below where "NA" is not applicable and "ALL" is the line produces the entire message.

| LINE | MSG TYPE | SUBLABEL | ASSIGNMENT |
|---|---|---|---|
| LB01 | AG,ANG | NA | B-50-B65 |
| LB11 | AG | NA | B66-B80, B1 |
| LB21 | AG,ANG | NA | B2-B17 |
| LB31 | AG | NA | B18-B33 |
| LB41 | AG | 01 | B34-B49 |
| LB51 | AG,ANG | 03 | B34-B49 |
| LB61 | AG,ANG | 05 | B34-B49 |
| LB71 | AG,ANG | 07 | B34-B49 |
| LB02 | AG,ANG | 11 | B34-B49 |
| LB12 | AG,ANG | 15 | B34-B49 |
| LB22 | AG,ANG | 17 | B34-B49 |
| LB32 | AG,ANG | 21 | B34-B49 |
| LB42 | ANG | NA | B66-B80, B1 |
| LB52 | ANG | NA | B18,B33 |
| LB62 | AUX 1 | NA | ALL |
| LB72 | AUX 2 | NA | ALL |
| LB04 | WG | NA | B50-B65 |
| LB14 | WG,WNG | NA | B66-B80, B1 |
| LB24 | WG,WNG | NA | B2-B17 |
| LB34 | WG | NA | B18-B33 |
| LB44 | WG | 36 | B34-B49 |
| LB54 | WG,WNG | 37 | B34-B49 |
| LB64 | WNG | NA | B18-B33 |
| LB74 | WNG | NA | B50-B65 |
| LB05 | AUX 3 | NA | ALL |
| LB15 | AUX 4 | NA | ALL |
| LB25 | AUX 5 | NA | ALL |
| LB35 | AUX 6 | NA | ALL |

Message type switch M12 provides a means to select the type of message to be generated. When any of the AG, ANG, WG or WNG message is selected, three things are decoded. First, it is determined whether the selection is an alignment or waypoint message. The ALIGNMENT 1 signal from the data check circuitry (C22) is hi if the selection is alignment, or lo if it is waypoint. Second, it is determined if the selection is a good or bad message. Switch M12A produces a lo output if the message is good or a hi output if it is bad. Finally, the message type is determined. This is done by switch M12B, which switches a lo to one of seven gating lines. If the switch 64 is set to Ag, ANG, Wg or WNG, the lo is applied to the MESSAGE TEST line. In any other position, the lo is applied to the line whose name is the inverse of the switch setting.

AUX 3-6 gate M13 produces the test message when the MSG TYPE switch 64 is set to any of the AUX 3 thru AUX 6 positions. The lo signal selected by the MSG TYPE switch M12B enables one of the four lines from the line generator M11 to be gated out as the AUX 3-6 MESSAGE. Although AUX 6 is available, LB35 is not programmed in the preferred embodiment and the AUX 6 message is all zeroes. AUX 6 is not used at this time.

The good/bad multiplexer M21 selects either six good or six bad lines for the message: three lines for the alignment message, and three for the waypoint message, according to the setting of the MSG TYPE switch 64. When the switch is set to AG or WG the $\overline{GOOD}$ signal is lo. The data multiplexers M21A and M21B select the data at their 1A, 2A and 3A inputs, LB11, LB31, LB41 and LB04, LB34, LB44 respectively. The outputs then for multiplexer M21A are ZA=LLB11, ZB=LLB31 and ZC=LLB41. The outputs for multiplexer M21B are ZA=LLB04, ZB=LLB34 and ZC=LLB44. If MSG TYPE switch 64 is set to ANG or WNG, $\overline{GOOD}$ is hi and multiplexers M21A and M21B select the data at their 1B, 2B and 3B outputs (LB42, LB52, ground and LB64, LB74 and ground, respectively). The relationships between inputs and outputs are given in the following table.

| INPUT LINE | OUTPUT LINE | MSG TYPE | MESSAGE PORTION | REMARKS |
|---|---|---|---|---|
| LB11 | LLB11 | AG | B66-B80, B1 | GOOD VALIDITY |
| LB31 | LLB31 | AG | B18-B33 | GOOD LABEL, PARITY |
| LB41 | LLB41 | AG | B34-B49 (01 ONLY) | GOOD SUBLABEL 01 |
| LB04 | LLB04 | WG | B50-B65 | GOOD WAYPOINT NO. |
| LB34 | LLB34 | WG | B18-B33 | GOOD ADDRESS, LABEL, PARITY |
| LB44 | LLB44 | WG | B34-B49 (36 ONLY) | GOOD SUBLABEL 36 |
| LB42 | LLB11 | ANG | B66-B80, B1 | BAD VALIDITY |
| LB52 | LLB31 | ANG | B18-B33 | BAD LABEL, PARITY |
| GROUND | LLB41 | ANG | B34-B49 (01 ONLY) | MISSING SUBLABEL 01 |
| LB64 | LLB04 | WNG | B50-B65 | BAD WAYPOINT NO. |
| LB74 | LLB34 | WNG | B18-B33 | BAD ADDRESS, LABEL, PARITY |
| GROUND | LLB44 | WNG | B34-B49 (36 ONLY) | MISSING SUBLABEL 36 |

Sublabel strobe M22 produces three outputs to address the sublabel multiplexer M23. The outputs are named for their octal weight. Due to the sublabel update rate requirements, the good alignment message must contain each second: two each of Sublabels 01, 03, 05 and 07 messages and 8 each of Sublabels 11, 15, 17 and 21 messages. The strobe M22 is a read-only-memory that reads out the required outputs when addressed by the DIVIDE BY 20 OUTPUTS. It takes two cycles of the DIVIDE BY 20 OUTPUTS to get the total of 40 sublabel messages. The following table gives the relationship between the input address, output address and the alignment sublabel selected at the sublabel multiplexer M23.

| | SUBLABEL STROBE M22 | | | | | | SUBLABEL MULTIPLEXER M23 | | | |
|---|---|---|---|---|---|---|---|---|---|---|
| | INPUT CODE | | | | | | OUTPUT CODE | | | |
| INPUT ADDRESS | A4 N | A3 M | A2 L | A1 K | A0 J | OUTPUT ADDRESS | B2 4 | B1 2 | B0 1 | SUBLABEL SELECTED | LINE SELECTED |
| 0 | 0 | 0 | 0 | 0 | 0 | 0 | 0 | 0 | 0 | 01 | LLB41 |
| 1 | 0 | 0 | 0 | 0 | 1 | 1 | 0 | 0 | 1 | 03 | LB51 |
| 2 | 0 | 0 | 0 | 1 | 0 | 2 | 0 | 1 | 0 | 05 | LB61 |
| 3 | 0 | 0 | 0 | 1 | 1 | 3 | 0 | 1 | 1 | 07 | LB71 |
| 4 | 0 | 0 | 1 | 0 | 0 | 4 | 1 | 0 | 0 | 11 | LB02 |
| 5 | 0 | 0 | 1 | 0 | 1 | 4 | 1 | 0 | 0 | 11 | LB02 |
| 6 | 0 | 0 | 1 | 1 | 0 | 4 | 1 | 0 | 0 | 11 | LB02 |

-continued

| | SUBLABEL STROBE M22 | | | | | | SUBLABEL MULTIPLEXER M23 | | | |
|---|---|---|---|---|---|---|---|---|---|---|
| | INPUT CODE | | | | | | OUTPUT CODE | | | |
| INPUT ADDRESS | A4 N | A3 M | A2 L | A1 K | A0 J | OUTPUT ADDRESS | B2 4 | B1 2 | B0 1 | SUBLABEL SELECTED | LINE SELECTED |
| 7 | 0 | 0 | 1 | 1 | 1 | 4 | 1 | 0 | 0 | 11 | LB02 |
| 8 | 0 | 1 | 0 | 0 | 0 | 5 | 1 | 0 | 1 | 15 | LB12 |
| 9 | 0 | 1 | 0 | 0 | 1 | 5 | 1 | 0 | 1 | 15 | LB12 |
| 10 | 1 | 0 | 0 | 0 | 0 | 5 | 1 | 0 | 1 | 15 | LB12 |
| 11 | 1 | 0 | 0 | 0 | 1 | 5 | 1 | 0 | 1 | 15 | LB12 |
| 12 | 1 | 0 | 0 | 1 | 0 | 6 | 1 | 1 | 0 | 17 | LB22 |
| 13 | 1 | 0 | 0 | 1 | 1 | 6 | 1 | 1 | 0 | 17 | LB22 |
| 14 | 1 | 0 | 1 | 0 | 0 | 6 | 1 | 1 | 0 | 17 | LB22 |
| 15 | 1 | 0 | 1 | 0 | 1 | 6 | 1 | 1 | 0 | 17 | LB22 |
| 16 | 1 | 0 | 1 | 1 | 0 | 7 | 1 | 1 | 1 | 21 | LB32 |
| 17 | 1 | 0 | 1 | 1 | 1 | 7 | 1 | 1 | 1 | 21 | LB32 |
| 18 | 1 | 1 | 0 | 0 | 0 | 7 | 1 | 1 | 1 | 21 | LB32 |
| 19 | 1 | 1 | 0 | 0 | 1 | 7 | 1 | 1 | 1 | 21 | LB32 |

Sublabel multiplexer M23 produces the sublabel (bits 34–49) portion of alignment and waypoint messages by sequencing through several of the line generator M6 outputs. Multiplexer M23A produces the alignment sublabel sequence and multiplexer M23B produces the waypoint sublabel sequence. Multiplexer M23B selects the waypoint sublabel by alternating between its two inputs. Selection is controlled by the state of J, the least significant bit of the DIVIDE BY 20 OUTPUTS. When J is lo, sublabel 36 (LLB44) is selected, and when J is hi, sublabel 37 (LB54) is selected. Insertion of sublabels into the complete message is accomplished by the alignment/waypoint multiplexer M25.

Message multiplexer M24 forms all but the sublabel portion of the alignment and waypoint messages. As the DIVIDE BY 5 OUTPUTS count from zero to five, I and G address the two sets of inputs (one set for alignment, one set for waypoint) as shown in the following table. When the count reaches five I and G form an address of zero. However, H, the most significant bit of the DIVIDE BY 5 OUTPUTS, enables the sublabel to be gated into the final message.

| INPUTS | | | | OUTPUTS | | |
|---|---|---|---|---|---|---|
| ÷5 OUTPUTS | | | INPUT ADDRESS | ALIGNMENT MESSAGE (M24 INPUT) | WAYPOINT MESSAGE (M24 INPUT) | MESSAGE PORTION |
| H | G | I | | | | |
| 0 | 0 | 0 | 0 | LB01 1$C_0$ | LLB04 2$C_0$ | B50–B65 |
| 0 | 0 | 1 | 1 | LLB11 1$C_1$ | LB14 2C1 | B66–B80, B1 |
| 0 | 1 | 0 | 2 | LB21 1C2 | LB24 2CZ | B2–B17 |
| 0 | 1 | 1 | 3 | LLB31 1C3 | LLB34 2C3 | B18–B33 |
| 1 | 0 | 0 | 0 | LB01 1C° | LLB04 2$C_0$ | NOT USED |

The alignment/waypoint multiplexer M25 produces the final alignment or waypoint message. When the MSG TYPE switch 64 is set to either AG or ANG, ALIGNMENT 1 is hi. Combined with the timing signal H, the two signals form an address which alternates between two and three, alternately selecting the ALIGNMENT MESSAGE and the ALIGNMENT SUBLABEL. Similarly, when the MSG TYPE switch 64 is set to either WG or WNG, the ALIGNMENT 1 signal is lo, forming an address with H of zero or 1. That address selects the WAYPOINT MESSAGE and the WAYPOINT SUBLABEL. The message is complete at the output of multiplexer M25. Final gating is performed by the test message gate M26. When the MSG TYPE switch 64 is set to AG, ANG, WG or WNG the ALIGNMENT/WAYPOINT MESSAGE is gated to the output. When set to AUX 1 or AUX 2, LB62 or LB72 is gated, and when set to a position from AUX 3 to AUX 6, the AUX 3-6 MESSAGE is gated to the output. The SIMULATED DATA is inverted with respect to the true message by driver M27. The driver M27 provides drive for the TEST MESSAGE at test point 82 (TP82) and also converts the data to a ±5V non-return-to-zero logic signal.

Obviously many modifications and variations of the present invention are possible in the light of the above teachings. It is therefore to be understood that within the scope of the appended claims the invention may be practiced otherwise than as specifically described.

What is claimed is:

1. A portable Ship's Navigation Aircraft Inertial Alignment System Digital Test Set which evaluates the availability and adequacy of the data link navigation messages, transmitted between the shipboard navigation system and the aircraft inertial alignment system via a digital data radio link, umbilical cable or both, comprising:

power distribution circuitry which develops and distributes power signals throughout said test set;

timing circuitry which produces timing signals that control the processing of received data;

display circuitry which source selects and receives cable data, transmitted RF data or both, checks the adequacy of the data for a sample period, displays a good or bad data evaluation, shapes, aligns and gates said data into a serial digital signal, converts said digital signal into a parallel data signal and provides semi-permanent storage to display data; and, data check circuitry which decodes the operating mode, alignment or waypoint, of said test set, evaluates the received data, checks each message for a sample period for correct lable, parity, validity and alignment sublabel update rate in the alignment mode, checks each message for a sample period for correct label, parity, aircraft address, waypoint number and waypoint sublabel update rate in the waypoint mode, and instructs said display circuitry as to the overall adequacy of the data.

2. The device of claim 1 wherein said data check circuitry comprises:

a parity check circuit which checks each message parity and the outputs of said parity check indicate a good or bad parity check;

a label check circuit which checks each message label and the outputs of said label check indicate a good or bad label check;

a validity check circuit which checks, in the alignment mode, the validity portion of each message and the outputs of said validity check indicate a good or bad validity check, and said validity check circuit having a good indication whenever said test set is in the waypoint mode;

a mode control switch which selects either the alignment or waypoint mode of operation of said test set;

an aircraft address switch which allows selection, in a waypoint mode, of the address of an aircraft which receives the data being monitored by said test set;

an address match circuit which checks each bit from said aircraft address switch with the corresponding address bit of each message and the outputs of said address match circuit indicates a good or bad match, and said address match circuit having a good indication whenever said test set is operating in the alignment mode;

a sublabel switch which allows selection of the sublabel of a message to be displayed;

a sublabel match circuit which checks each bit from said sublabel switch with the corresponding sublabel bit of each message and the outputs of said sublabel match circuit indicates a good or bad match;

a waypoint number switch which allows selection in a waypoint mode, of the waypoint number of a message to be monitored by said test set;

a waypoint match circuit which checks, in a waypoint mode, each bit from said waypoint number switch with the corresponding waypoint number bit of each message and the output of said waypoint number circuit indicates a good or bad match, and said waypoint match circuit having a good indication whenever said test set is operating in the alignment mode;

a word count gate, one output indicative of a good message when checks for label, parity, validity, address match and waypoint match are good, and a second output indicative of data match when checks for sublabel, address and waypoint number match are good; and, a status decoder which detects and decodes a message sublabel, counts the sublabels of good messages received from said word count gate for a sample period, checks for the required update rate, and the output of said status decoder thereby indicates the adequacy of the data.

3. The device of claim 2 wherein there is provided:
three data monitors, one each connected to the outputs of said parity check circuit, label check circuit and validity check circuit, each data monitor comprising:

a good indicator connected to said good check circuit output;

a bad indicator connected to said bad check circuit output;

a latch switch which, when set, latches said indicator in the bad state if a bad output is detected; and, a clear switch which when activated resets the indicators if a bad output has been detected in said latch mode.

4. The device of claim 2 wherein there is provided:
three check override switches, one each connected to the inputs of said parity check circuit, label check circuit and validity check circuit, each check override switch which, when set, forces said check circuits to indicate only a good check.

5. The device of claim 2 wherein there is provided:
three match override switches, one each connected to the inputs of said address match circuit, said sublabel match circuit, and said waypoint match circuit, each match override switch, when set, forces said match circuits to indicate only a good match.

6. The device of claim 1 wherein said display circuitry comprises:

a RF input which receives the RF data signal;

a receiver which demodulates the received signal into serial digital data;

a RF data reconstitution circuit which converts said receiver output to a return-to-zero serial data signal;

a cable data input;

a cable data reconstitution circuit which converts the cable data signal to a return-to-zero serial data signal and which delays said serial cable data signal for alignment with said reconstituted RF data signal;

a source switch with cable only, RF only and sequential outputs;

data select gates which receive the output signal of said source switch and therewith select for processing either the reconstituted RF data signal, the reconstituted cable data signal or an alternate sample of both;

a working register where in the serial output signal of said data select gates is cyclicly converted into a plurality of parallel lines, one for each active bit of the message and shifted through said working register;

a display register wherein the outputs of said working register are connected to said display register's data inputs and are transferred to said display register's outputs when each bit of the message matches those selected by said data select gates;

a plurality of message lamps, one for each bit of a message;

a plurality of message drivers, one for each message lamp and which provide current-sinking drive to illuminate said message lamps according to the data held in said display register;

a display switch which applies power from the power distribution circuitry to said message lamps and said message drivers;

a detector connected to said working register and which detects the sync burst pattern at the beginning of a message and which has an output which marks the beginning of a message;

a comparison check circuit which checks each bit of the reconstituted RF data signal with each bit of the reconstituted cable data signal, said timing circuitry clocking the comparison for each bit and the outputs of said comparison check display a good or bad data comparison;

a cable check circuit which checks the adequacy of the reconstituted cable data for a previous sample period, and the outputs of said cable check display a good or bad data evaluation; and a RF check circuit which checks the adequacy of the reconstituted RF data for a previous sample period, and the outputs of said cable check display a good or bad data evaluation.

7. The device of claim 6 wherein there is provided:
a frequency select switch;
a synthesizer injecting the local oscillator frequency into said receiver; and
a plurality of frequency control inverters inverting the outputs of said frequency select switch and obtaining the correct logic level for interface with said synthesizers.

8. The device of claim 5 wherein there is provided:
an alarm enabling means operably connected to said comparison check circuit, said cable check circuit, and said RF check circuit whereby said alarm will be energized if bad data is detected by any of said check circuits.

9. The device of claim 6 wherein there is provided three data monitors, one each connected to the outputs of said comparison check circuit, said cable check circuit, and said RF check circuit, each data monitor comprising:
a good indicator connected to said good check circuit output;
a bad indicator connected to said bad check circuit output;
a latch switch which, when set, latches said indicator in the bad state if a single bad data output is detected;
a clear switch, which, when activated, resets the indicators if bad data has been detected in said latch mode.

10. The device of claim 1 wherein said power distribution circuitry comprises:
connecting means for input power to said test set; and,
a power supply to regulate and filter said input power to produce a plurality of test set voltages.

11. The device of claim 16 wherein there is provided:
a dark-adapted red lighting panel attached to said test set and powered by said test set voltages.

12. The device of claim 1 wherein said timing circuitry comprises:
an oscillator which produces a frequency from which all test set timing signals are derived;
a clock control which divides said oscillator frequency and produces sequential timing pulses in phase with the data they process;
a clock select gate which is enabled by said clock control and which has for its output a data shift clock signal utilized by said display circuitry;
a sample period timer which divides said oscillator frequency and gates said divided frequencies with said decoded mode signals of said data check circuitry to produce a sample period for said alignment mode and a sample period for said waypoint mode;
an end of message gate which has for one input a sequential timing pulse of said clock control and for another input a signal indicating when the serial data is fully loaded in said display circuitry, and said end of message gate which has for an output an end of message pulse, a signal which enables all data evaluation circuits of said data check circuitry;
a sample pulse generator which synchronizes the sample period control signal of said sample period timer with said end of message pulse, resulting in two signals, one of which enables a sample of cable data to be taken in sequential operation and the other of which enables a sample of RF data to be taken in sequential operation, and the source select signal of said display circuitry gates said enabling signals, generating two sample pulses; and
reset logic which clears the pattern out of said display circuitry after the beginning of the message has been detected and clears the completed message out of said display circuitry after said end of message signal is received and which resets the count for sublabel update rate of said data check circuitry at the end of a period determined by said sequential timing pulses of said clock control.

13. The device of claim 12 wherein said display circuitry comprises:
a RF input which receives the RF data signal;
a receiver which demodulates the received signal into serial digital data;
a RF data reconstitution circuit which converts said receiver output to a return-to-zero serial data signal;
a cable data input;
a cable data reconstitution circuit which converts the cable data signal to a return-to-zero serial data signal and which delays said serial cable data signal for alignment with said reconstituted RF data signal;
a source switch with cable only, RF only and sequential outputs;
data select gates which receive the output signal of said source switch and therewith select for processing either the reconstituted RF data signal, the reconstituted cable data signal or an alternate sample of both;
a working register where in the serial output signal of said data select gates is cyclicly converted into a plurality of parallel lines, one for each active bit of the messsage and shifted through said working register;
a display register wherein the outputs of said working register are connected to said display register's data inputs and are transferred to said display register's outputs when each bit of the message matches those selected by said data select gates;
a plurality of message lamps, one for each bit of a message;
a plurality of message drivers, one for each message lamp and which provide current-sinking drive to illuminate said message lamps according to the data held in said display register;
a display switch which applies power from the power distribution circuitry to said message lamps and said message drivers;
a detector connected to said working register and which detects the sync burst pattern at the beginning of a message and which has an output which marks the beginning of a message;
a comparison check circuit which checks each bit of the reconstituted RF data signal with each bit of the reconstituted cable data signal, said timing circuitry clocking the comparison for each bit and the outputs of said comparison check display a good or bad data comparison;

a cable check circuit which checks the adequacy of the reconstituted cable data for a previous sample period, and the outputs of said cable check display a good or bad data evaluation; and a RF check circuit which checks the adequacy of the reconstituted RF data for a previous sample period, and the outputs of said cable check display a good or bad data evaluation.

14. The device of claim 13 wherein said data check circuitry comprises:

a parity check circuit which checks each message parity and the outputs of said parity check indicate a good or bad parity check;

a label check circuit which checks each message label and the outputs of said label check indicate a good or bad label check;

a validity check circuit which checks, in the alignment mode, the validity portion of each message and the outputs of said validity check indicate a good or bad validity check, and said validity check circuit having a good indication whenever said test set is in the waypoint mode;

a mode control switch which selects either the alignment or waypoint mode of operation of said test set;

an aircraft address switch which allows selection, in a waypoint mode, of the address of an aircraft which receives the data being monitored by said test set;

an address match circuit which checks each bit from said aircraft address switch with the corresponding address bit of each message and the outputs of said address match circuit indicates a good or bad match, and said address match circuit having a good indication whenever said test set is operating in the alignment mode;

a sublabel switch which allows selection of the sublabel of a message to be displayed;

a sublabel match circuit which checks each bit from said sublabel switch with the corresponding sublabel bit of each message and the outputs of said sublabel match circuit indicates a good or bad match;

a waypoint number switch which allows selection in a waypoint mode, of the waypoint number of a message to be monitored by said test set;

a waypoint match circuit which checks, in a waypoint mode, each bit from said waypoint number switch with the corresponding waypoint number bit of each message and the output of said waypoint number circuit indicates a good or bad match, and said waypoint match circuit having a good indication whenever said test set is operating in the alignment mode;

a word count gate, one output indicative of a good message when checks for label, parity, validity, address match and waypoint match are good, and a second output indicative of data match when checks for sublabel, address and waypoint number match are good; and, a status decoder which detects and decodes a message sublabel, counts the sublabels of good messages received from said work count gate for a sample period, checks for the required update rate, and the output of said status decoder thereby indicates the adequacy of the data.

15. The device of claim 14 wherein there is included a message simulator display circuitry;

a clear switch which manually clears the storage of said display circuitry;

a transfer switch which manually transfers a test message into the display circuitry;

a clock switch which manually clocks a test message;

a message clock switch which controls the clocking of a simulated message, said message clock switch when set to manual enables a message to be entered by means of said clear, transfer and clock switches and said message clock switch when set to automatic, enables a message to be automatically generated and processed;

a line generator which produces lines of serial digital data which form all test messages;

a timing control which applies either a clock pulse of said timing circuitry in automatic operation or said manually generated clock pulses of said clock switch in manual operation, counts input clock pulses, divides them which results in a plurality of outputs, the first of which controls the formation of a test message, the second of which change the sublabel portion of a message to achieve the required sublabel update rate and the third of which address said line generator;

a message type switch which selects the message to be generated and wherein decodes whether the selection is an alignment or waypoint message as determined by said data check circuitry and decodes whether the selection is a good or bad message;

a message multiplexer which selects by direction of said message type switch lines of said line generator, forms the message from said selected lines into a sequence utilizing the first outputs of said timing control, changes the sublabel portion of the message, so that each time it is addressed, a different sublabel is present for insertion into the message, and selects the message, according to mode and inserts the appropriate sublabel;

an auxiliary gate, controlled by said message type switch which enables a line output of said line generator to be gated out as a test message;

a test message gate, controlled by said message type switch, gating to its output either the output of said message multiplexer of said auxiliary gate; and a message gate which inserts said test message in place of said received cable or RF data in said display circuitry.

16. The device of claim 1 wherein there is provided message simulator circuitry which produces test messages for check-out of said test set.

17. The device of claim 16 wherein said message simulator circuitry comprises:

a clear switch which manually clears the storage of said display circuitry;

a transfer switch which manually transfers a test message into the display circuitry;

a clock switch which manually clocks a test message;

a message clock switch which controls the clocking of a simulated message, said message clock switch when set to manual, enables a message to be entered by means of said clear, transfer and clock switches and said message clock switch when set to automatic, enables a message to be automatically generated and processed;

a line generator which produces lines of serial digital data which form all test messages;

a timing control which applies either a clock pulse of said timing circuitry in automatic operation or said manually generated clock pulses of said clock switch in manual operation, counts input clock pulses, divides them which results in a plurality of outputs, the first of which controls the formation of a test message, the second of which change the sublabel portion of a message to achieve the required sublabel update rate and the third of which address said line generator;

a message type switch which selects the message to be generated and wherein decodes whether the selection is an alignment or waypoint message as determined by said data check circuitry and decodes whether the selection is a good or bad message;

a message multiplexer which selects by direction of said message type switch lines of said line generator, forms the message from said selected lines into a sequence utilizing the first outputs of said timing control, changes the sublabel portion of the message, so that each time it is addressed, a different sublabel is present for insertion into the message, and selects the message, according to mode and inserts the appropriate sublabel;

an auxiliary gate, controlled by said message type switch which enables a line output of said line generator to be gated out as a test message;

a test message gate, controlled by said message type switch, gating to its output either the output of said message multiplexer or said auxiliary gate; and a message gate which inserts said test message in place of said received cable or PF data in said display circuitry.

18. The device of claim 16 wherein said timing circuitry comprises:

an oscillator which produces a frequency from which all test set timing signals are derived;

a clock control which divides said oscillator frequency and produces sequential timing pulses in phase with the data they process;

a clock select gate which is enabled by said clock control and by said message clock switch and said clock select gate has for its output a data shift clock signal utilized by said display circuitry;

a sample period timer which divides said oscillator frequency and gates said divided frequencies with said decoded mode signals of said data check circuitry to produce a sample period for said alignment mode and a sample period for said waypoint mode;

an end of message gate which has for one input a sequential timing pulse of said clock control and for another input a signal indicating when the serial data is fully loaded in said display circuitry, and said end of message gate which has for an output an end of message pulse, a signal which enables all data evaluation circuits of said data check circuitry;

a sample pulse generator which synchronizes the sample period control signal of said sample period timer with said end of message pulse, resulting in two signals, one of which enables a sample of cable data to be taken in sequential operation and the other of which enables a sample of RF data to be taken in sequential operation, and the source select signal of said display circuitry gates said enabling signals, generating two sample pulses; and, reset logic which clears the pattern out of said display circuitry after the beginning of the message has been detected and clears the completed message out of said display circuitry after said end of message signal is received and which resets the count for sublabel update rate of said data check circuitry at the end of a period determined by said sequential timing pulses of said clock control.

19. The device of claim 16 wherein said display circuitry comprises:

a RF input which receives the RF data signal;

a receiver which demodulates the received signal into serial digital data;

a RF data reconstitution circuit which converts said receiver output to a return-to-zero serial data signal;

a cable data input;

a cable data reconstitution circuit which converts the cable data signal to a return-to-zero serial data signal and which delays said serial cable data signal for alignment with said reconstituted RF data signal;

a source switch with cable only, RF only and sequential outputs;

data select gates which receive the output signal of said source switch and therewith select for processing either the reconstituted RF data signal, the reconstituted cable data signal or an alternate sample of both;

a working register where in the serial output signal of said data select gates is cycicly converted into a plurality of parallel lines, one for each active bit of the message and shifted through said working register;

a display register wherein the outputs of said working register are connected to said display register's data inputs and are transferred to said display register's outputs when each bit of the message matches those selected by said data select gates;

a plurality of message lamps, one for each bit of a message;

a plurality of message drivers, one for each message lamp and which provide current-sinking drive to illuminate said message lamps according to the data held in said display register;

a display switch which applies power from the power distribution circuitry to said message lamps and said message drivers;

a detector connected to said working register and which detects the sync burst pattern at the beginning of a message and which has an output which marks the beginning of a message;

a comparison check circuit which checks each bit of the reconstituted RF data signal with each bit of the reconstituted cable data signal, said timing circuitry clocking the comparison for each bit and the outputs of said comparison check display a good or bad data comparison;

a cable check circuit which checks the adequacy of the reconstituted cable data for a previous sample period, and the outputs of said cable check display a good or bad data evaluation; and a RF check circuit which checks the adequacy of the reconstituted RF data for a previous sample period, and the outputs of said cable check display a good or bad data evaluation.

20. The device of claim 16 wherein said data check circuitry comprises:
- a parity check circuit which checks each message parity and the outputs of said parity check indicate a good or bad parity check;
- a label check circuit which checks each message label and the outputs of said label check indicate a good or bad label check;
- a validity check circuit which checks, in the alignment mode, the validity portion of each message the the outputs of said validity check indicate a good or bad validity check, and said validity check circuit having a good indication whenever said test set is in the waypoint mode;
- a mode control switch which selects either the alignment or waypoint mode of operation of said test set;
- an aircraft address switch which allows selection, in a waypoint mode, of the address of an aircraft which receives the data being monitored by said test set;
- an address match circuit which checks each bit from said aircraft address switch with the corresponding address bit of each message and the outputs of said address match circuit indicates a good or bad match, and said address match circuit having a good indication whenever said test set is operating in the alignment mode;
- a sublabel switch which allows selection of the sublabel of a message to be displayed;
- a sublabel match circuit which checks each bit from said sublabel switch with the corresponding sublabel bit of each message and the outputs of said sublabel match circuit indicates a good or bad match;
- a waypoint number switch which allows selection in a waypoint mode, of the waypoint number of a message to be monitored by said test set;
- a waypoint match circuit which checks, in a waypoint mode, each bit from said waypoint number switch with the corresponding waypoint number bit of each message and the output of said waypoint number circuit indicates a good or bad match, and said waypoint match circuit having a good indication whenever said test set is operating in the alignment mode;
- a word count gate, one output indicative of a good message when checks for label, parity, validity, address match and waypoint match are good, and a second output indicative of data match when checks for sublabel, address and waypoint number match are good; and,
- a status decoder which detects and decodes a message sublabel, counts the sublabels of good messages received from said word count gate for a sample period, checks for the required update rate, and the output of said status decoder thereby indicates the adequacy of the data.

* * * * *